(12) United States Patent
SaLee

(10) Patent No.: US 12,540,976 B2
(45) Date of Patent: Feb. 3, 2026

(54) SYSTEMS AND METHODS FOR PARALLEL ELECTRICAL ENDURANCE TESTING OF CONTACTS

(71) Applicant: UL LLC, Northbrook, IL (US)

(72) Inventor: Michael Howard SaLee, Island Lake, IL (US)

(73) Assignee: UL LLC, Northbrook, IL (US)

( * ) Notice: Subject to any disclaimer, the term of this patent is extended or adjusted under 35 U.S.C. 154(b) by 139 days.

(21) Appl. No.: 18/441,733

(22) Filed: Feb. 14, 2024

(65) Prior Publication Data

US 2025/0258227 A1   Aug. 14, 2025

(51) Int. Cl.
*G01R 31/327*   (2006.01)

(52) U.S. Cl.
CPC .................................. *G01R 31/327* (2013.01)

(58) Field of Classification Search
CPC ............. G01R 31/327; G01R 31/3277; G01R 31/3278; H04Q 1/24
See application file for complete search history.

(56) References Cited

FOREIGN PATENT DOCUMENTS

| CN | 217181145 U | * | 8/2022 | |
|---|---|---|---|---|
| CN | 220367384 U | * | 1/2024 | |
| CN | 119104887 A | * | 12/2024 | ................ G01J 5/48 |

* cited by examiner

*Primary Examiner* — Son T Le
(74) *Attorney, Agent, or Firm* — Greenberg Traurig, LLP

(57) ABSTRACT

An apparatus for testing a plurality of electrical switches including contacts to connect multiple sample switches to an input and an output. A power source is connected to the inputs of the sample switches, and other switches are connected to the outputs of the sample switches so that the sample switches may be selectively connected to either a make load or a break load to perform testing on the sample switches. The sample switches may further be made of silicon carbide MOSFETs that shutoff using a zero-crossing current sensing logic. The voltage at the sample switches may further be monitored by a universal voltage board configured to sense various alternating and direct current (AC or DC) voltages so that various types of sample switches may be tested.

20 Claims, 30 Drawing Sheets

SYSTEMS AND METHODS FOR PARALLEL ELECTRICAL ENDURANCE TESTING OF CONTACTS

BACKGROUND

As a part of product safety testing and certification, electrical relays and switches may be evaluated to prove their performance safely in normal use through endurance testing. Such electrical endurance testing may be used to stress a given product to its maximum rated electrical, thermal, and/or mechanical limits through, for example, on-off cycling.

BRIEF DESCRIPTION OF THE DRAWINGS

FIGS. 9-43 are diagrammatic views of example graphical user interfaces for using an example testing apparatus, in embodiments.

DETAILED DESCRIPTION

Figure 1:
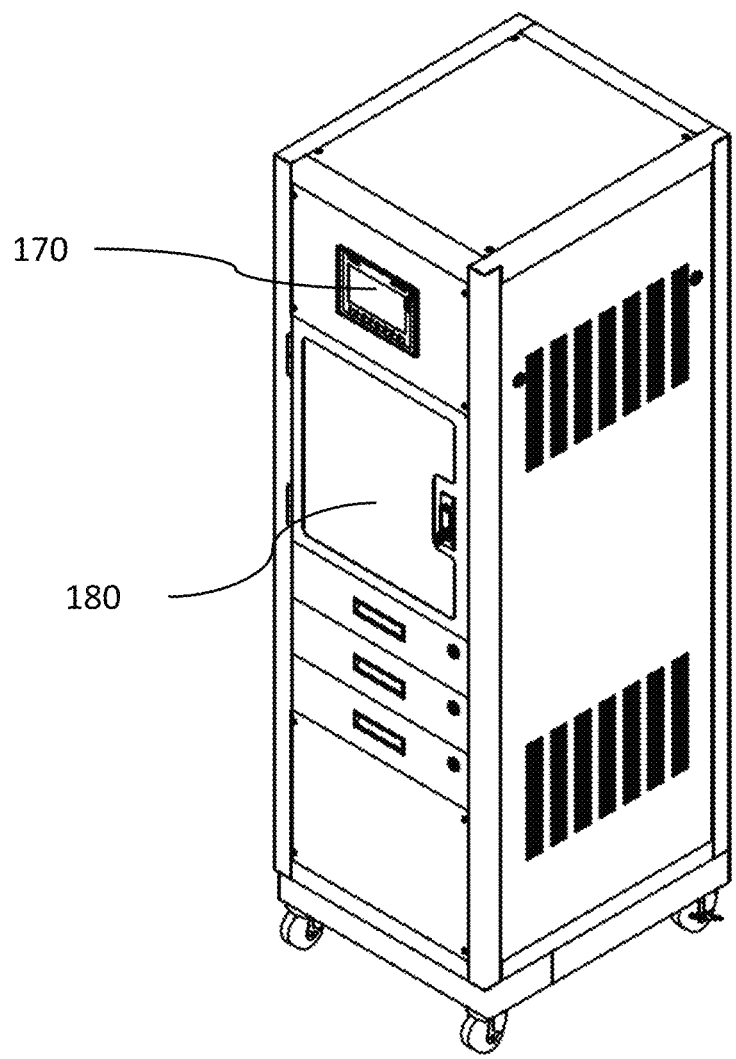
FIG. 1 is a diagrammatic view of an example enclosure in which an electrical device may be tested, in embodiments.

The following disclosure of example apparatuses, methods, and computer-readable media is not intended to limit the scope of the detailed description to the precise form or forms detailed herein. Instead, the disclosure herein is intended to be illustrative so that others may follow its teachings.

As a part of product safety testing and certification, relays and switches may be evaluated to prove their performance safely in normal use through endurance testing. Such electrical endurance testing may be designed to stress the product to its maximum rated electrical, thermal, and mechanical limits through on-off cycling of the relays and/or switches. For example, testing may be performed according to Underwriters Laboratories (UL) or International Electrotechnical Commission (IEC) standard 60730-1. However, the various embodiments described herein may be used in conjunction with or for other types of tests or test standards. The testing may be broken down into two electrical tests: an overload test and an endurance test. The overload test may run the product through a certain percentage over a maximum rating for a short period of time. The endurance test may run the product through its maximum rating for a long period of time. Previous tests of a single switch or relay may take, for example, over one month to complete.

As such, this type of testing may use a large amount of lab equipment and lab footprint to accomplish. As the testing required increases with more ratings, models, samples, etc. the testing time can further increase significantly. Various embodiments described herein are configured to mitigate/ eliminate these problems and provide a reduction in testing time per sample, laboratory footprint, equipment used, etc., all while providing more flexibility for testing more samples than previous test equipment, testing different types of samples at the same time, and/or the ability to perform different types of tests using the same test equipment as described herein in various embodiments.

Using the apparatuses, methods, and computer-readable media described herein, one example embodiment may be used to perform an overload test on a relay or switch with 50 cycles of overload at a rate of 1 second on and 9 seconds off and perform an endurance test on a relay or switch with 100,000 cycles of endurance load at a rate of 5 seconds on 5 seconds off. Given such an example cycle rate, testing using the embodiments herein may, for example, take approximately 12 days to complete testing on a relay/switch samples.

As such, described herein are various apparatuses, methods, and computer-readable media for reducing the amount of time it takes to test such relays or switches by, for example, testing multiple (e.g., 3, 6) relays/switches at the same time with a single device. The apparatuses, methods, and computer-readable media described herein may also reduce the overall electric loads used to test the relays/ switches, thereby reducing the cost and amount of electricity needed to run the tests. The various embodiments herein may also advantageously be used to test multiple different samples (sample relays or switches may be referred to herein merely as a sample or samples) that are tested to different ratings at the same time. That is, different types of samples that may be different and therefore are subject to different tests, may also be simultaneously tested using the embodiments described herein.

Components used to conduct this testing may include a control system, controller, or processor to turn the sample(s) on and off (e.g., a small programmable logic controller or PLC); an oven or other heat source for providing a desired or predetermined amount of heat in which to test the samples; electrical loads capable of providing the required or desired predetermined power levels for long durations; a transformer or variable autotransformer (e.g., Variac™ transformers) to adjust electrical mains voltage; and a mains power configured to provide a desired or predetermined amount of power sufficient to run desired tests for the samples.

The various embodiments described herein therefore provide for test fixtures capable of various methods of parallel electrical endurance testing of relays and/or switch contacts. A section of sequencing relays in the various text fixtures described herein may advantageously allow electrical power to be multiplexed to the appropriate loads for a given sample. The multiplexing may be achieved using relays, which may also be referred to herein as backfeeds. These backfeed relays may prevent current from flowing in an unwanted direction (e.g., back to a power source of a test fixture through another test sample). For example, the backfeed relays may prevent current from flowing in an unwanted direction as the load current is connected through a normally open contact of a backfeed relay. In various embodiments the backfeed relays may be used for current carrying and not used for breaking any load. The multiplexing may also provide a way to reduce a total number of loads used to test multiple samples through load sharing, as further discussed herein.

Figure 2:
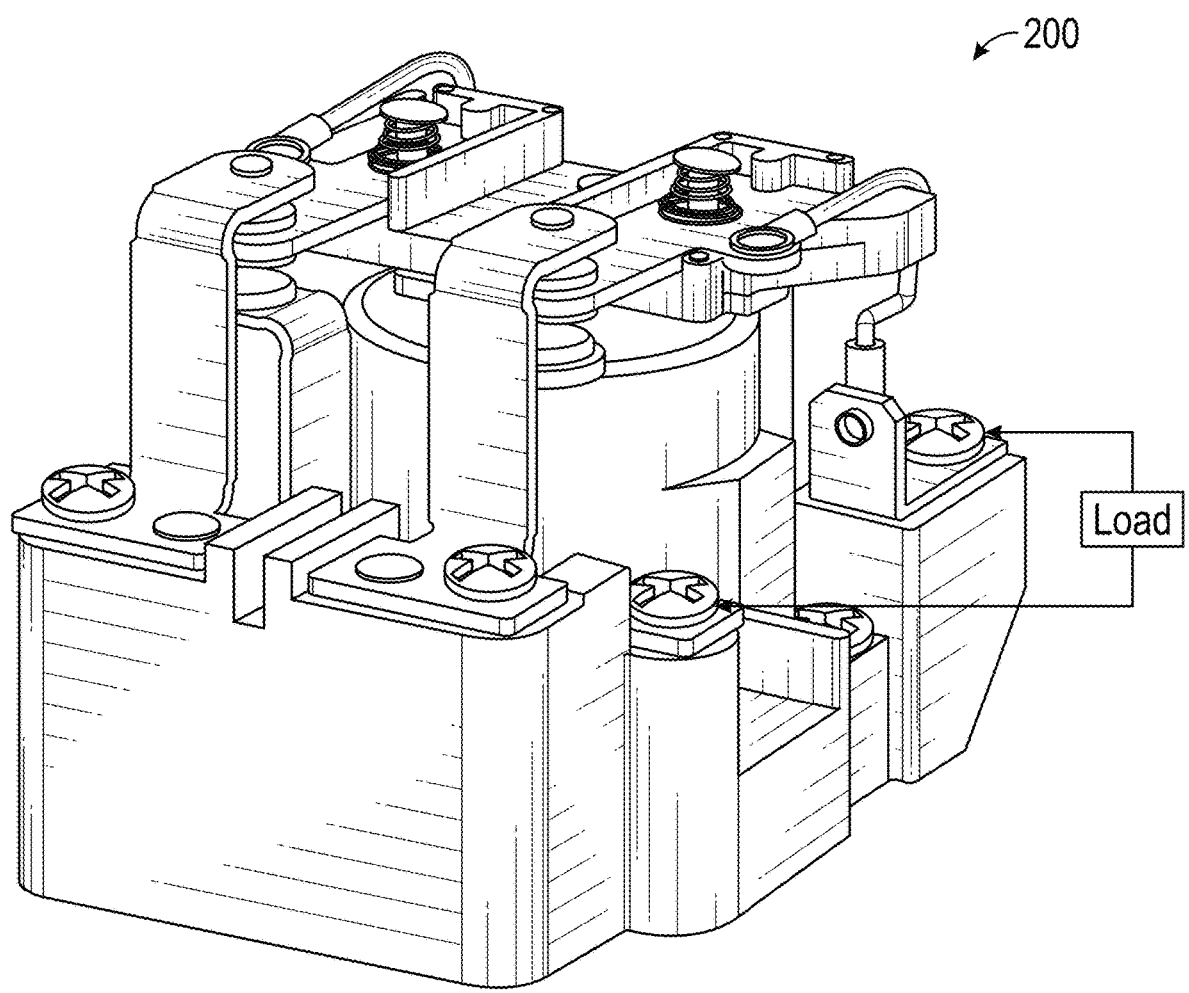
FIG. 2 is a diagrammatic view of an electrical component that may be tested, in embodiments.
Figure 3:
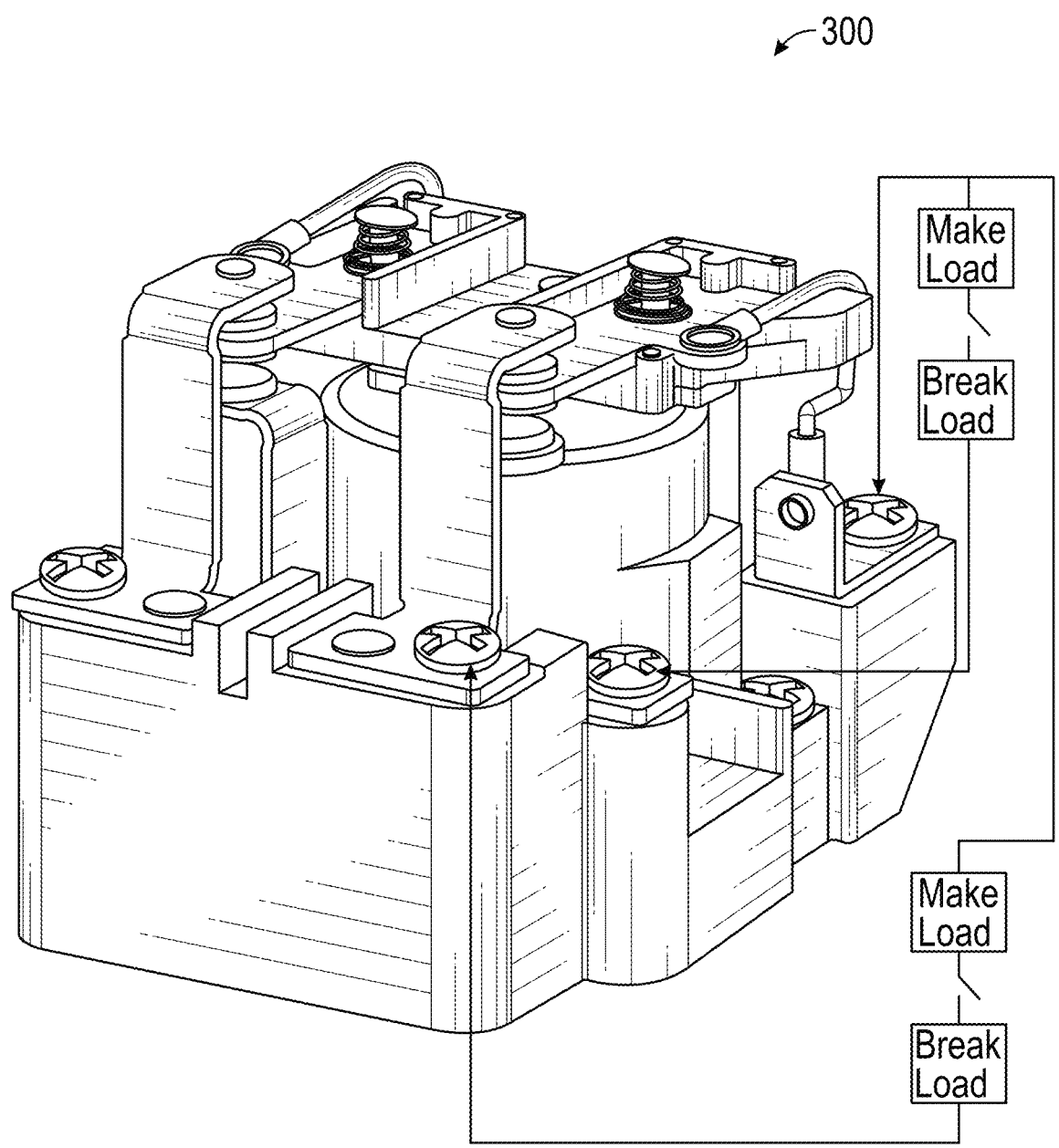
FIG. 3 is a diagrammatic view of another electrical component that may be tested, in embodiments.

FIG. 1 illustrates an example enclosure 160 in which an electrical device (e.g., sample, device under test (DUT)) may be tested. The example enclosure may include a user interface 170, which may also be referred to herein as a human machine interface (HMI). A door 180 may open so that the inside may be accessed for servicing. The enclosure 160 may further include electrical equipment, such as that shown in any one of or any combination of FIGS. 4 and 5-8. FIG. 2 illustrates an electrical component 200 (e.g., sample, device under test (DUT)) that may be tested in an external oven/environmental chamber. The electrical component 200 is a switch and demonstrates how the switch may be connected to a load when in a typical use. FIG. 3 illustrates another electrical component 300 similar to that of FIG. 2, and shows a typical setup of how that switch may be tested in various embodiments with Make and Break loads.

In an example embodiment, the sequencing of testing multiple DUTs in various embodiments described herein is divided up into six identical sections that may be configured in multiple ways to accommodate different sample configurations and test types to perform. This allows the flexibility of testing multiple samples to the same electrical rating, or multiple samples to different electrical ratings. Connections may be made with terminal block jumpers on the rear panel. This example test fixture may therefore advantageously perform testing on the following contact configurations at the same time, and may be either the same type or combinations of different types at once:
1. One, two, or three double throw switches
2. One, two, three, four, five, or six single throw switches of either normally open (NO) or normally closed (NC)
3. One double pole double throw switch
4. Two double pole single throw switches of either NO or NC
5. One three phase double throw switch
6. Two three phase single throw switches of either NO or NC Input Sensing The input sensing to a controller such as a PLC may be accomplished through specially designed universal voltage sensing circuit boards. These boards may sense a wide range of alternating current (AC) and direct current (DC) voltages and provide a constant 24 volts DC (VDC) output to digital inputs of a controller or PLC. The response time of these boards may be on the order of microseconds (µs). This may provide a controller with a very fast response to a closure of a contact/sample under test. The controller may therefore be used to set test sequence control, counting, on time duration, and/or off time duration. A separate universal voltage board may be used to measure the make inrush current time of each contact.

In various embodiments, there may be current sensing switches that are on each break line. These provide the ability to count when load sharing with a resistive or motor test as the load voltage may never drop low enough to indicate a change in state.

Timing

For accurate timing throughout the duration of the test a special watchdog timer may be used. This prevents timing drift in the controller or PLC scan rate. This timer may be driven from a PLC internal 10 Hertz (Hz) asynchronous clock. Every positive rising edge of the 10 Hz clock increases a counter block up by one count. The programmed value of the counter may be set to 100 counts. Given the period of a 10 Hz signal is 100 milliseconds (ms) multiplied by the 100 counts gives a total duration of ten seconds with 100 ms steps. Once the counter reaches 100 counts the output changes states and uses an internal memory bit to reset the counter back to zero. Due to the asynchronous nature of the 10 Hz clock this timing may not be affected by the PLC scan rate. The output count may then be used in the test sequence program blocks. Where count 1=100 ms, count 2=200 ms, etc., for example. The PLC outputs may then be set and reset in sequence with an equals comparator statement.

To adequately catch the short duration of the make load a PLC pulse train output (PTO) and high-speed counter input may be used. This provides accurate timing of the make load duration to conform with standard requirements. This may be handled through a PTO to DC circuit board. This board may include six DC to DC solid state relays (one for each contact and/or sample). The output of each make universal voltage input board may be connected to the DC input of a solid state relay (SSR). A SSR DC transistor output may be connected to a 10 kilohertz (kHz) 50% duty cycle pulse train output from the PLC. This may then be connected to a special high-speed counter input on the PLC. This may provide a tighter tolerance of time when the digital input is "on" or high. The high-speed counter PLC block may then convert the pulse counts to a time in milliseconds. This time may then be compared to check to make sure the value is within a predetermined or standard requirement.

Error Handling and Safety Shutdown

The PLC may also provide for supervisory control over process errors and safety shutdown errors. The PLC may be configured to monitor the on-time of each contact and/or sample. If this on-time exceeds a predetermined time an alarm may be triggered and output via a user interface. This alarm may also trigger integrated shutdown relays (e.g., relays 2, 10, and 18 of FIGS. 4 and 7 while testing double throws samples; relays 2, 7, 12, 17, 22, and 27 of FIGS. 6 and 8 while testing single throw samples). Each contact may be independently controlled so the shutdown of one sample does not affect the others while they continue to run.

Oven Control

For International Electrotechnical Commission (IEC) testing requirements, for example, the first 50% of test cycles are to be performed at room temperature, and the second 50% of test cycles are to be performed at a maximum or minimum rated temperature. An integrated contactor and thermocouple PLC module may provide control over an external oven or environmental chamber. If more than one sample is being tested to the same temperature the PLC may control the system such that all samples have achieved the required 50% of test cycles before powering the oven (or before powering down the oven if heated cycles are performed first). If a sample has fallen behind (e.g., due to error) the PLC may stop testing the other samples at the 50% point and wait until the other sample(s) have caught up. Testing may also be halted while the oven/chamber reaches its set point (or cools down to a room temperature), and the temperature stabilizes. Then the PLC will restart the test to complete the remaining 50% of test cycles on all samples.

Test Background

In overload and/or endurance testing there may be four basic types of tests:
1. Make & Break
2. Pilot Duty AC or DC
3. Motor (locking rotor amps (LRA)/full load amps (FLA))
4. Resistive AC or DC Each type of overload and/or endurance testing may have its own specific load ratings and requirements.

A Make & Break test is intended to simulate an AC motor load. The test starts with a "make" load current inrush for a time between 50 ms to 100 ms (standard requirement), then change-over to a "break" load. This is intended to simulate the contact under test to "make" the current inrush to start a motor, and "break" the steady state or running current of a motor. This make to break change-over is performed every contact cycle during a Make & Break test.

A Pilot Duty test is intended to simulate a moving armature load (e.g., a solenoid, a contactor). There is a 10× (ten times) current inrush and then change to a steady state current like a make & break test.

A Motor load test is intended to simulate a locked rotor amps (LRA) rating of a motor, and a full load amps (FLA) rating of a motor. The overload will be at the LRA current, and the endurance will be at the FLA current.

A Resistive test is intended to simulate a predominately resistive load like a heating element.

In various embodiments described herein, fixture sequencing for Make & Break and Pilot Duty testing may be grouped together in a same test block as they behave the same despite their rating differences. The same applies for Motor and Resistive tests, which may also be grouped together. As such, the embodiments described herein may be advantageously used and programmed to reduce the complexity of a system for performing these various tests on samples and may significantly simplify programming of a system for performing these various tests.

In addition, the Motor and Resistive test sequence may be or may utilize a same or similar logic as that used for testing a DC Resistive or Pilot Duty test.

Program Sequence Background

In various embodiments, non-transitory computer readable instructions stored on a memory and executed by a processor may be used to set up and control a testing apparatus. For example, where a PLC is used, its PLC program may be configured to have separate test sequence blocks, and these blocks may be selected by a user making user selections during test setup on a human-machine interface (HMI) (e.g., a touchscreen or other display/interface in communication with a PLC or other controller/processor). In these blocks, control of the PLC outputs may be based on a mix of fixed timings and physical inputs. The fixed timings keep the sequencing synced between samples, and the physical inputs react to sample contact changes of state.

Figure 5:
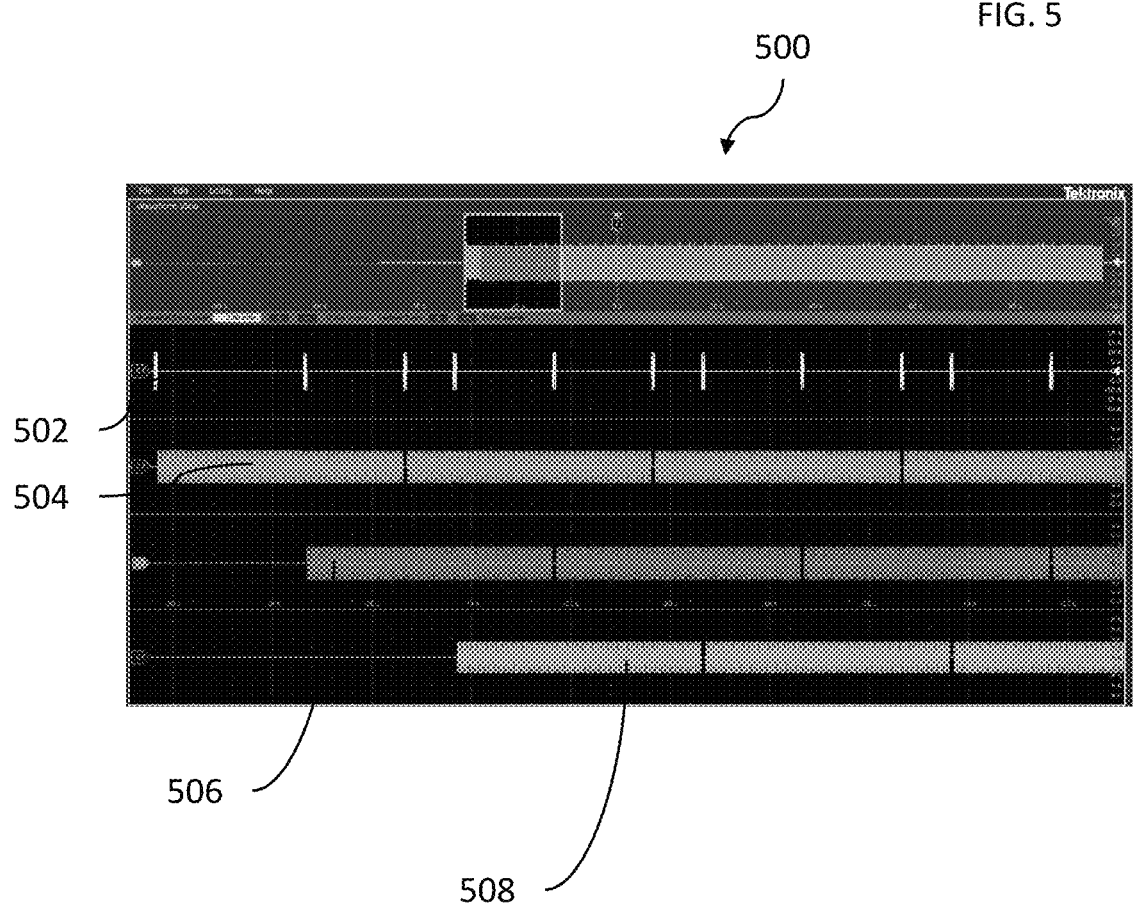
FIG. 5 is a graph illustrating oscilloscope waveforms of example testing apparatuses in various states over time, in embodiments.

For double throw samples, for example, the normally closed (NC) contacts are already closed so the normally open (NO) contacts may be tested first on each sample. On the first cycle the sequence staggers the starting of each relay sample under test by three seconds. The staggering allows only one make current to happen at a time, thus allowing the use of only one make load instead of three separate loads. Because only one contact is carrying current at one time with a double throw sample this allows the break loads to be shared as one load. For example, Sample 1 is at time zero seconds, sample 2 is at time three seconds, and sample 3 is at time six seconds. FIG. 5 demonstrates oscilloscope waveforms that outlines this time sequence, the individual make events are shown as waveform 502 (channel 1). Sample 1 break current is shown as waveform 504 (channel 2), Sample 2 break current is shown as waveform 506 (channel 3), and Sample 3 break current is shown as waveform 508 (channel 4).

For Make & Break and Pilot Duty tests on a double throw sample when the DUT contact closes multiple things happen. First, the NO Break Backfeed turns on to provide a complete the path to the Break load. At the rising edge of the DUT voltage input of the NO contact a timer in the PLC program is started to allow a delay from sample contact closure to the NO Make/Break relay turning on. In this example, the timer is programmed for 32 ms. This delay combined with the propagation delay within the PLC system as well as the propagation delay in the Make/Break relay itself to provide a make load duration of approximately 70 ms to 80 ms. This allows deviation plus or minus and still stay within standard requirements. On the falling edge of the DUT voltage input of the NC contact from the previous cycle both the NC Break Backfeed relay and NC Make/Break relay are reset. This is to make sure that the DUT contact breaks the load circuit and not a relay inside the test fixture.

For overload tests on double throw samples the contacts are tested separately with the NO contacts first, then the NC contacts are tested. There is logic in the PLC program (or other instructions executed by a processor) to automatically make this switch from NO contact testing to NC contact testing.

For overload and endurance tests on single throw samples the contacts are tested all at once. During test setup the user tells the program which samples are normally open and which samples are normally closed on the HMI screen. This adjusts which sequence the PLC uses to activate the samples.

Program Sequences

Figure 4:
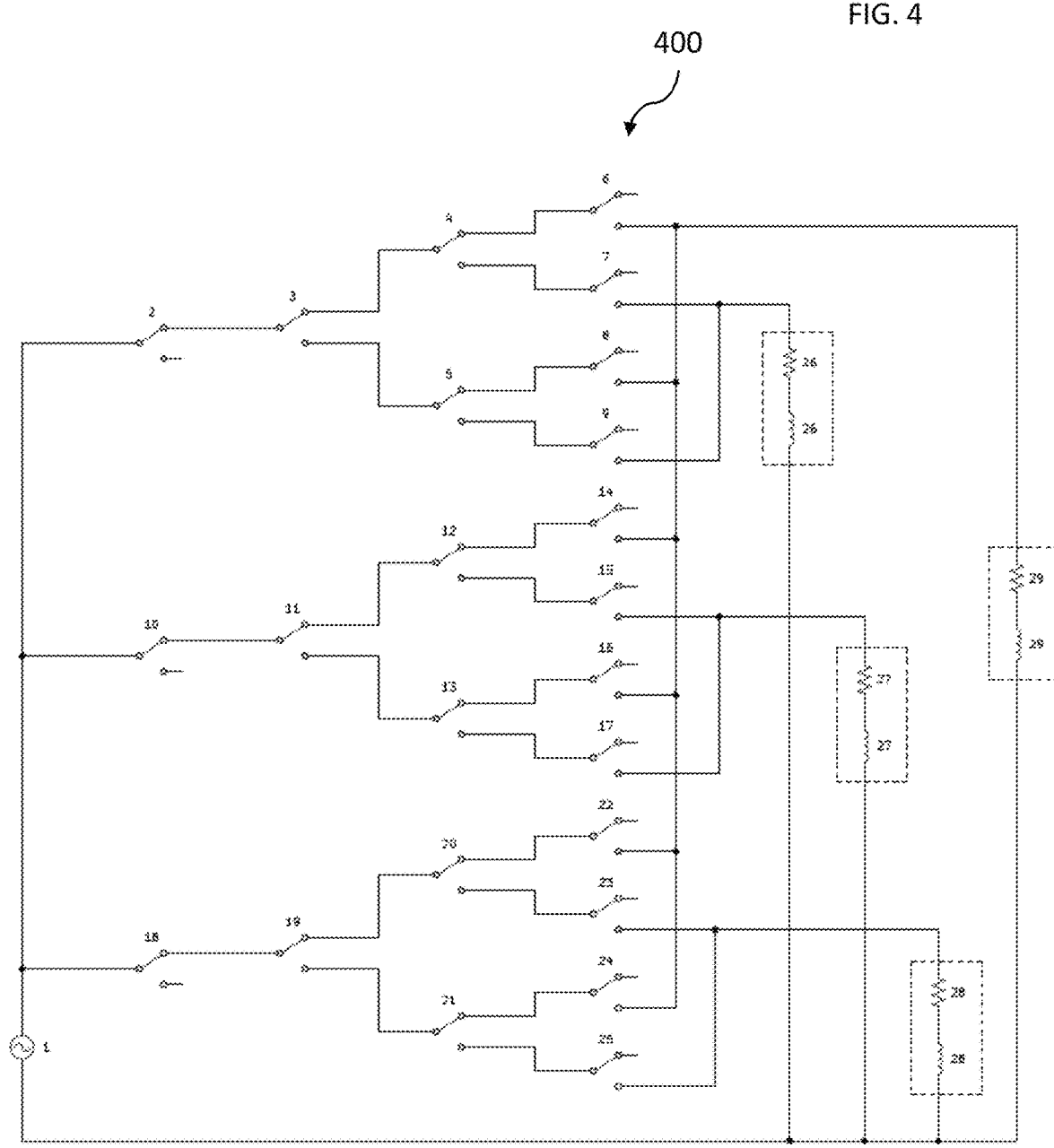
FIGS. 4 and 6-8 are schematic wiring diagrams of example testing apparatuses in various states, in embodiments.
Figure 6:
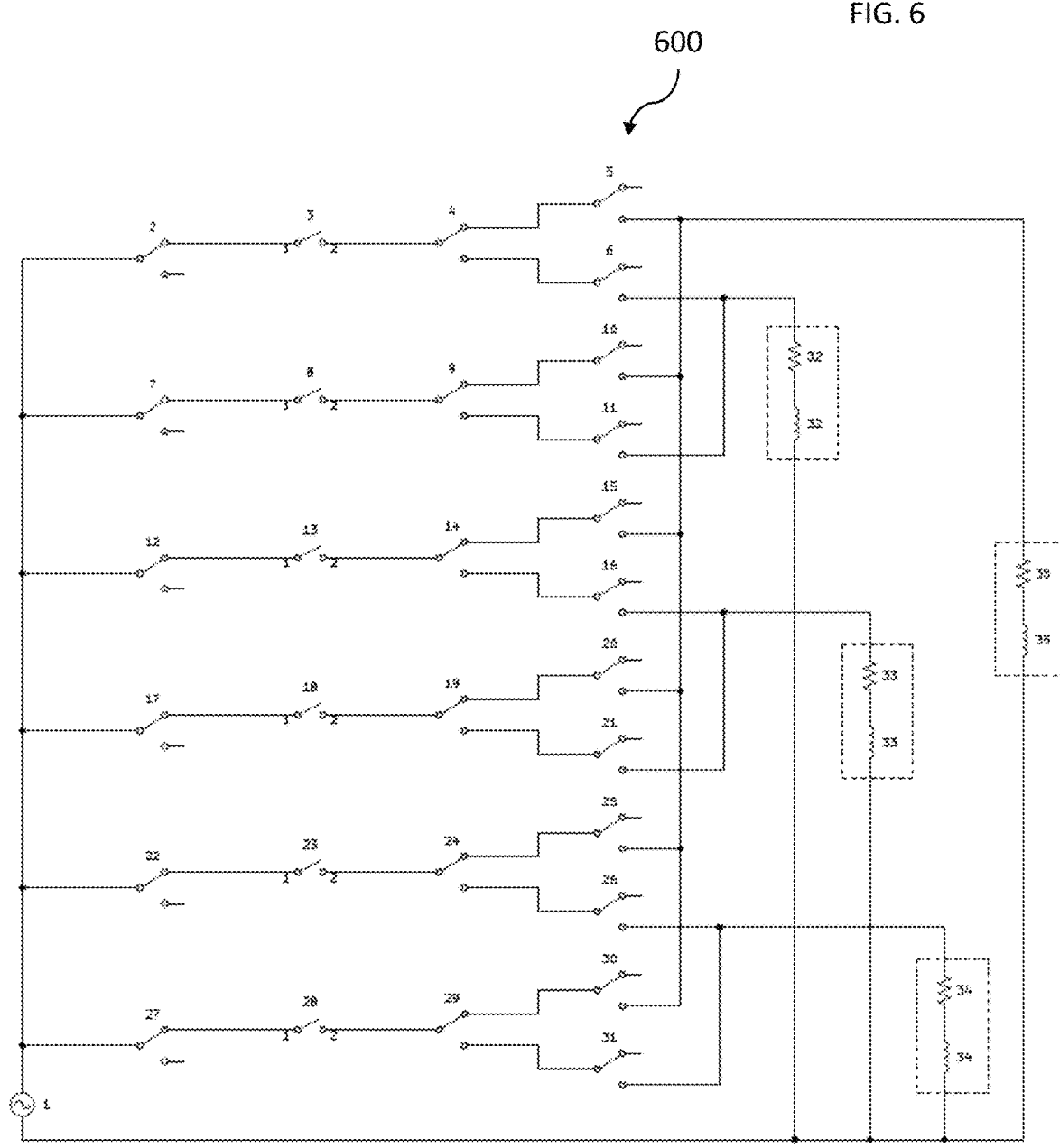
Figure 7:
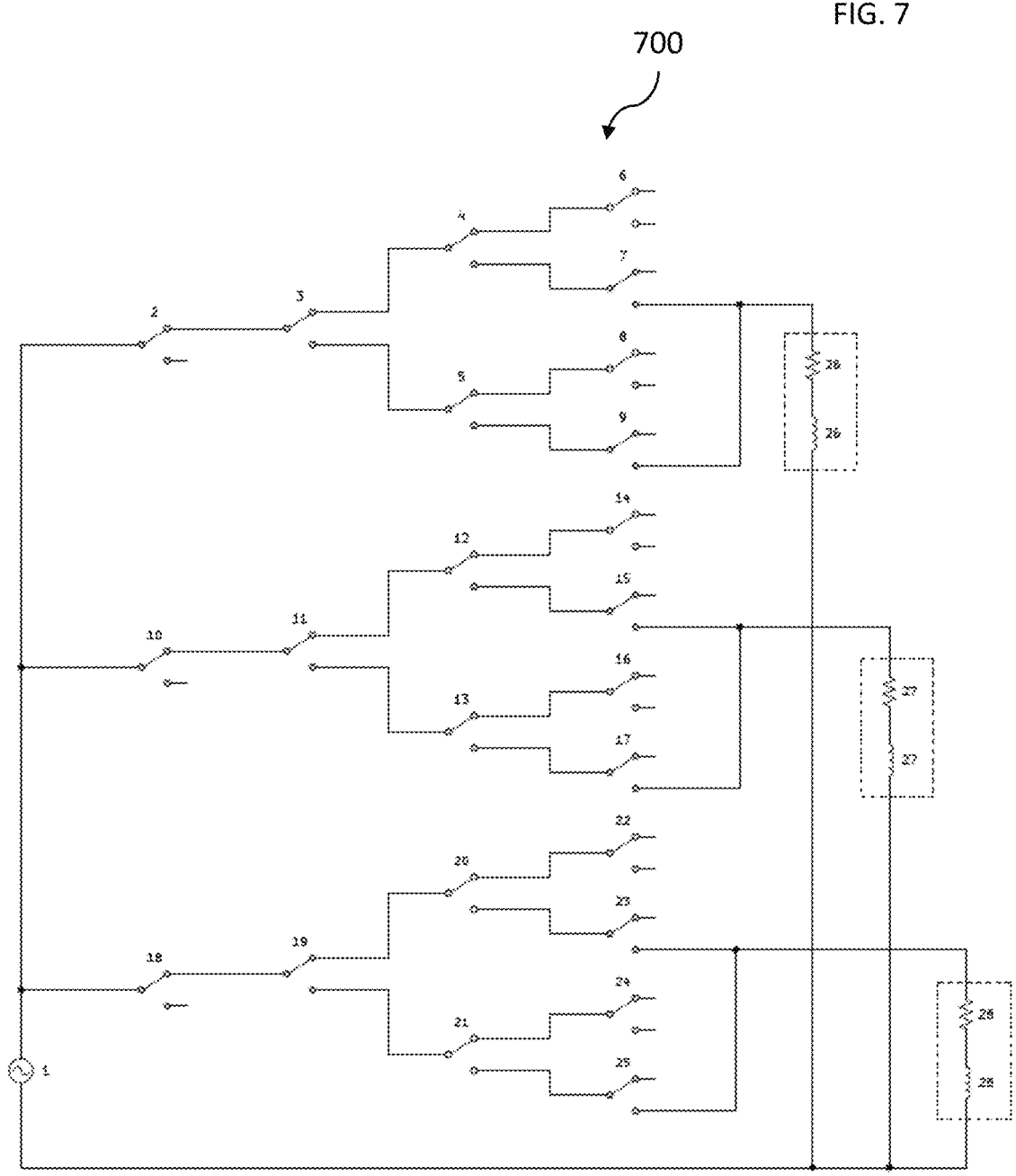

FIGS. 4 and 6-8 show different configurations of a test apparatus that may be used to test various types of DUTs/samples/switches as described herein. Although FIGS. 4 and 6-8 vary somewhat from one another, each of the setups shown in FIGS. 4 and 6-8 may be advantageously implemented using the same test apparatus. For example, FIGS. 4 and 7 are similar, and those setups may be used to test three double throw relay samples (shown at elements 3, 11, and 19). The difference between the setups in FIGS. 4 and 7 is that the load 29 and the relays 6, 8, 14, 16, 22, and 24 may not be used in the setup of FIG. 7 while those components are used in the setup of FIG. 4. As such, the tests run and described below with respect to FIGS. 4 and 7 may use the same equipment in a test apparatus, but not all of the components are necessarily used for each test. That is, the test apparatuses described herein may advantageously be used to perform each type of test described herein with respect to FIGS. 4 and 7.

Figure 8:
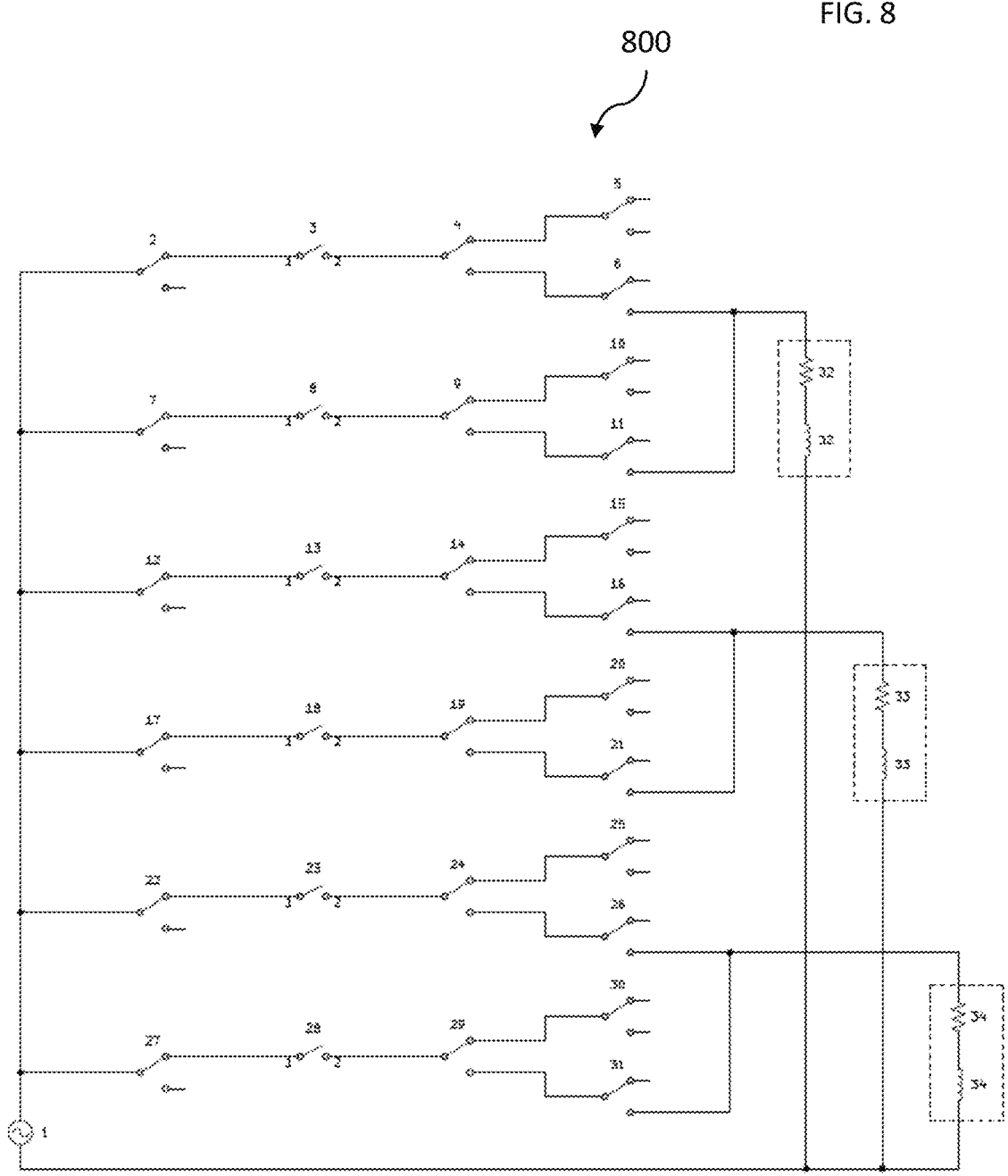

FIGS. 6 and 8 are also similar to one another, and these setups may be used to test six single throw relay samples (shown at elements 3, 8, 13, 18, 23, and 28 of FIGS. 6 and 8). The difference between the setups in FIGS. 6 and 8 is that the load 35 and the relays 5, 10, 15, 20, 25, and 30 may not be used in the setup of FIG. 8 while those components are used in the setup of FIG. 6. As such, the tests run and described below with respect to FIGS. 6 and 8 may use the same equipment in a test apparatus, but not all of the components are necessarily used for each test. That is, the test apparatuses described herein may advantageously be used to perform each type of test described herein with respect to FIGS. 6 and 8.

Furthermore, each of the tests described herein with respect to each of FIGS. 4 and 6-8 may be performed with the same equipment/components of a single test apparatus as described herein. For example, the embodiments in FIGS. 4/7 may have the same test equipment as FIGS. 6/8, the setups just appear different in the figures due to how the samples/DUTs are hooked up to those components. For example, instead of a double throw switch at element 3 in FIG. 4 that connects safety switch 2 to relays 4 and 5, in FIG. 6 that double throw switch at element 3 in FIG. 4 is replaced by single throw switches at elements 3 and 8. Note that additional safety switches may further be provided so that each of the samples/DUTs is connected to its own safety switch regardless of which test is being run in any of the configurations. As such, a test apparatus with all of the components shown in FIG. 6, for example, may be advantageously used to implement any of the tests shown in and described with respect to any of FIGS. 4 and 6-8.

The following outlines an example sequence of operation for an AC Make & Break or Pilot Duty overload test on three double throw relay samples utilizing the normally open (NO) contacts, as shown in the examples of FIG. 4 and FIG. 5. A power source 1 is shown in FIG. 4 to supply power to the three samples being tested, which are depicted in FIG. 4 at relays 3, 11, and 19.

Referring to FIG. 4, at time 0 ms Sample 1 NO Make Backfeed (relay 8) is turned on. This is done before the device under test (DUT) is activated to allow a complete path to the Make load (load 29). At time 100 ms Sample 1 DUT (relay 3) is turned on. On the rising edge of the DUT voltage input Sample 1 NO Break Backfeed (relay 9) turns on. After the 32 ms delay Sample 1 NO Make/Break (relay 5) turns on to change-over from the Make load (load 29) via relay 8 to the Break load (load 26) via relay 9. To allow sufficient time for the make current duration Sample 1 NO Make Backfeed (relay 8) is turned back off at time 500 ms. At 1100 ms Sample 1 DUT turns back off (relay 3) completing the one second contact on time. On the falling edge of the NO contact DUT voltage input both Sample 1 NO Break Backfeed (relay 9) and Sample 1 NO Make/Break (relay 5) are turned off.

At time 3000 ms Sample 2 NO Make Backfeed (relay 16) is turned on to connect relay 16 to Make load 29. At time 3100 ms Sample 2 DUT (relay 11) is turned on. On the rising edge of the DUT voltage input Sample 2 NO Break Backfeed (relay 17) turns on to connect relay 17 to the Break load 27. After the 32 ms delay Sample 2 NO Make/Break (relay 13) turns on to change-over from the Make load (load 29) to the Break load (load 27). To allow sufficient time for the make current duration Sample 2 NO Make Backfeed (relay 16) is turned off at time 3500 ms. At 4100 ms Sample 2 DUT turns off (relay 11) completing the one second contact on time. On the falling edge of the NO contact DUT voltage input both Sample 2 NO Break Backfeed (relay 17) and Sample 2 NO Make/Break (relay 13) are turned off.

At time 6000 ms Sample 3 NO Make Backfeed (relay 24) is turned on to connect relay 24 to Make load 29. At time 6100 ms Sample 3 DUT (relay 19) is turned on. On the rising edge of the DUT voltage input Sample 3 NO Break Backfeed (relay 25) turns on to connect relay 25 to the Break Load 28. After the 32 ms delay Sample 3 NO Make/Break (relay 21) turns on to change-over from the Make load (load 29) to the Break load (load 28). To allow sufficient time for the make current duration Sample 3 NO Make Backfeed (relay 24) is turned off at time 6500 ms. At 7100 ms Sample 3 DUT turns off (relay 19) completing the one second contact on time. On the falling edge of the NO contact DUT voltage input both Sample 3 NO Break Backfeed (relay 25) and Sample 3 NO Make/Break (relay 21) are turned off.

The chronological order of operations for an AC Make & Break or Pilot Duty overload test on three double throw relay samples utilizing the normally open (NO) contacts using the test apparatus shown in FIG. 4 is outlined in Table 1 below. This sequence may be repeated as many times as desired or as called for to complete standard tests for the three double throw relays being tested (e.g., the sample DUTs at 3, 11, and 19 of FIG. 4).

TABLE 1

| Time (ms) | Output | Identifier | State |
|---|---|---|---|
| 0 | Sample 1 NO Make Backfeed | 8 | Set |
| 100 | Sample 1 DUT | 3 | Set |
| 1NO Input↑ | Sample 1 NO Break Backfeed | 9 | Set |
| 132 | Sample 1 NO Make/Break | 5 | Set |
| 500 | Sample 1 NO Make Backfeed | 8 | Reset |
| 1100 | Sample 1 DUT | 3 | Reset |
| 1NO Input↓ | Sample 1 NO Break Backfeed | 9 | Reset |
| 1NO Input↓ | Sample 1 NO Make/Break | 5 | Reset |
| 3000 | Sample 2 NO Make Backfeed | 16 | Set |
| 3100 | Sample 2 DUT | 11 | Set |
| 2NO Input↑ | Sample 2 NO Break Backfeed | 17 | Set |
| 3132 | Sample 2 NO Make/Break | 13 | Set |
| 3500 | Sample 2 NO Make Backfeed | 16 | Reset |
| 4100 | Sample 2 DUT | 11 | Reset |
| 2NO Input↓ | Sample 2 NO Break Backfeed | 17 | Reset |
| 2NO Input↓ | Sample 2 NO Make/Break | 13 | Reset |
| 6000 | Sample 3 NO Make Backfeed | 24 | Set |
| 6100 | Sample 3 DUT | 19 | Set |
| 3NO Input↑ | Sample 3 NO Break Backfeed | 25 | Set |
| 6132 | Sample 3 NO Make/Break | 21 | Set |
| 6500 | Sample 3 NO Make Backfeed | 24 | Reset |
| 7100 | Sample 3 DUT | 19 | Reset |
| 3NO Input↓ | Sample 3 NO Break Backfeed | 25 | Reset |
| 3NO Input↓ | Sample 3 NO Make/Break | 21 | Reset |

The following outlines the sequence of operation for an AC Make & Break or Pilot Duty overload test on three double throw relay samples (3, 11, and 19 in FIG. 4) utilizing the normally closed (NC) contacts, as shown in the examples of FIG. 4 and FIG. 5.

At time 0 ms Sample 1 DUT (relay 3) is turned on to open the NC contact. This is done before the NC Make Backfeed is activated to allow a complete path to the Make load (load 29). At time 100 ms Sample 1 NC Make Backfeed (relay 6) is turned on. At time 200 ms Sample 1 DUT (relay 3) is turned off turning the NC contact on. On the rising edge of the DUT voltage input Sample 1 NC Break Backfeed (relay 7) turns on. After the 32 ms delay Sample 1 NC Make/Break (relay 4) turns on to change-over from the Make load (load 29) to the Break load (load 26). To allow sufficient time for the make current duration Sample 1 NC Make Backfeed (relay 6) is turned off at time 600 ms. At 1200 ms Sample 1 DUT (relay 3) turns on opening the NC contact completing the one second contact on time. On the falling edge of the NC contact DUT voltage input both Sample 1 NC Break Backfeed (relay 7) and Sample 1 NC Make/Break (relay 4) are turned off.

At time 3000 ms Sample 2 DUT (relay 11) is turned on to open the NC contact. At time 3100 ms Sample 2 NC Make Backfeed (relay 14) is turned on to connect relay 14 to Make load 29. At time 3200 ms Sample 2 DUT (relay 11) is turned off turning the NC contact on. On the rising edge of the DUT voltage input Sample 2 NC Break Backfeed (relay 15) turns on to connect relay 15 to the Break load 27. After the 32 ms delay Sample 2 NC Make/Break (relay 12) turns on to change-over from the Make load (load 29) to the Break load (load 27). To allow sufficient time for the make current duration Sample 2 NC Make Backfeed (relay 14) is turned off at time 3600 ms. At 4200 ms Sample 2 DUT (relay 11) turns on opening the NC contact completing the one second contact on time. On the falling edge of the NC contact DUT voltage input both Sample 2 NC Break Backfeed (relay 15) and Sample 2 NC Make/Break (relay 12) are turned off.

At time 6000 ms Sample 3 DUT (relay 19) is turned on to open the NC contact. At time 6100 ms Sample 3 NC Make Backfeed (relay 22) is turned on to connect relay 22 to Make load 29. At time 6200 ms Sample 3 DUT (relay 19) is turned off turning the NC contact on. On the rising edge of the DUT voltage input Sample 3 NC Break Backfeed (relay 23) turns on to connect relay 23 to the Break load 28. After the 32 ms delay Sample 3 NC Make/Break (relay 20) turns on to change-over from the Make load (load 29) to the Break load (load 28). To allow sufficient time for the make current duration Sample 3 NC Make Backfeed (relay 22) is turned off at time 6600 ms. At 7200 ms Sample 3 DUT (relay 19) turns on opening the NC contact completing the one second contact on time. On the falling edge of the NC contact DUT voltage input both Sample 3 NC Break Backfeed (relay 23) and Sample 3 NC Make/Break (relay 20) are turned off.

The chronological order of operations for an AC Make & Break or Pilot Duty overload test on three double throw relay samples (3, 11, and 19 in FIG. 4) utilizing normally closed (NC) contacts is outlined below in Table 2. This sequence may be repeated as many times as desired or as called for to complete standard tests for given DUTs.

TABLE 2

| Time (ms) | Output | Identifier | State |
|---|---|---|---|
| 0 | Sample 1 DUT | 3 | Set |
| 100 | Sample 1 NC Make Backfeed | 6 | Set |
| 200 | Sample 1 DUT | 3 | Reset |
| 1NC Input↑ | Sample 1 NC Break Backfeed | 7 | Set |
| 232 | Sample 1 NC Make/Break | 4 | Set |
| 600 | Sample 1 NC Make Backfeed | 6 | Reset |
| 1200 | Sample 1 DUT | 3 | Set |
| 1NC Input↓ | Sample 1 NC Break Backfeed | 7 | Reset |
| 1NC Input↓ | Sample 1 NC Make/Break | 4 | Reset |
| 3000 | Sample 2 DUT | 11 | Set |
| 3100 | Sample 2 NC Make Backfeed | 14 | Set |
| 3200 | Sample 2 DUT | 11 | Reset |
| 2NC Input↑ | Sample 2 NC Break Backfeed | 15 | Set |
| 3232 | Sample 2 NC Make/Break | 12 | Set |
| 3600 | Sample 2 NC Make Backfeed | 14 | Reset |
| 4200 | Sample 2 DUT | 11 | Set |
| 2NC Input↓ | Sample 2 NC Break Backfeed | 15 | Reset |
| 2NC Input↓ | Sample 2 NC Make/Break | 12 | Reset |
| 6000 | Sample 3 DUT | 19 | Set |
| 6100 | Sample 3 NC Make Backfeed | 22 | Set |
| 6200 | Sample 3 DUT | 19 | Reset |
| 3NC Input↑ | Sample 3 NC Break Backfeed | 23 | Set |
| 6232 | Sample 3 NC Make/Break | 20 | Set |
| 6600 | Sample 3 NC Make Backfeed | 22 | Reset |
| 7200 | Sample 3 DUT | 19 | Set |
| 3NC Input↓ | Sample 3 NC Break Backfeed | 23 | Reset |
| 3NC Input↓ | Sample 3 NC Make/Break | 20 | Reset |

The following outlines the sequence of operation for an AC Make & Break or Pilot Duty endurance test on three double throw relay samples, referencing FIGS. 4 and 5.

At time 0 ms Sample 1 NO Make Backfeed (relay 8) is turned on. This is done before the device under test (DUT) is activated to allow a complete path to the Make load (load 29). At time 100 ms Sample 1 DUT (relay 3) is turned on activating the NO contact and completing the previous five second on time of the NC contact. On the rising edge of the DUT NO contact voltage input Sample 1 NO Break Backfeed (relay 9) turns on. On the falling edge of the DUT NC contact voltage input from the previous cycle both Sample 1 NC Break Backfeed (relay 7) and Sample 1 NC Make/Break (relay 4) are turned off. This is to make sure that the DUT contact breaks the circuit and nothing inside the test fixture. After the 32 ms delay from DUT NO contact voltage input Sample 1 NO Make/Break (relay 5) turns on to change-over from the Make load (load 29) to the Break load (load 26). To allow sufficient time for the make current duration Sample 1 NO Make Backfeed (relay 8) is turned off at time 500 ms. At 5000 ms Sample 1 NC Make Backfeed (relay 6) is turned on to allow the NC contact Make current to pass. At 5100 ms Sample 1 DUT turns off (relay 3) activating the NC contact and completing the five second on time of the NO contact. At this point Sample 1 NC Break Backfeed (relay 7) turns on. On the falling edge of the DUT NO contact voltage input both Sample 1 NO Break Backfeed (relay 9) and Sample 1 NO Make/Break (relay 5) are turned off. After the 32 ms delay from DUT NC contact voltage input Sample 1 NC Make/Break (relay 4) turns on to change-over from the Make load (load 29) to the Break load (load 26). At 5500 ms Sample 1 NC Make Backfeed (relay 6) turns off.

At time 3000 ms Sample 2 NO Make Backfeed (relay 16) is turned on. This is done before the device under test (DUT) is activated to allow a complete path to the Make load (load 29). At time 3100 ms Sample 2 DUT (relay 11) is turned on activating the NO contact and completing the previous five second on time of the NC contact. On the rising edge of the DUT NO contact voltage input Sample 2 NO Break Backfeed (relay 17) turns on. On the falling edge of the DUT NC contact voltage input from the previous cycle both Sample 2 NC Break Backfeed (relay 15) and Sample 2 NC Make/Break (relay 12) are turned off. This is to make sure that the DUT contact breaks the circuit and nothing inside the test fixture. After the 32 ms delay from DUT NO contact voltage input Sample 2 NO Make/Break (relay 13) turns on to change-over from the Make load (load 29) to the Break load (load 27). To allow sufficient time for the make current duration Sample 2 NO Make Backfeed (relay 16) is turned off at time 3500 ms. At 8000 ms Sample 2 NC Make Backfeed (relay 14) is turned on to allow the NC contact make current to pass. At 8100 ms Sample 2 DUT turns off (relay 11) activating the NC contact and completing the five second on time of the NO contact. At this point Sample 2 NC Break Backfeed (relay 15) turns on. On the falling edge of the DUT NO contact voltage input both Sample 2 NO Break Backfeed (relay 17) and Sample 2 NO Make/Break (relay 13) are turned off. After the 32 ms delay from DUT NC contact voltage input Sample 2 NC Make/Break (relay 12) turns on to change-over from the Make load (load 29) to the Break load (load 27). At 8500 ms Sample 2 NC Make Backfeed (relay 14) turns off.

At time 6000 ms Sample 3 NO Make Backfeed (relay 24) is turned on. This is done before the device under test (DUT) is activated to allow a complete path to the Make load (load 29). At time 6100 ms Sample 3 DUT (relay 19) is turned on activating the NO contact and completing the previous five second on time of the NC contact. On the rising edge of the DUT NO contact voltage input Sample 3 NO Break Backfeed (relay 25) turns on. On the falling edge of the DUT NC contact voltage input from the previous cycle both Sample 3 NC Break Backfeed (relay 23) and Sample 3 NC Make/Break (relay 20) are turned off. This is to make sure that the DUT contact breaks the circuit and nothing inside the test fixture. After the 32 ms delay from DUT NO contact voltage input Sample 3 NO Make/Break (relay 21) turns on to change-over from the Make load (load 29) to the Break load (load 28). To allow sufficient time for the make current duration Sample 3 NO Make Backfeed (relay 24) is turned off at time 6500 ms. At 1000 ms Sample 3 NC Make Backfeed (relay 22) is turned on to allow the NC contact make current to pass. At 1100 ms Sample 3 DUT turns off (relay 19) activating the NC contact and completing the five second on time of the NO contact. At this point Sample 3 NC Break Backfeed (relay 23) turns on. On the falling edge of the DUT NO contact voltage input both Sample 3 NO Break Backfeed (relay 25) and Sample 3 NO Make/Break (relay 21) are turned off. After the 32 ms delay from DUT NC contact voltage input Sample 3 NC Make/Break (relay 20) turns on to change-over from the Make load (load 29) to the Break load (load 28). At 1500 ms Sample 3 NC Make Backfeed (relay 22) turns off.

The chronological order of operations for an AC Make & Break or Pilot Duty endurance test on three double throw relay samples using the test apparatus of FIG. 4 is outlined below in Table 3. This sequence may be repeated as many times as desired or as called for to complete standard tests for given DUTs.

TABLE 3

| Time (ms) | Output | Identifier | State |
|---|---|---|---|
| 0 | Sample 1 NO Make Backfeed | 8 | Set |
| 100 | Sample 1 DUT | 3 | Set |
| 1NO Input↑ | Sample 1 NO Break Backfeed | 9 | Set |
| 1NC Input↓ | Sample 1 NC Break Backfeed | 7 | Reset |
| 1NC Input↓ | Sample 1 NC Make/Break | 4 | Reset |
| 132 | Sample 1 NO Make/Break | 5 | Set |
| 500 | Sample 1 NO Make Backfeed | 8 | Reset |
| 1000 | Sample 3 NC Make Backfeed | 22 | Set |
| 1100 | Sample 3 DUT | 19 | Reset |
| 3NC Input↑ | Sample 3 NC Break Backfeed | 23 | Set |
| 3NO Input↓ | Sample 3 NO Break Backfeed | 25 | Reset |
| 3NO Input↓ | Sample 3 NO Make/Break | 21 | Reset |
| 1132 | Sample 3 NC Make/Break | 20 | Set |
| 1500 | Sample 3 NC Make Backfeed | 22 | Reset |
| 3000 | Sample 2 NO Make Backfeed | 16 | Set |
| 3100 | Sample 2 DUT | 11 | Set |
| 2NO Input↑ | Sample 2 NO Break Backfeed | 17 | Set |
| 2NC Input↓ | Sample 2 NC Break Backfeed | 15 | Reset |
| 2NC Input↓ | Sample 2 NC Make/Break | 12 | Reset |
| 3132 | Sample 2 NO Make/Break | 13 | Set |
| 3500 | Sample 2 NO Make Backfeed | 16 | Reset |
| 5000 | Sample 1 NC Make Backfeed | 6 | Set |
| 5100 | Sample 1 DUT | 3 | Reset |
| 1NC Input↑ | Sample 1 NC Break Backfeed | 7 | Set |
| 1NO Input↓ | Sample 1 NO Break Backfeed | 9 | Reset |
| 1NO Input↓ | Sample 1 NO Make/Break | 5 | Reset |
| 5132 | Sample 1 NC Make/Break | 4 | Set |
| 5500 | Sample 1 NC Make Backfeed | 6 | Reset |
| 6000 | Sample 3 NO Make Backfeed | 24 | Set |
| 6100 | Sample 3 DUT | 19 | Set |
| 3NO Input↑ | Sample 3 NO Break Backfeed | 25 | Set |
| 3NC Input↓ | Sample 3 NC Break Backfeed | 23 | Reset |
| 3NC Input↓ | Sample 3 NC Make/Break | 20 | Reset |
| 6132 | Sample 3 NO Make/Break | 21 | Set |
| 6500 | Sample 3 NO Make Backfeed | 24 | Reset |
| 8000 | Sample 2 NC Make Backfeed | 14 | Set |
| 8100 | Sample 2 DUT | 11 | Reset |
| 2NC Input↑ | Sample 2 NC Break Backfeed | 15 | Set |
| 2NO Input↓ | Sample 2 NO Break Backfeed | 17 | Reset |
| 2NO Input↓ | Sample 2 NO Make/Break | 13 | Reset |
| 8132 | Sample 2 NC Make/Break | 12 | Set |
| 8500 | Sample 2 NC Make Backfeed | 14 | Reset |

The following outlines the sequence of operation for an AC Make & Break or Pilot Duty overload test on six single throw relay samples, referencing the test apparatus shown in FIG. 6.

For single throw samples they may be of NO type or NC type, selection is done during test setup on the HMI. Since any sample may be NO or NC the logic to handle both types are in place at the same time for each sample.

If Sample 1 is a NC contact at time 0 ms Sample 1 DUT (relay 3) is turned on to open the NC contact. This is done before the device under test activates the load allow a complete path to the Make load (load 35). At time 100 ms Sample 1 Make Backfeed (relay 5) is turned on. At time 200 ms one of two actions can happen depending on if the sample is NO or NC. If the sample is NO Sample 1 DUT (relay 3) turns on to close the NO contact. If the sample is NC, then Sample 1 DUT (relay 3) is turned off to close the NC contact. On the rising edge of the DUT contact voltage input Sample 1 Break Backfeed (relay 6) turns on. After the 32 ms delay from DUT contact voltage input Sample 1 Make/Break (relay 4) turns on to change-over from the Make load (load 35) to the Break load (load 32). To allow sufficient time for the make current duration Sample 1 Make Backfeed (relay 5) is turned off at time 600 ms. At 1200 ms if the sample is NO then Sample 1 DUT (relay 3) is turned off to open the NO contact. If the sample is NC, then Sample 1 DUT (relay 3) is turned on to open the NC contact. This completes the contacts one second on time. On the falling edge of the contact DUT voltage input both Sample 1 Break Backfeed (relay 6) and Sample 1 Make/Break (relay 4) are turned off.

If Sample 2 is a NC contact at time 1500 ms Sample 2 DUT (relay 8) is turned on to open the NC contact. This is done before the device under test activates the load to allow a complete path to the Make load (load 35). At time 1600 ms Sample 2 Make Backfeed (relay 10) is turned on. At time 1700 ms one of two actions can happen depending on if the sample is NO or NC. If the sample is NO Sample 2 DUT (relay 8) turns on to close the NO contact. If the sample is NC, then Sample 2 DUT (relay 8) is turned off to close the NC contact. On the rising edge of the DUT contact voltage input Sample 2 Break Backfeed (relay 11) turns on. After the 32 ms delay from DUT contact voltage input Sample 2 Make/Break (relay 9) turns on to change-over from the Make load (load 35) to the Break load (load 32). To allow sufficient time for the make current duration Sample 2 Make Backfeed (relay 10) is turned off at time 2100 ms. At 2700 ms if the sample is NO then Sample 2 DUT (relay 8) is turned off to open the NO contact. If the sample is NC, then Sample 2 DUT (relay 8) is turned on to open the NC contact. This completes the contacts one second on time. On the falling edge of the contact DUT voltage input both Sample 2 Break Backfeed (relay 11) and Sample 2 Make/Break (relay 9) are turned off.

If Sample 3 is a NC contact at time 3000 ms Sample 3 DUT (relay 13) is turned on to open the NC contact. This is done before the device under test activates the load to allow a complete path to the Make load (load 35). At time 3100 ms Sample 3 Make Backfeed (relay 15) is turned on. At time 3200 ms one of two actions can happen depending on if the sample is NO or NC. If the sample is NO Sample 3 DUT (relay 13) turns on to close the NO contact. If the sample is NC, then Sample 3 DUT (relay 13) is turned off to close the NC contact. On the rising edge of the DUT contact voltage input Sample 3 Break Backfeed (relay 16) turns on. After the 32 ms delay from DUT contact voltage input Sample 3 Make/Break (relay 14) turns on to change-over from the Make load (load 35) to the Break load (load 33). To allow sufficient time for the make current duration Sample 3 Make Backfeed (relay 15) is turned off at time 3600 ms. At 4200 ms if the sample is NO then Sample 3 DUT (relay 13) is turned off to open the NO contact. If the sample is NC, then Sample 3 DUT (relay 13) is turned on to open the NC contact. This completes the contacts one second on time. On the falling edge of the contact DUT voltage input both Sample 3 Break Backfeed (relay 16) and Sample 3 Make/Break (relay 14) are turned off.

If Sample 4 is a NC contact at time 4500 ms Sample 4 DUT (relay 18) is turned on to open the NC contact. This is done before the device under test activates the load to allow a complete path to the Make load (load 35). At time 4600 ms Sample 4 Make Backfeed (relay 20) is turned on. At time 4700 ms one of two actions can happen depending on if the sample is NO or NC. If the sample is NO Sample 4 DUT (relay 18) turns on to close the NO contact. If the sample is NC, then Sample 4 DUT (relay 18) is turned off to close the NC contact. On the rising edge of the DUT contact voltage input Sample 4 Break Backfeed (relay 21) turns on. After the 32 ms delay from DUT contact voltage input Sample 4 Make/Break (relay 19) turns on to change-over from the Make load (load 35) to the Break load (load 33). To allow sufficient time for the make current duration Sample 4 Make Backfeed (relay 20) is turned off at time 5100 ms. At 5700 ms if the sample is NO then Sample 4 DUT (relay 18) is turned off to open the NO contact. If the sample is NC, then Sample 4 DUT (relay 18) is turned on to open the NC contact. This completes the contacts one second on time. On the falling edge of the contact DUT voltage input both Sample 4 Break Backfeed (relay 21) and Sample 4 Make/Break (relay 19) are turned off.

If Sample 5 is a NC contact at time 6000 ms Sample 5 DUT (relay 23) is turned on to open the NC contact. This is done before the device under test activates the load to allow a complete path to the Make load (load 35). At time 6100 ms Sample 5 Make Backfeed (relay 25) is turned on. At time 6200 ms one of two actions can happen depending on if the sample is NO or NC. If the sample is NO Sample 5 DUT (relay 23) turns on to close the NO contact. If the sample is NC, then Sample 5 DUT (relay 23) is turned off to close the NC contact. On the rising edge of the DUT contact voltage input Sample 5 Break Backfeed (relay 26) turns on. After the 32 ms delay from DUT contact voltage input Sample 5 Make/Break (relay 24) turns on to change-over from the Make load (load 35) to the Break load (load 34). To allow sufficient time for the make current duration Sample 5 Make Backfeed (relay 25) is turned off at time 6600 ms. At 7200 ms if the sample is NO then Sample 5 DUT (relay 23) is turned off to open the NO contact. If the sample is NC, then Sample 5 DUT (relay 23) is turned on to open the NC contact. This completes the contacts one second on time. On the falling edge of the contact DUT voltage input both Sample 5 Break Backfeed (relay 26) and Sample 5 Make/Break (relay 24) are turned off.

If Sample 6 is a NC contact at time 7500 ms Sample 6 DUT (relay 28) is turned on to open the NC contact. This is done before the device under test activates the load to allow a complete path to the Make load (load 35). At time 7600 ms Sample 6 Make Backfeed (relay 30) is turned on. At time 7700 ms one of two actions can happen depending on if the sample is NO or NC. If the sample is NO Sample 6 DUT (relay 28) turns on to close the NO contact. If the sample is NC, then Sample 6 DUT (relay 28) is turned off to close the NC contact. On the rising edge of the DUT contact voltage input Sample 6 Break Backfeed (relay 31) turns on. After the 32 ms delay from DUT contact voltage input Sample 6 Make/Break (relay 29) turns on to change-over from the Make load (load 35) to the Break load (load 34). To allow sufficient time for the make current duration Sample 6 Make Backfeed (relay 30) is turned off at time 8100 ms. At 8700 ms if the sample is NO then Sample 6 DUT (relay 28) is turned off to open the NO contact. If the sample is NC, then Sample 6 DUT (relay 28) is turned on to open the NC contact. This completes the contacts one second on time. On the falling edge of the contact DUT voltage input both Sample 6 Break Backfeed (relay 31) and Sample 6 Make/Break (relay 29) are turned off.

The chronological order of operations for an AC Make & Break or Pilot Duty overload test on six single throw relay samples using the test apparatus of FIG. 6 is outlined below in Table 4. This sequence may be repeated as many times as desired or as called for to complete standard tests for given DUTs.

TABLE 4

| Time (ms) | Output | Identifier | State |
|---|---|---|---|
| 0 (NC) | Sample 1 DUT (open NC) | 3 | Set |
| 100 | Sample 1 Make Backfeed | 5 | Set |
| 200 (NO) | Sample 1 DUT (close NO) | 3 | Set |
| 1 Input↑ (NO) | Sample 1 Break Backfeed | 6 | Set |
| 232 (NO) | Sample 1 Make/Break | 4 | Set |
| 200 (NC) | Sample 1 DUT (close NC) | 3 | Reset |
| 1 Input↑ (NC) | Sample 1 Break Backfeed | 6 | Set |
| 232 (NC) | Sample 1 Make/Break | 4 | Set |
| 600 | Sample 1 Make Backfeed | 5 | Reset |
| 1200 (NO) | Sample 1 DUT (open NO) | 3 | Reset |
| 1 Input↓ (NO) | Sample 1 Break Backfeed | 6 | Reset |
| 1 Input↓ (NO) | Sample 1 Make/Break | 4 | Reset |
| 1200 (NC) | Sample 1 DUT (open NC) | 3 | Set |
| 1 Input↓ (NC) | Sample 1 Break Backfeed | 6 | Reset |
| 1 Input↓ (NC) | Sample 1 Make/Break | 4 | Reset |
| 1500 (NC) | Sample 2 DUT (open NC) | 8 | Set |
| 1600 | Sample 2 Make Backfeed | 10 | Set |
| 1700 (NO) | Sample 2 DUT (close NO) | 8 | Set |
| 2 Input↑ (NO) | Sample 2 Break Backfeed | 11 | Set |
| 1732 (NO) | Sample 2 Make/Break | 9 | Set |
| 1700 (NC) | Sample 2 DUT (close NC) | 8 | Reset |
| 2 Input↑ (NC) | Sample 2 Break Backfeed | 11 | Set |
| 1732 (NC) | Sample 2 Make/Break | 9 | Set |
| 2100 | Sample 2 Make Backfeed | 10 | Reset |
| 2700 (NO) | Sample 2 DUT (open NO) | 8 | Reset |
| 2 Input↓ (NO) | Sample 2 Break Backfeed | 11 | Reset |
| 2 Input↓ (NO) | Sample 2 Make/Break | 9 | Reset |
| 2700 (NC) | Sample 2 DUT (open NC) | 8 | Set |
| 2 Input↓ (NC) | Sample 2 Break Backfeed | 11 | Reset |
| 2 Input↓ (NC) | Sample 2 Make/Break | 9 | Reset |
| 3000 (NC) | Sample 3 DUT (open NC) | 13 | Set |
| 3100 | Sample 3 Make Backfeed | 15 | Set |
| 3200 (NO) | Sample 3 DUT (close NO) | 13 | Set |
| 3 Input↑ (NO) | Sample 3 Break Backfeed | 16 | Set |
| 3232 (NO) | Sample 3 Make/Break | 14 | Set |
| 3200 (NC) | Sample 3 DUT (close NC) | 13 | Reset |
| 3 Input↑ (NC) | Sample 3 Break Backfeed | 16 | Set |
| 3232 (NC) | Sample 3 Make/Break | 14 | Set |
| 3600 | Sample 3 Make Backfeed | 15 | Reset |
| 4200 (NO) | Sample 3 DUT (open NO) | 13 | Reset |
| 3 Input↓ (NO) | Sample 3 Break Backfeed | 16 | Reset |
| 3 Input↓ (NO) | Sample 3 Make/Break | 14 | Reset |
| 4200 (NC) | Sample 3 DUT (open NC) | 13 | Set |
| 3 Input↓ (NC) | Sample 3 Break Backfeed | 16 | Reset |
| 3 Input↓ (NC) | Sample 3 Make/Break | 14 | Reset |
| 4500 (NC) | Sample 4 DUT (open NC) | 18 | Set |
| 4600 | Sample 4 Make Backfeed | 20 | Set |
| 4700 (NO) | Sample 4 DUT (close NO) | 18 | Set |
| 4 Input↑ (NO) | Sample 4 Break Backfeed | 21 | Set |
| 4732 (NO) | Sample 4 Make/Break | 19 | Set |
| 4700 (NC) | Sample 4 DUT (close NC) | 18 | Reset |
| 4 Input↑ (NC) | Sample 4 Break Backfeed | 21 | Set |
| 4732 (NC) | Sample 4 Make/Break | 19 | Set |
| 5100 | Sample 4 Make Backfeed | 20 | Reset |
| 5700 (NO) | Sample 4 DUT (open NO) | 18 | Reset |
| 4 Input↓ (NO) | Sample 4 Break Backfeed | 21 | Reset |
| 4 Input↓ (NO) | Sample 4 Make/Break | 19 | Reset |
| 5700 (NC) | Sample 4 DUT (open NC) | 18 | Set |
| 4 Input↓ (NC) | Sample 4 Break Backfeed | 21 | Reset |

TABLE 4-continued

| Time (ms) | Output | Identifier | State |
|---|---|---|---|
| 4 Input↓ (NC) | Sample 4 Make/Break | 19 | Reset |
| 6000 (NC) | Sample 5 DUT (open NC) | 23 | Set |
| 6100 | Sample 5 Make Backfeed | 25 | Set |
| 6200 (NO) | Sample 5 DUT (close NO) | 23 | Set |
| 5 Input↑ (NO) | Sample 5 Break Backfeed | 26 | Set |
| 6232 (NO) | Sample 5 Make/Break | 24 | Set |
| 6200 (NC) | Sample 5 DUT (close NC) | 23 | Reset |
| 5 Input↑ (NC) | Sample 5 Break Backfeed | 26 | Set |
| 6232 (NC) | Sample 5 Make/Break | 24 | Set |
| 6600 | Sample 5 Make Backfeed | 25 | Reset |
| 7200 (NO) | Sample 5 DUT (open NO) | 23 | Reset |
| 5 Input↓ (NO) | Sample 5 Break Backfeed | 26 | Reset |
| 5 Input↓ (NO) | Sample 5 Make/Break | 24 | Reset |
| 7200 (NC) | Sample 5 DUT (open NC) | 23 | Set |
| 5 Input↓ (NC) | Sample 5 Break Backfeed | 26 | Reset |
| 5 Input↓ (NC) | Sample 5 Make/Break | 24 | Reset |
| 7500 (NC) | Sample 6 DUT (open NC) | 28 | Set |
| 7600 | Sample 6 Make Backfeed | 30 | Set |
| 7700 (NO) | Sample 6 DUT (close NO) | 28 | Set |
| 6 Input↑ (NO) | Sample 6 Break Backfeed | 31 | Set |
| 7732 (NO) | Sample 6 Make/Break | 29 | Set |
| 7700 (NC) | Sample 6 DUT (close NC) | 28 | Reset |
| 6 Input↑ (NC) | Sample 6 Break Backfeed | 31 | Set |
| 7732 (NC) | Sample 6 Make/Break | 29 | Set |
| 8100 | Sample 6 Make Backfeed | 30 | Reset |
| 8700 (NO) | Sample 6 DUT (open NO) | 28 | Reset |
| 6 Input↓ (NO) | Sample 6 Break Backfeed | 31 | Reset |
| 6 Input↓ (NO) | Sample 6 Make/Break | 29 | Reset |
| 8700 (NC) | Sample 6 DUT (open NC) | 28 | Set |
| 6 Input↓ (NC) | Sample 6 Break Backfeed | 31 | Reset |
| 6 Input↓ (NC) | Sample 6 Make/Break | 29 | Reset |

The following outlines the sequence of operation for an AC Make & Break or Pilot Duty endurance test on six single throw relay samples, referencing the test apparatus shown in FIG. 6.

For single throw samples they may be of NO type or NC type, selection is done during test setup on the HMI. Since any sample may be NO or NC the logic to handle both types are in place at the same time for each sample.

This endurance behaves in a similar way to the double throw endurance, except there is control over when each contact turns on or off.

If Sample 1 is a NC contact at time 0 ms Sample 1 DUT (relay 3) is turned on to open the NC contact. This is done before the device under test activates the load to allow a complete path to the Make load (load 35). At time 100 ms Sample 1 Make Backfeed (relay 5) is turned on. At time 200 ms two actions happen at the same time, Sample 1 is turned on, and Sample 2 is turned off. If Sample 1 is NO then Sample 1 DUT (relay 3) turns on to close the NO contact. If Sample 1 is NC, then Sample 1 DUT (relay 3) is turned off to close the NC contact. If Sample 2 is NO then Sample 2 DUT (relay 8) turns off to open the NO contact. If Sample 2 is NC, then Sample 2 DUT (relay 8) turns on to open the NC contact. On the rising edge of Sample 1 DUT contact voltage input Sample 1 Break Backfeed (relay 6) turns on. On the falling edge of the Sample 2 DUT contact voltage input both Sample 2 Break Backfeed (relay 11) and Sample 2 Make/Break (relay 9) are turned off. After the 32 ms delay from the Sample 1 DUT contact voltage input Sample 1 Make/Break (relay 4) turns on to change-over from the Make load (load 35) to the Break load (load 32). To allow sufficient time for the make current duration Sample 1 Make Backfeed (relay 5) is turned off at time 600 ms.

If Sample 2 is a NC contact at time 5000 ms Sample 2 DUT (relay 8) is turned on to open the NC contact. This is done before the device under test activates the load to allow a complete path to the Make load (load 35). At time 5100 ms Sample 2 Make Backfeed (relay 10) is turned on. At time 5200 ms two actions happen at the same time, Sample 2 is turned on, and Sample 1 is turned off. If Sample 1 is NO then Sample 1 DUT (relay 3) turns off to open the NO contact. If Sample 1 is NC, then Sample 1 DUT (relay 3) is turned on to open the NC contact. If Sample 2 is NO then Sample 2 DUT (relay 8) turns on to close the NO contact. If Sample 2 is NC, then Sample 2 DUT (relay 8) turns off to close the NC contact. On the rising edge of Sample 2 DUT contact voltage input Sample 2 Break Backfeed (relay 11) turns on. On the falling edge of the Sample 1 DUT contact voltage input both Sample 1 Break Backfeed (relay 6) and Sample 1 Make/Break (relay 4) are turned off. After the 32 ms delay from the Sample 2 DUT contact voltage input Sample 2 Make/Break (relay 9) turns on to change-over from the Make load (load 35) to the Break load (load 32). To allow sufficient time for the make current duration Sample 2 Make Backfeed (relay 10) is turned off at time 5600 ms.

If Sample 3 is a NC contact at time 3000 ms Sample 3 DUT (relay 13) is turned on to open the NC contact. This is done before the device under test activates the load to allow a complete path to the Make load (load 35). At time 3100 ms Sample 3 Make Backfeed (relay 15) is turned on. At time 3200 ms two actions happen at the same time, Sample 3 is turned on, and Sample 4 is turned off. If Sample 3 is NO then Sample 3 DUT (relay 13) turns on to close the NO contact. If Sample 3 is NC, then Sample 3 DUT (relay 13) is turned off to close the NC contact. If Sample 4 is NO then Sample 4 DUT (relay 18) turns off to open the NO contact. If Sample 4 is NC, then Sample 4 DUT (relay 18) turns on to open the NC contact. On the rising edge of Sample 3 DUT contact voltage input Sample 3 Break Backfeed (relay 16) turns on. On the falling edge of the Sample 4 DUT contact voltage input both Sample 4 Break Backfeed (relay 21) and Sample 4 Make/Break (relay 19) are turned off. After the 32 ms delay from the Sample 3 DUT contact voltage input Sample 3 Make/Break (relay 14) turns on to change-over from the Make load (load 35) to the Break load (load 33). To allow sufficient time for the make current duration Sample 3 Make Backfeed (relay 15) is turned off at time 3600 ms.

If Sample 4 is a NC contact at time 8000 ms Sample 4 DUT (relay 18) is turned on to open the NC contact. This is done before the device under test activates the load to allow a complete path to the Make load (load 35). At time 8100 ms Sample 4 Make Backfeed (relay 20) is turned on. At time 8200 ms two actions happen at the same time, Sample 4 is turned on, and Sample 3 is turned off. If Sample 3 is NO then Sample 3 DUT (relay 13) turns off to open the NO contact. If Sample 3 is NC, then Sample 3 DUT (relay 13) is turned on to open the NC contact. If Sample 4 is NO then Sample 4 DUT (relay 18) turns on to close the NO contact. If Sample 4 is NC, then Sample 4 DUT (relay 18) turns off to close the NC contact. On the rising edge of Sample 4 DUT contact voltage input Sample 4 Break Backfeed (relay 21) turns on. On the falling edge of the Sample 3 DUT contact voltage input both Sample 3 Break Backfeed (relay 16) and Sample 3 Make/Break (relay 14) are turned off. After the 32 ms delay from the Sample 4 DUT contact voltage input Sample 4 Make/Break (relay 19) turns on to change-over from the Make load (load 35) to the Break load (load 33). To allow sufficient time for the make current duration Sample 4 Make Backfeed (relay 20) is turned off at time 8600 ms.

If Sample 5 is a NC contact at time 6000 ms Sample 5 DUT (relay 23) is turned on to open the NC contact. This is done before the device under test activates the load to allow a complete path to the Make load (load 35). At time 6100 ms Sample 5 Make Backfeed (relay 25) is turned on. At time 6200 ms two actions happen at the same time, Sample 5 is turned on, and Sample 6 is turned off. If Sample 5 is NO then Sample 5 DUT (relay 23) turns on to close the NO contact. If Sample 5 is NC, then Sample 5 DUT (relay 23) is turned off to close the NC contact. If Sample 6 is NO then Sample 6 DUT (relay 28) turns off to open the NO contact. If Sample 6 is NC, then Sample 6 DUT (relay 28) turns on to open the NC contact. On the rising edge of Sample 5 DUT contact voltage input Sample 5 Break Backfeed (relay 26) turns on. On the falling edge of the Sample 6 DUT contact voltage input both Sample 6 Break Backfeed (relay 31) and Sample 6 Make/Break (relay 29) are turned off. After the 32 ms delay from the Sample 5 DUT contact voltage input Sample 5 Make/Break (relay 24) turns on to change-over from the Make load (load 35) to the Break load (load 34). To allow sufficient time for the make current duration Sample 5 Make Backfeed (relay 25) is turned off at time 6600 ms.

If Sample 6 is a NC contact at time 1000 ms Sample 6 DUT (relay 28) is turned on to open the NC contact. This is done before the device under test activates the load to allow a complete path to the Make load (load 35). At time 1100 ms Sample 6 Make Backfeed (relay 30) is turned on. At time 1200 ms two actions happen at the same time, Sample 6 is turned on, and Sample 5 is turned off. If Sample 5 is NO then Sample 5 DUT (relay 23) turns off to open the NO contact. If Sample 5 is NC, then Sample 5 DUT (relay 23) is turned on to open the NC contact. If Sample 6 is NO then Sample 6 DUT (relay 28) turns on to close the NO contact. If Sample 6 is NC, then Sample 6 DUT (relay 28) turns off to close the NC contact. On the rising edge of Sample 6 DUT contact voltage input Sample 6 Break Backfeed (relay 31) turns on. On the falling edge of the Sample 5 DUT contact voltage input both Sample 5 Break Backfeed (relay 26) and Sample 5 Make/Break (relay 24) are turned off. After the 32 ms delay from the Sample 6 DUT contact voltage input Sample 6 Make/Break (relay 29) turns on to change-over from the Make load (load 35) to the Break load (load 34). To allow sufficient time for the make current duration Sample 6 Make Backfeed (relay 30) is turned off at time 1600 ms.

The chronological order of operations for an AC Make & Break or Pilot Duty endurance test on six single throw relay samples using the test apparatus of FIG. 6 is outlined below in Table 5. This sequence may be repeated as many times as desired or as called for to complete standard tests for given DUTs.

TABLE 5

| Time (ms) | Output | Identifier | State |
|---|---|---|---|
| 0 (NC) | Sample 1 DUT (open NC) | 3 | Set |
| 100 | Sample 1 Make Backfeed | 5 | Set |
| 200 (NO) | Sample 1 DUT (close NO) | 3 | Set |
| 1 Input↑ (NO) | Sample 1 Break Backfeed | 6 | Set |
| 232 (NO) | Sample 1 Make/Break | 4 | Set |
| 200 (NO) | Sample 2 DUT (open NO) | 8 | Reset |
| 2 Input↓ (NO) | Sample 2 Break Backfeed | 11 | Reset |
| 2 Input↓ (NO) | Sample 2 Make/Break | 9 | Reset |
| 200 (NC) | Sample 1 DUT (close NC) | 3 | Reset |
| 1 Input↑ (NC) | Sample 1 Break Backfeed | 6 | Set |
| 232 (NC) | Sample 1 Make/Break | 4 | Set |
| 200 (NC) | Sample 2 DUT (open NC) | 8 | Set |
| 2 Input↓ (NC) | Sample 2 Break Backfeed | 11 | Reset |
| 2 Input↓ (NC) | Sample 2 Make/Break | 9 | Reset |
| 600 | Sample 1 Make Backfeed | 5 | Reset |
| 1000 (NC) | Sample 6 DUT (open NC) | 28 | Set |
| 1100 | Sample 6 Make Backfeed | 30 | Set |
| 1200 (NO) | Sample 5 DUT (open NO) | 23 | Reset |
| 5 Input↓ (NO) | Sample 5 Break Backfeed | 26 | Reset |

TABLE 5-continued

| Time (ms) | Output | Identifier | State |
|---|---|---|---|
| 5 Input↓ (NO) | Sample 5 Make/Break | 24 | Reset |
| 1200 (NO) | Sample 6 DUT (close NO) | 28 | Set |
| 6 Input↑ (NO) | Sample 6 Break Backfeed | 31 | Set |
| 1232 (NO) | Sample 6 Make/Break | 29 | Set |
| 1200 (NC) | Sample 5 DUT (open NC) | 23 | Set |
| 5 Input↓ (NC) | Sample 5 Break Backfeed | 26 | Reset |
| 5 Input↓ (NC) | Sample 5 Make/Break | 24 | Reset |
| 1200 (NC) | Sample 6 DUT (close NC) | 28 | Reset |
| 6 Input↑ (NC) | Sample 6 Break Backfeed | 31 | Set |
| 1232 (NC) | Sample 6 Make/Break | 29 | Set |
| 1600 | Sample 6 Make Backfeed | 30 | Reset |
| 3000 (NC) | Sample 3 DUT (open NC) | 13 | Set |
| 3100 | Sample 3 Make Backfeed | 15 | Set |
| 3200 (NO) | Sample 3 DUT (close NO) | 13 | Set |
| 3 Input↑ (NO) | Sample 3 Break Backfeed | 16 | Set |
| 3232 (NO) | Sample 3 Make/Break | 14 | Set |
| 3200 (NO) | Sample 4 DUT (open NO) | 18 | Reset |
| 4 Input↓ (NO) | Sample 4 Break Backfeed | 21 | Reset |
| 4 Input↓ (NO) | Sample 4 Make/Break | 19 | Reset |
| 3200 (NC) | Sample 3 DUT (close NC) | 13 | Reset |
| 3 Input↑ (NC) | Sample 3 Break Backfeed | 16 | Set |
| 3232 (NC) | Sample 3 Make/Break | 14 | Set |
| 3200 (NC) | Sample 4 DUT (open NC) | 18 | Set |
| 4 Input↓ (NC) | Sample 4 Break Backfeed | 21 | Reset |
| 4 Input↓ (NC) | Sample 4 Make/Break | 19 | Reset |
| 3600 | Sample 3 Make Backfeed | 15 | Reset |
| 5000 (NC) | Sample 2 DUT (open NC) | 8 | Set |
| 5100 | Sample 2 Make Backfeed | 10 | Set |
| 5200 (NO) | Sample 1 DUT (open NO) | 3 | Reset |
| 1 Input↓ (NO) | Sample 1 Break Backfeed | 6 | Reset |
| 1 Input↓ (NO) | Sample 1 Make/Break | 4 | Reset |
| 5200 (NO) | Sample 2 DUT (close NO) | 8 | Set |
| 2 Input↑ (NO) | Sample 2 Break Backfeed | 11 | Set |
| 5232 (NO) | Sample 2 Make/Break | 9 | Set |
| 5200 (NC) | Sample 1 DUT (open NC) | 3 | Set |
| 1 Input↓ (NC) | Sample 1 Break Backfeed | 6 | Reset |
| 1 Input↓ (NC) | Sample 1 Make/Break | 4 | Reset |
| 5200 (NC) | Sample 2 DUT (close NC) | 8 | Reset |
| 2 Input↑ (NC) | Sample 2 Break Backfeed | 11 | Set |
| 5232 (NC) | Sample 2 Make/Break | 9 | Set |
| 5600 | Sample 2 Make Backfeed | 10 | Reset |
| 6000 (NC) | Sample 5 DUT (open NC) | 23 | Set |
| 6100 | Sample 5 Make Backfeed | 25 | Set |
| 6200 (NO) | Sample 5 DUT (close NO) | 23 | Set |
| 5 Input↑ (NO) | Sample 5 Break Backfeed | 26 | Set |
| 6232 (NO) | Sample 5 Make/Break | 24 | Set |
| 6200 (NO) | Sample 6 DUT (open NO) | 28 | Reset |
| 6 Input↓ (NO) | Sample 6 Break Backfeed | 31 | Reset |
| 6 Input↓ (NO) | Sample 6 Make/Break | 29 | Reset |
| 6200 (NC) | Sample 5 DUT (close NC) | 23 | Reset |
| 5 Input↑ (NC) | Sample 5 Break Backfeed | 26 | Set |
| 6232 (NC) | Sample 5 Make/Break | 24 | Set |
| 6200 (NC) | Sample 6 DUT (open NC) | 28 | Set |
| 6 Input↓ (NC) | Sample 6 Break Backfeed | 31 | Reset |
| 6 Input↓ (NC) | Sample 6 Make/Break | 29 | Reset |
| 6600 | Sample 5 Make Backfeed | 25 | Reset |
| 8000 (NC) | Sample 4 DUT (open NC) | 18 | Set |
| 8100 | Sample 4 Make Backfeed | 20 | Set |
| 8200 (NO) | Sample 3 DUT (open NO) | 13 | Reset |
| 3 Input↓ (NO) | Sample 3 Break Backfeed | 16 | Reset |
| 3 Input↓ (NO) | Sample 3 Make/Break | 14 | Reset |
| 8200 (NO) | Sample 4 DUT (close NO) | 18 | Set |
| 4 Input↑ (NO) | Sample 4 Break Backfeed | 21 | Set |
| 8232 (NO) | Sample 4 Make/Break | 19 | Set |
| 8200 (NC) | Sample 3 DUT (open NC) | 13 | Set |
| 3 Input↓ (NC) | Sample 3 Break Backfeed | 16 | Reset |
| 3 Input↓ (NC) | Sample 3 Make/Break | 14 | Reset |
| 8200 (NC) | Sample 4 DUT (close NC) | 18 | Reset |
| 4 Input↑ (NC) | Sample 4 Break Backfeed | 21 | Set |
| 8232 (NC) | Sample 4 Make/Break | 19 | Set |
| 8600 | Sample 4 Make Backfeed | 20 | Reset |

The following outlines the sequence of operation for an AC Resistive/Motor or DC Resistive/Pilot Duty overload test on three double throw relay samples utilizing the NO contacts, referencing the test apparatus shown in FIG. 7 and the oscillograph shown in FIG. 5.

At time 0 ms Sample 1 NO Break Backfeed (relay 9) and Sample 1 NO Make/Break (relay 5) are turned on. This is done before the device under test (DUT) is activated to allow a complete path to the Break load (load 26). At time 100 ms Sample 1 DUT (relay 3) is turned on. At 1100 ms Sample 1 DUT turns off (relay 3) completing the one second contact on time. On the falling edge of the Sample 1 NO contact DUT current input both Sample 1 NO Break Backfeed (relay 9) and Sample 1 NO Make/Break (relay 5) are turned off.

At time 3000 ms Sample 2 NO Break Backfeed (relay 17) and Sample 2 NO Make/Break (relay 13) are turned on. This is done before the DUT is activated to allow a complete path to the Break load (load 27). At time 3100 ms Sample 2 DUT (relay 11) is turned on. At 4100 ms Sample 2 DUT turns off (relay 11) completing the one second contact on time. On the falling edge of the Sample 2 NO contact DUT current input both Sample 2 NO Break Backfeed (relay 17) and Sample 2 NO Make/Break (relay 13) are turned off.

At time 6000 ms Sample 3 NO Break Backfeed (relay 25) and Sample 3 NO Make/Break (relay 21) are turned on. This is done before the DUT is activated to allow a complete path to the Break load (load 28). At time 6100 ms Sample 3 DUT (relay 19) is turned on. At 7100 ms Sample 3 DUT turns off (relay 19) completing the one second contact on time. On the falling edge of the Sample 3 NO contact DUT current input both Sample 3 NO Break Backfeed (relay 25) and Sample 3 NO Make/Break (relay 21) are turned off.

The chronological order of operations for an AC Resistive/Motor or DC Resistive/Pilot Duty overload test on three double throw relay samples utilizing the NO contacts and the test apparatus of FIG. 7 is outlined below in Table 6. This sequence may be repeated as many times as desired or as called for to complete standard tests for given DUTs.

TABLE 6

| Time (ms) | Output | Identifier | State |
|---|---|---|---|
| 0 | Sample 1 NO Break Backfeed | 9 | Set |
| 0 | Sample 1 NO Make/Break | 5 | Set |
| 100 | Sample 1 DUT | 3 | Set |
| 1100 | Sample 1 DUT | 3 | Reset |
| 1NO Input↓ | Sample 1 NO Break Backfeed | 9 | Reset |
| 1NO Input↓ | Sample 1 NO Make/Break | 5 | Reset |
| 3000 | Sample 2 NO Break Backfeed | 17 | Set |
| 3000 | Sample 2 NO Make/Break | 13 | Set |
| 3100 | Sample 2 DUT | 11 | Set |
| 4100 | Sample 2 DUT | 11 | Reset |
| 2NO Input↓ | Sample 2 NO Break Backfeed | 17 | Reset |
| 2NO Input↓ | Sample 2 NO Make/Break | 13 | Reset |
| 6000 | Sample 3 NO Break Backfeed | 25 | Set |
| 6000 | Sample 3 NO Make/Break | 21 | Set |
| 6100 | Sample 3 DUT | 19 | Set |
| 7100 | Sample 3 DUT | 19 | Reset |
| 3NO Input↓ | Sample 3 NO Break Backfeed | 25 | Reset |
| 3NO Input↓ | Sample 3 NO Make/Break | 21 | Reset |

The following outlines the sequence of operation for an AC Resistive/Motor or DC Resistive/Pilot Duty overload test on three double throw relay samples utilizing the NC contacts, referencing the test apparatus shown in FIG. 7 and the oscillograph shown in FIG. 5.

At time 0 ms Sample 1 DUT (relay 3) is turned on to open the NC contact. At 100 ms Sample 1 NC Break Backfeed (relay 7) and Sample 1 NC Make/Break (relay 4) are turned on. This is done before the device under test (DUT) is activated to allow a complete path to the Break load (load 26). At time 200 ms Sample 1 DUT (relay 3) is turned off turning the NC contact on. At 1200 ms Sample 1 DUT (relay 3) turns on opening the NC contact completing the one second contact on time. On the falling edge of the Sample 1 NC contact DUT current input both Sample 1 NC Break Backfeed (relay 7) and Sample 1 NC Make/Break (relay 4) are turned off.

At time 3000 ms Sample 2 DUT (relay 11) is turned on to open the NC contact. At 3100 ms Sample 2 NC Break Backfeed (relay 15) and Sample 2 NC Make/Break (relay 12) are turned on. This is done before the DUT is activated to allow a complete path to the Break load (load 27). At time 3200 ms Sample 2 DUT (relay 11) is turned off turning the NC contact on. At 4200 ms Sample 2 DUT (relay 11) turns on opening the NC contact completing the one second contact on time. On the falling edge of the Sample 2 NC contact DUT current input both Sample 2 NC Break Backfeed (relay 15) and Sample 2 NC Make/Break (relay 12) are turned off.

At time 6000 ms Sample 3 DUT (relay 19) is turned on to open the NC contact. At 6100 ms Sample 3 NC Break Backfeed (relay 23) and Sample 3 NC Make/Break (relay 20) are turned on. This is done before the DUT is activated to allow a complete path to the Break load (load 28). At time 6200 ms Sample 3 DUT (relay 19) is turned off turning the NC contact on. At 7200 ms Sample 3 DUT (relay 19) turns on opening the NC contact completing the one second contact on time. On the falling edge of the Sample 3 NC contact DUT current input both Sample 3 NC Break Backfeed (relay 23) and Sample 3 NC Make/Break (relay 20) are turned off.

The chronological order of operations for an AC Resistive/Motor or DC Resistive/Pilot Duty overload test on three double throw relay samples utilizing the NC contacts using the test apparatus of FIG. 7 is outlined below in Table 7. This sequence may be repeated as many times as desired or as called for to complete standard tests for given DUTs.

TABLE 7

| Time (ms) | Output | Identifier | State |
|---|---|---|---|
| 0 | Sample 1 DUT (open NC) | 3 | Set |
| 100 | Sample 1 NC Break Backfeed | 7 | Set |
| 100 | Sample 1 NC Make/Break | 4 | Set |
| 200 | Sample 1 DUT (close NC) | 3 | Reset |
| 1200 | Sample 1 DUT (open NC) | 3 | Set |
| 1NC Input↓ | Sample 1 NC Break Backfeed | 7 | Reset |
| 1NC Input↓ | Sample 1 NC Make/Break | 4 | Reset |
| 3000 | Sample 2 DUT (open NC) | 11 | Set |
| 3100 | Sample 2 NC Break Backfeed | 15 | Set |
| 3100 | Sample 2 NC Make/Break | 12 | Set |
| 3200 | Sample 2 DUT (close NC) | 11 | Reset |
| 4200 | Sample 2 DUT (open NC) | 11 | Set |
| 2NC Input↓ | Sample 2 NC Break Backfeed | 15 | Reset |
| 2NC Input↓ | Sample 2 NC Make/Break | 12 | Reset |
| 6000 | Sample 3 DUT (open NC) | 19 | Set |
| 6100 | Sample 3 NC Break Backfeed | 23 | Set |
| 6100 | Sample 3 NC Make/Break | 20 | Set |
| 6200 | Sample 3 DUT (close NC) | 19 | Reset |
| 7200 | Sample 3 DUT (open NC) | 19 | Set |
| 3NC Input↓ | Sample 3 NC Break Backfeed | 23 | Reset |
| 3NC Input↓ | Sample 3 NC Make/Break | 20 | Reset |

The following outlines the sequence of operation for an AC Resistive/Motor or DC Resistive/Pilot Duty endurance test on three double throw relay samples. Reference FIG. 7 drawing and FIG. 5 oscillograph.

At time 0 ms Sample 1 NO Break Backfeed (relay 9) and Sample 1 NO Make/Break (relay 5) are turned on. This is done before the device under test (DUT) is activated to allow a complete path to the Break load (load 26). At time 100 ms Sample 1 DUT (relay 3) is turned on activating the NO contact and completing the previous five second on time of the NC contact. On the falling edge of the DUT NC contact current input from the previous cycle both Sample 1 NC Break Backfeed (relay 7) and Sample 1 NC Make/Break (relay 4) are turned off. This is to make sure that the DUT contact breaks the circuit and nothing inside the test fixture. At 5000 ms Sample 1 NC Break Backfeed (relay 7) and Sample 1 NC Make/Break (relay 4) are turned on to allow the NC current to pass. At 5100 ms Sample 1 DUT turns off (relay 3) activating the NC contact and completing the five second on time of the NO contact. On the falling edge of the DUT NO contact current input both Sample 1 NO Break Backfeed (relay 9) and Sample 1 NO Make/Break (relay 5) are turned off.

At time 3000 ms Sample 2 NO Break Backfeed (relay 17) and Sample 2 NO Make/Break (relay 13) are turned on. This is done before the DUT is activated to allow a complete path to the Break load (load 27). At time 3100 ms Sample 2 DUT (relay 11) is turned on activating the NO contact and completing the previous five second on time of the NC contact. On the falling edge of the DUT NC contact current input from the previous cycle both Sample 2 NC Break Backfeed (relay 15) and Sample 2 NC Make/Break (relay 12) are turned off. This is to make sure that the DUT contact breaks the circuit and nothing inside the test fixture. At 8000 ms Sample 2 NC Break Backfeed (relay 15) and Sample 2 NC Make/Break (relay 12) are turned on to allow the NC current to pass. At 8100 ms Sample 2 DUT turns off (relay 11) activating the NC contact and completing the five second on time of the NO contact. On the falling edge of the DUT NO contact current input both Sample 2 NO Break Backfeed (relay 17) and Sample 2 NO Make/Break (relay 13) are turned off.

At time 6000 ms Sample 3 NO Break Backfeed (relay 25) and Sample 3 NO Make/Break (relay 21) are turned on. This is done before the DUT is activated to allow a complete path to the Break load (load 28). At time 6100 ms Sample 3 DUT (relay 19) is turned on activating the NO contact and completing the previous five second on time of the NC contact. On the falling edge of the DUT NC contact current input from the previous cycle both Sample 3 NC Break Backfeed (relay 23) and Sample 3 NC Make/Break (relay 20) are turned off. This is to make sure that the DUT contact breaks the circuit and nothing inside the test fixture. At 1000 ms Sample 3 NC Break Backfeed (relay 23) and Sample 3 NC Make/Break (relay 20) are turned on to allow the NC current to pass. At 1100 ms Sample 3 DUT turns off (relay 19) activating the NC contact and completing the five second on time of the NO contact. On the falling edge of the DUT NO contact current input both Sample 3 NO Break Backfeed (relay 25) and Sample 3 NO Make/Break (relay 21) are turned off.

The chronological order of operations for an AC Resistive/Motor or DC Resistive/Pilot Duty endurance test on three double throw relay samples using the test apparatus of FIG. 7 is outlined below in Table 8. This sequence may be repeated as many times as desired or as called for to complete standard tests for given DUTs.

TABLE 8

| Time (ms) | Output | Identifier | State |
|---|---|---|---|
| 0 | Sample 1 NO Break Backfeed | 9 | Set |
| 0 | Sample 1 NO Make/Break | 5 | Set |
| 100 | Sample 1 DUT | 3 | Set |
| 1NC Input↓ | Sample 1 NC Break Backfeed | 7 | Reset |
| 1NC Input↓ | Sample 1 NC Make/Break | 4 | Reset |
| 1000 | Sample 3 NC Break Backfeed | 23 | Set |
| 1000 | Sample 3 NC Make/Break | 20 | Set |
| 1100 | Sample 3 DUT | 19 | Reset |
| 3NO Input↓ | Sample 3 NO Break Backfeed | 25 | Reset |
| 3NO Input↓ | Sample 3 NO Make/Break | 21 | Reset |
| 3000 | Sample 2 NO Break Backfeed | 17 | Set |
| 3000 | Sample 2 NO Make/Break | 13 | Set |
| 3100 | Sample 2 DUT | 11 | Set |
| 2NC Input↓ | Sample 2 NC Break Backfeed | 15 | Reset |
| 2NC Input↓ | Sample 2 NC Make/Break | 12 | Reset |
| 5000 | Sample 1 NC Break Backfeed | 7 | Set |
| 5000 | Sample 1 NC Make/Break | 4 | Set |
| 5100 | Sample 1 DUT | 3 | Reset |
| 1NO Input↓ | Sample 1 NO Break Backfeed | 9 | Reset |
| 1NO Input↓ | Sample 1 NO Make/Break | 5 | Reset |
| 6000 | Sample 3 NO Break Backfeed | 25 | Set |
| 6000 | Sample 3 NO Make/Break | 21 | Set |
| 6100 | Sample 3 DUT | 19 | Set |
| 3NC Input↓ | Sample 3 NC Break Backfeed | 23 | Reset |
| 3NC Input↓ | Sample 3 NC Make/Break | 20 | Reset |
| 8000 | Sample 2 NC Break Backfeed | 15 | Set |
| 8000 | Sample 2 NC Make/Break | 12 | Set |
| 8100 | Sample 2 DUT | 11 | Reset |
| 2NO Input↓ | Sample 2 NO Break Backfeed | 17 | Reset |
| 2NO Input↓ | Sample 2 NO Make/Break | 13 | Reset |

The following outlines the sequence of operation for an AC Resistive/Motor or DC Resistive/Pilot Duty overload test on six single throw relay samples referencing the test apparatus of FIG. 8.

For single throw samples they may be of NO type or NC type, selection is done during test setup on the HMI. Since any sample may be NO or NC the logic to handle both types are in place at the same time for each sample.

If Sample 1 is a NC contact at time 0 ms Sample 1 DUT (relay 3) is turned on to open the NC contact. This is done before the device under test activates the load to allow a complete path to the Break load (load 32). At time 100 ms Sample 1 Break Backfeed (relay 6) and Sample 1 Make/Break (relay 4) are turned on. At time 200 ms one of two actions can happen depending on if the sample is NO or NC. If the sample is NO Sample 1 DUT (relay 3) turns on to close the NO contact. If the sample is NC, then Sample 1 DUT (relay 3) is turned off to close the NC contact. At 1200 ms if the sample is NO then Sample 1 DUT (relay 3) is turned off to open the NO contact. If the sample is NC, then Sample 1 DUT (relay 3) is turned on to open the NC contact. This completes the contacts one second on time. On the falling edge of the contact DUT current input both Sample 1 Break Backfeed (relay 6) and Sample 1 Make/Break (relay 4) are turned off.

If Sample 2 is a NC contact at time 1500 ms Sample 2 DUT (relay 8) is turned on to open the NC contact. This is done before the device under test activates the load to allow a complete path to the Break load (load 32). At time 1600 ms Sample 2 Break Backfeed (relay 11) and Sample 2 Make/Break (relay 9) are turned on. At time 1700 ms one of two actions can happen depending on if the sample is NO or NC. If the sample is NO Sample 2 DUT (relay 8) turns on to close the NO contact. If the sample is NC, then Sample 2 DUT (relay 8) is turned off to close the NC contact. At 2700 ms if the sample is NO then Sample 2 DUT (relay 8) is turned off to open the NO contact. If the sample is NC, then Sample 2 DUT (relay 8) is turned on to open the NC contact. This completes the contacts one second on time. On the falling edge of the contact DUT current input both Sample 2 Break Backfeed (relay 11) and Sample 2 Make/Break (relay 9) are turned off.

If Sample 3 is a NC contact at time 3000 ms Sample 3 DUT (relay 13) is turned on to open the NC contact. This is done before the device under test activates the load to allow a complete path to the Break load (load 33). At time 3100 ms Sample 3 Break Backfeed (relay 16) and Sample 3 Make/Break (relay 14) are turned on. At time 3200 ms one of two actions can happen depending on if the sample is NO or NC. If the sample is NO Sample 3 DUT (relay 13) turns on to close the NO contact. If the sample is NC, then Sample 3 DUT (relay 13) is turned off to close the NC contact. At 4200 ms if the sample is NO then Sample 3 DUT (relay 13) is turned off to open the NO contact. If the sample is NC, then Sample 3 DUT (relay 13) is turned on to open the NC contact. This completes the contacts one second on time. On the falling edge of the contact DUT current input both Sample 3 Break Backfeed (relay 16) and Sample 3 Make/Break (relay 14) are turned off.

If Sample 4 is a NC contact at time 4500 ms Sample 4 DUT (relay 18) is turned on to open the NC contact. This is done before the device under test activates the load to allow a complete path to the Break load (load 33). At time 4600 ms Sample 4 Break Backfeed (relay 21) and Sample 4 Make/Break (relay 19) are turned on. At time 4700 ms one of two actions can happen depending on if the sample is NO or NC. If the sample is NO Sample 4 DUT (relay 18) turns on to close the NO contact. If the sample is NC, then Sample 4 DUT (relay 18) is turned off to close the NC contact. At 5700 ms if the sample is NO then Sample 4 DUT (relay 18) is turned off to open the NO contact. If the sample is NC, then Sample 4 DUT (relay 18) is turned on to open the NC contact. This completes the contacts one second on time. On the falling edge of the contact DUT current input both Sample 4 Break Backfeed (relay 21) and Sample 4 Make/Break (relay 19) are turned off.

If Sample 5 is a NC contact at time 6000 ms Sample 5 DUT (relay 23) is turned on to open the NC contact. This is done before the device under test activates the load to allow a complete path to the Break load (load 34). At time 6100 ms Sample 5 Break Backfeed (relay 26) and Sample 5 Make/Break (relay 24) are turned on. At time 6200 ms one of two actions can happen depending on if the sample is NO or NC. If the sample is NO Sample 5 DUT (relay 23) turns on to close the NO contact. If the sample is NC, then Sample 5 DUT (relay 23) is turned off to close the NC contact. At 7200 ms if the sample is NO then Sample 5 DUT (relay 23) is turned off to open the NO contact. If the sample is NC, then Sample 5 DUT (relay 23) is turned on to open the NC contact. This completes the contacts one second on time. On the falling edge of the contact DUT current input both Sample 5 Break Backfeed (relay 26) and Sample 5 Make/Break (relay 24) are turned off.

If Sample 6 is a NC contact at time 7500 ms Sample 6 DUT (relay 28) is turned on to open the NC contact. This is done before the device under test activates the load to allow a complete path to the Break load (load 34). At time 7600 ms Sample 6 Break Backfeed (relay 31) and Sample 6 Make/Break (relay 29) are turned on. At time 7700 ms one of two actions can happen depending on if the sample is NO or NC. If the sample is NO Sample 6 DUT (relay 28) turns on to close the NO contact. If the sample is NC, then Sample 6 DUT (relay 28) is turned off to close the NC contact. At 8700 ms if the sample is NO then Sample 6 DUT (relay 28) is turned off to open the NO contact. If the sample is NC, then Sample 6 DUT (relay 28) is turned on to open the NC contact. This completes the contacts one second on time. On the falling edge of the contact DUT current input both Sample 6 Break Backfeed (relay 31) and Sample 6 Make/Break (relay 29) are turned off.

The chronological order of operations for an AC Resistive/Motor or DC Resistive/Pilot Duty overload test on six single throw relay samples using the test apparatus of FIG. 8 is outlined below in Table 9. This sequence may be repeated as many times as desired or as called for to complete standard tests for given DUTs.

TABLE 9

| Time (ms) | Output | Identifier | State |
|---|---|---|---|
| 0 (NC) | Sample 1 DUT (open NC) | 3 | Set |
| 100 | Sample 1 Break Backfeed | 6 | Set |
| 100 | Sample 1 Make/Break | 4 | Set |
| 200 (NO) | Sample 1 DUT (close NO) | 3 | Set |
| 200 (NC) | Sample 1 DUT (close NC) | 3 | Reset |
| 1200 (NO) | Sample 1 DUT (open NO) | 3 | Reset |
| 1 Input↓ (NO) | Sample 1 Break Backfeed | 6 | Reset |
| 1 Input↓ (NO) | Sample 1 Make/Break | 4 | Reset |
| 1200 (NC) | Sample 1 DUT (open NC) | 3 | Set |
| 1 Input↓ (NC) | Sample 1 Break Backfeed | 6 | Reset |
| 1 Input↓ (NC) | Sample 1 Make/Break | 4 | Reset |
| 1500 (NC) | Sample 2 DUT (open NC) | 8 | Set |
| 1600 | Sample 2 Break Backfeed | 11 | Set |
| 1600 | Sample 2 Make/Break | 9 | Set |
| 1700 (NO) | Sample 2 DUT (close NO) | 8 | Set |
| 1700 (NC) | Sample 2 DUT (close NC) | 8 | Reset |
| 2700 (NO) | Sample 2 DUT (open NO) | 8 | Reset |
| 2 Input↓ (NO) | Sample 2 Break Backfeed | 11 | Reset |
| 2 Input↓ (NO) | Sample 2 Make/Break | 9 | Reset |
| 2700 (NC) | Sample 2 DUT (open NC) | 8 | Set |
| 2 Input↓ (NC) | Sample 2 Break Backfeed | 11 | Reset |
| 2 Input↓ (NC) | Sample 2 Make/Break | 9 | Reset |
| 3000 (NC) | Sample 3 DUT (open NC) | 13 | Set |
| 3100 | Sample 3 Break Backfeed | 16 | Set |
| 3100 | Sample 3 Make/Break | 14 | Set |
| 3200 (NO) | Sample 3 DUT (close NO) | 13 | Set |
| 3200 (NC) | Sample 3 DUT (close NC) | 13 | Reset |
| 4200 (NO) | Sample 3 DUT (open NO) | 13 | Reset |
| 3 Input↓ (NO) | Sample 3 Break Backfeed | 16 | Reset |
| 3 Input↓ (NO) | Sample 3 Make/Break | 14 | Reset |
| 4200 (NC) | Sample 3 DUT (open NC) | 13 | Set |
| 3 Input↓ (NC) | Sample 3 Break Backfeed | 16 | Reset |
| 3 Input↓ (NC) | Sample 3 Make/Break | 14 | Reset |
| 4500 (NC) | Sample 4 DUT (open NC) | 18 | Set |
| 4600 | Sample 4 Break Backfeed | 21 | Set |
| 4600 | Sample 4 Make/Break | 19 | Set |
| 4700 (NO) | Sample 4 DUT (close NO) | 18 | Set |
| 4700 (NC) | Sample 4 DUT (close NC) | 18 | Reset |
| 5700 (NO) | Sample 4 DUT (open NO) | 18 | Reset |
| 4 Input↓ (NO) | Sample 4 Break Backfeed | 21 | Reset |
| 4 Input↓ (NO) | Sample 4 Make/Break | 19 | Reset |
| 5700 (NC) | Sample 4 DUT (open NC) | 18 | Set |
| 4 Input↓ (NC) | Sample 4 Break Backfeed | 21 | Reset |
| 4 Input↓ (NC) | Sample 4 Make/Break | 19 | Reset |
| 6000 (NC) | Sample 5 DUT (open NC) | 23 | Set |
| 6100 | Sample 5 Break Backfeed | 26 | Set |
| 6100 | Sample 5 Make/Break | 24 | Set |
| 6200 (NO) | Sample 5 DUT (close NO) | 23 | Set |
| 6200 (NC) | Sample 5 DUT (close NC) | 23 | Reset |
| 7200 (NO) | Sample 5 DUT (open NO) | 23 | Reset |
| 5 Input↓ (NO) | Sample 5 Break Backfeed | 26 | Reset |
| 5 Input↓ (NO) | Sample 5 Make/Break | 24 | Reset |
| 7200 (NC) | Sample 5 DUT (open NC) | 23 | Set |
| 5 Input↓ (NC) | Sample 5 Break Backfeed | 26 | Reset |
| 5 Input↓ (NC) | Sample 5 Make/Break | 24 | Reset |
| 7500 (NC) | Sample 6 DUT (open NC) | 28 | Set |
| 7600 | Sample 6 Break Backfeed | 31 | Set |
| 7600 | Sample 6 Make/Break | 29 | Set |
| 7700 (NO) | Sample 6 DUT (close NO) | 28 | Set |
| 7700 (NC) | Sample 6 DUT (close NC) | 28 | Reset |
| 8700 (NO) | Sample 6 DUT (open NO) | 28 | Reset |
| 6 Input↓ (NO) | Sample 6 Break Backfeed | 31 | Reset |
| 6 Input↓ (NO) | Sample 6 Make/Break | 29 | Reset |
| 8700 (NC) | Sample 6 DUT (open NC) | 28 | Set |
| 6 Input↓ (NC) | Sample 6 Break Backfeed | 31 | Reset |
| 6 Input↓ (NC) | Sample 6 Make/Break | 29 | Reset |

The following outlines the sequence of operation for an AC Resistive/Motor or DC Resistive/Pilot Duty endurance test on six single throw relay samples, referencing the test apparatus shown in FIG. 8.

For single throw samples they may be of NO type or NC type, selection is done during test setup on the HMI. Since any sample may be NO or NC the logic to handle both types are in place at the same time for each sample.

This endurance behaves in a similar way to the double throw endurance, except there is control over when each contact turns on or off.

If Sample 1 is a NC contact at time 0 ms Sample 1 DUT (relay 3) is turned on to open the NC contact. This is done before the device under test activates the load to allow a complete path to the Break load (load 32). At time 100 ms Sample 1 Break Backfeed (relay 6) and Sample 1 Make/Break (relay 4) are turned on. At time 200 ms two actions happen at the same time, Sample 1 is turned on, and Sample 2 is turned off. If Sample 1 is NO then Sample 1 DUT (relay 3) turns on to close the NO contact. If Sample 1 is NC, then Sample 1 DUT (relay 3) is turned off to close the NC contact. If Sample 2 is NO then Sample 2 DUT (relay 8) turns off to open the NO contact. If Sample 2 is NC, then Sample 2 DUT (relay 8) turns on to open the NC contact. On the falling edge of the Sample 2 DUT contact current input both Sample 2 Break Backfeed (relay 11) and Sample 2 Make/Break (relay 9) are turned off.

If Sample 2 is a NC contact at time 5000 ms Sample 2 DUT (relay 8) is turned on to open the NC contact. This is done before the device under test activates the load to allow a complete path to the Break load (load 32). At time 5100 ms Sample 2 Break Backfeed (relay 11) and Sample 2 Make/Break (relay 9) are turned on. At time 5200 ms two actions happen at the same time, Sample 2 is turned on, and Sample 1 is turned off. If Sample 1 is NO then Sample 1 DUT (relay 3) turns off to open the NO contact. If Sample 1 is NC, then Sample 1 DUT (relay 3) is turned on to open the NC contact. If Sample 2 is NO then Sample 2 DUT (relay 8) turns on to close the NO contact. If Sample 2 is NC, then Sample 2 DUT (relay 8) turns off to close the NC contact. On the falling edge of the Sample 1 DUT contact current input both Sample 1 Break Backfeed (relay 6) and Sample 1 Make/Break (relay 4) are turned off.

If Sample 3 is a NC contact at time 3000 ms Sample 3 DUT (relay 13) is turned on to open the NC contact. This is done before the device under test activates the load to allow a complete path to the Break load (load 33). At time 3100 ms Sample 3 Break Backfeed (relay 16) and Sample 3 Make/Break (relay 14) are turned on. At time 3200 ms two actions happen at the same time, Sample 3 is turned on, and Sample 4 is turned off. If Sample 3 is NO then Sample 3 DUT (relay 13) turns on to close the NO contact. If Sample 3 is NC, then Sample 3 DUT (relay 13) is turned off to close the NC contact. If Sample 4 is NO then Sample 4 DUT (relay 18) turns off to open the NO contact. If Sample 4 is NC, then Sample 4 DUT (relay 18) turns on to open the NC contact. On the falling edge of the Sample 4 DUT contact current input both Sample 4 Break Backfeed (relay 21) and Sample 4 Make/Break (relay 19) are turned off.

If Sample 4 is a NC contact at time 8000 ms Sample 4 DUT (relay 18) is turned on to open the NC contact. This is done before the device under test activates the load to allow a complete path to the Break load (load 33). At time 8100 ms Sample 4 Break Backfeed (relay 21) and Sample 4 Make/Break (relay 19) are turned on. At time 8200 ms two actions happen at the same time, Sample 4 is turned on, and Sample 3 is turned off. If Sample 3 is NO then Sample 3 DUT (relay 13) turns off to open the NO contact. If Sample 3 is NC, then Sample 3 DUT (relay 13) is turned on to open the NC contact. If Sample 4 is NO then Sample 4 DUT (relay 18) turns on to close the NO contact. If Sample 4 is NC, then Sample 4 DUT (relay 18) turns off to close the NC contact. On the falling edge of the Sample 3 DUT contact current input both Sample 3 Break Backfeed (relay 16) and Sample 3 Make/Break (relay 14) are turned off.

If Sample 5 is a NC contact at time 6000 ms Sample 5 DUT (relay 23) is turned on to open the NC contact. This is done before the device under test activates the load to allow a complete path to the Break load (load 34). At time 6100 ms Sample 5 Break Backfeed (relay 26) and Sample 5 Make/Break (relay 24) are turned on. At time 6200 ms two actions happen at the same time, Sample 5 is turned on, and Sample 6 is turned off. If Sample 5 is NO then Sample 5 DUT (relay 23) turns on to close the NO contact. If Sample 5 is NC, then Sample 5 DUT (relay 23) is turned off to close the NC contact. If Sample 6 is NO then Sample 6 DUT (relay 28) turns off to open the NO contact. If Sample 6 is NC, then Sample 6 DUT (relay 28) turns on to open the NC contact. On the falling edge of the Sample 6 DUT contact current input both Sample 6 Break Backfeed (relay 31) and Sample 6 Make/Break (relay 29) are turned off.

If Sample 6 is a NC contact at time 1000 ms Sample 6 DUT (relay 28) is turned on to open the NC contact. This is done before the device under test activates the load to allow a complete path to the Break load (load 34). At time 1100 ms Sample 6 Break Backfeed (relay 31) and Sample 6 Make/Break (relay 29) are turned on. At time 1200 ms two actions happen at the same time, Sample 6 is turned on, and Sample 5 is turned off. If Sample 5 is NO then Sample 5 DUT (relay 23) turns off to open the NO contact. If Sample 5 is NC, then Sample 5 DUT (relay 23) is turned on to open the NC contact. If Sample 6 is NO then Sample 6 DUT (relay 28) turns on to close the NO contact. If Sample 6 is NC, then Sample 6 DUT (relay 28) turns off to close the NC contact. On the falling edge of the Sample 5 DUT contact current input both Sample 5 Break Backfeed (relay 26) and Sample 5 Make/Break (relay 24) are turned off.

The chronological order of operations for an AC Resistive/Motor or DC Resistive/Pilot Duty endurance test on six single throw relay samples using the test apparatus shown in FIG. 8 is outlined below in Table 10. This sequence may be repeated as many times as desired or as called for to complete standard tests for given DUTs.

TABLE 10

| Time (ms) | Output | Identifier | State |
| --- | --- | --- | --- |
| 0 (NC) | Sample 1 DUT (open NC) | 3 | Set |
| 100 | Sample 1 Break Backfeed | 6 | Set |
| 100 | Sample 1 Make/Break | 4 | Set |
| 200 (NO) | Sample 1 DUT (close NO) | 3 | Set |
| 200 (NO) | Sample 2 DUT (open NO) | 8 | Reset |
| 2 Input↓ (NO) | Sample 2 Break Backfeed | 11 | Reset |
| 2 Input↓ (NO) | Sample 2 Make/Break | 9 | Reset |
| 200 (NC) | Sample 1 DUT (close NC) | 3 | Reset |
| 200 (NC) | Sample 2 DUT (open NC) | 8 | Set |
| 2 Input↓ (NC) | Sample 2 Break Backfeed | 11 | Reset |
| 2 Input↓ (NC) | Sample 2 Make/Break | 9 | Reset |
| 1000 (NC) | Sample 6 DUT (open NC) | 28 | Set |
| 1100 | Sample 6 Break Backfeed | 31 | Set |
| 1100 | Sample 6 Make/Break | 29 | Set |
| 1200 (NO) | Sample 5 DUT (open NO) | 23 | Reset |
| 1200 (NO) | Sample 6 DUT (close NO) | 28 | Set |
| 5 Input↓ (NO) | Sample 5 Break Backfeed | 26 | Reset |
| 5 Input↓ (NO) | Sample 5 Make/Break | 24 | Reset |
| 1200 (NC) | Sample 5 DUT (open NC) | 23 | Set |

TABLE 10-continued

| Time (ms) | Output | Identifier | State |
|---|---|---|---|
| 1200 (NC) | Sample 6 DUT (close NC) | 28 | Reset |
| 5 Input↓ (NC) | Sample 5 Break Backfeed | 26 | Reset |
| 5 Input↓ (NC) | Sample 5 Make/Break | 24 | Reset |
| 3000 (NC) | Sample 3 DUT (open NC) | 13 | Set |
| 3100 | Sample 3 Break Backfeed | 16 | Set |
| 3100 | Sample 3 Make/Break | 14 | Set |
| 3200 (NO) | Sample 3 DUT (close NO) | 13 | Set |
| 3200 (NO) | Sample 4 DUT (open NO) | 18 | Reset |
| 4 Input↓ (NO) | Sample 4 Break Backfeed | 21 | Reset |
| 4 Input↓ (NO) | Sample 4 Make/Break | 19 | Reset |
| 3200 (NC) | Sample 3 DUT (close NC) | 13 | Reset |
| 3200 (NC) | Sample 4 DUT (open NC) | 18 | Set |
| 4 Input↓ (NC) | Sample 4 Break Backfeed | 21 | Reset |
| 4 Input↓ (NC) | Sample 4 Make/Break | 19 | Reset |
| 5000 (NC) | Sample 2 DUT (open NC) | 8 | Set |
| 5100 | Sample 2 Break Backfeed | 11 | Set |
| 5100 | Sample 2 Make/Break | 9 | Set |
| 5200 (NO) | Sample 1 DUT (open NO) | 3 | Reset |
| 5200 (NO) | Sample 2 DUT (close NO) | 8 | Set |
| 1 Input↓ (NO) | Sample 1 Break Backfeed | 6 | Reset |
| 1 Input↓ (NO) | Sample 1 Make/Break | 4 | Reset |
| 5200 (NC) | Sample 1 DUT (open NC) | 3 | Set |
| 5200 (NC) | Sample 2 DUT (close NC) | 8 | Reset |
| 1 Input↓ (NC) | Sample 1 Break Backfeed | 6 | Reset |
| 1 Input↓ (NC) | Sample 1 Make/Break | 4 | Reset |
| 6000 (NC) | Sample 5 DUT (open NC) | 23 | Set |
| 6100 | Sample 5 Break Backfeed | 26 | Set |
| 6100 | Sample 5 Make/Break | 24 | Set |
| 6200 (NO) | Sample 5 DUT (close NO) | 23 | Set |
| 6200 (NO) | Sample 6 DUT (open NO) | 28 | Reset |
| 6 Input↓ (NO) | Sample 6 Break Backfeed | 31 | Reset |
| 6 Input↓ (NO) | Sample 6 Make/Break | 29 | Reset |
| 6200 (NC) | Sample 5 DUT (close NC) | 23 | Reset |
| 6200 (NC) | Sample 6 DUT (open NC) | 28 | Set |
| 6 Input↓ (NC) | Sample 6 Break Backfeed | 31 | Reset |
| 6 Input↓ (NC) | Sample 6 Make/Break | 29 | Reset |
| 8000 (NC) | Sample 4 DUT (open NC) | 18 | Set |
| 8100 | Sample 4 Break Backfeed | 21 | Set |
| 8100 | Sample 4 Make/Break | 19 | Set |
| 8200 (NO) | Sample 3 DUT (open NO) | 13 | Reset |
| 8200 (NO) | Sample 4 DUT (close NO) | 18 | Set |
| 3 Input↓ (NO) | Sample 3 Break Backfeed | 16 | Reset |
| 3 Input↓ (NO) | Sample 3 Make/Break | 14 | Reset |
| 8200 (NC) | Sample 3 DUT (open NC) | 13 | Set |
| 8200 (NC) | Sample 4 DUT (close NC) | 18 | Reset |
| 3 Input↓ (NC) | Sample 3 Break Backfeed | 16 | Reset |
| 3 Input↓ (NC) | Sample 3 Make/Break | 14 | Reset |

Example Human Machine Interfaces (HMIs)

Figure 9:
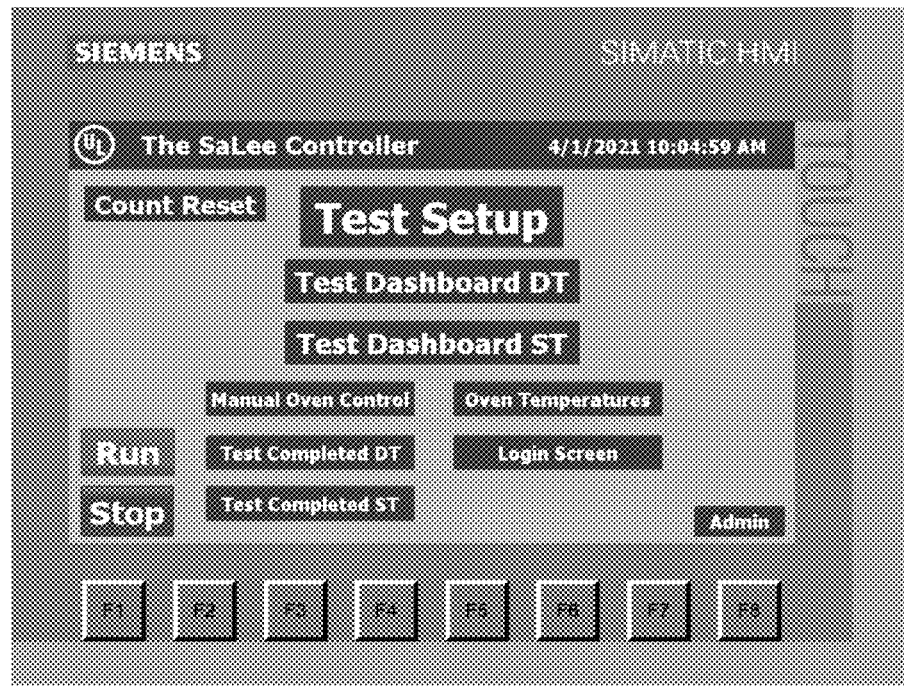

FIGS. 9-43 are diagrammatic views of example graphical user interfaces or human machine interfaces (HMIs) for using an example testing apparatus. These HMIs allow a user to select different interface elements described herein to configure a test as desired to perform different types of tests on different types of samples as desired. An HMI 900 in FIG. 9 shows a main screen where a user may select "Test Setup" to setup a test for double throw switches or to setup a test for single throw switches. The HMI 900 includes "Test Dashboard DT" and "Test Dashboard ST" to see running test information. The HMI 900 also includes an interface element to manually control an oven of the test apparatus apart from a particular test by selecting "Manual Oven Control." An element "Oven Temperatures" may also be selected so that the current temperature of one or more ovens of the test apparatus is displayed. A "Test Completed DT" element may be selected to display information related to an already completed double throw relay test. A "Test Completed ST" element may be selected to display information related to an already completed single throw relay test. The "Run" and "Stop" buttons may be selected to run or stop a test, respectively. And a "Count Reset" button may be selected by a user to reset a test back to an original count, for example if something about a test was incorrect and needs to be restarted.

Figure 10:
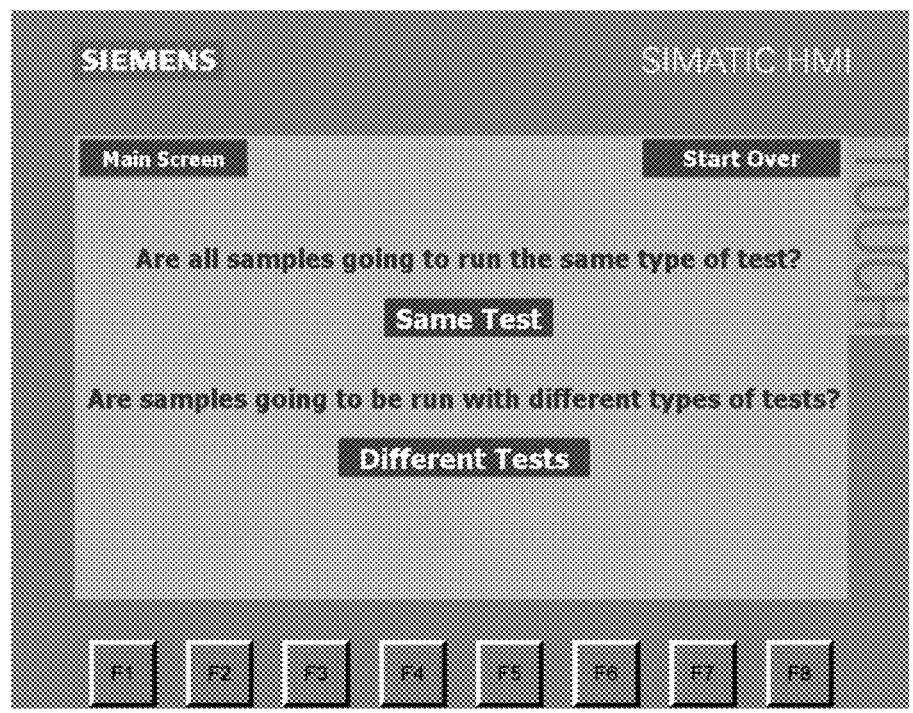
Figure 11:
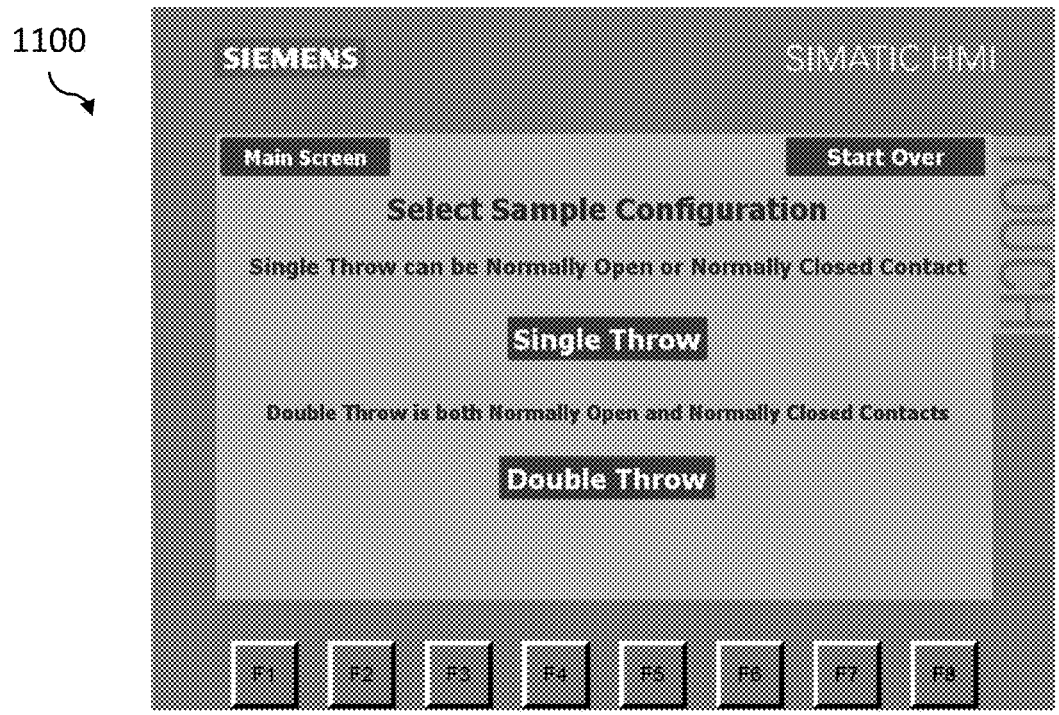

An HMI 1000 in FIG. 10 shows elements so that the user can select whether each sample for a current test will run the "Same Test" or whether different samples installed in the test apparatus will have "Different Tests" run. An HMI 1100 in FIG. 11 prompts the user to indicate and/or confirm whether single throw or double throw samples are being tested.

Figure 12:
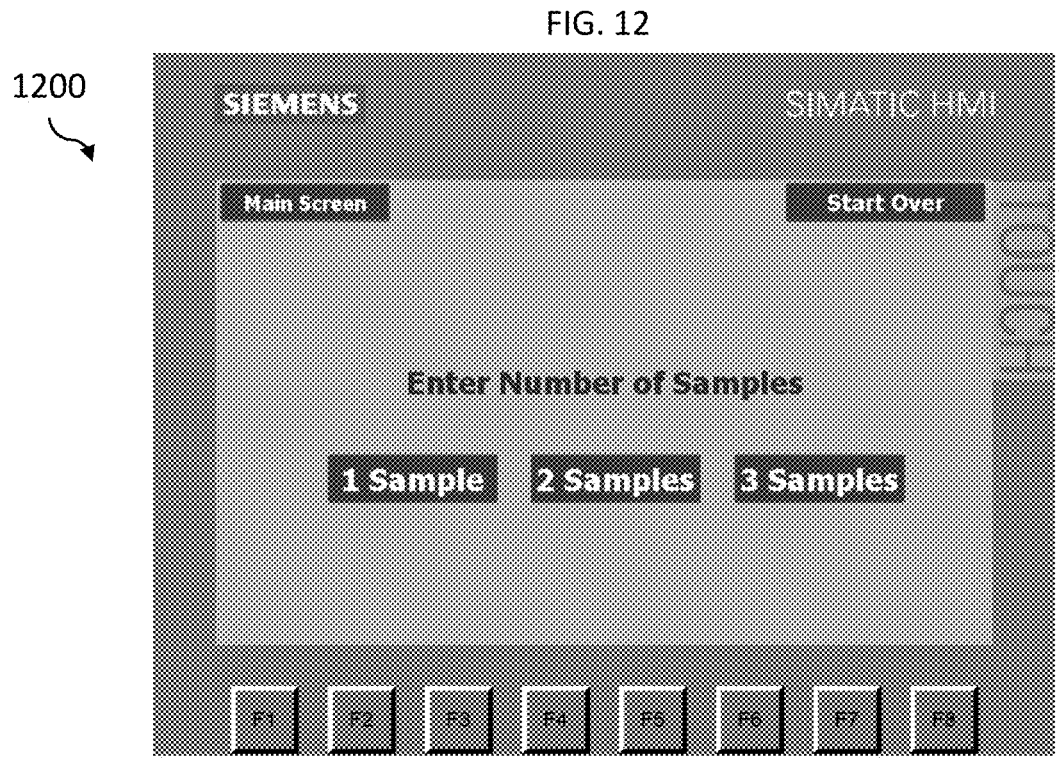
Figure 13:
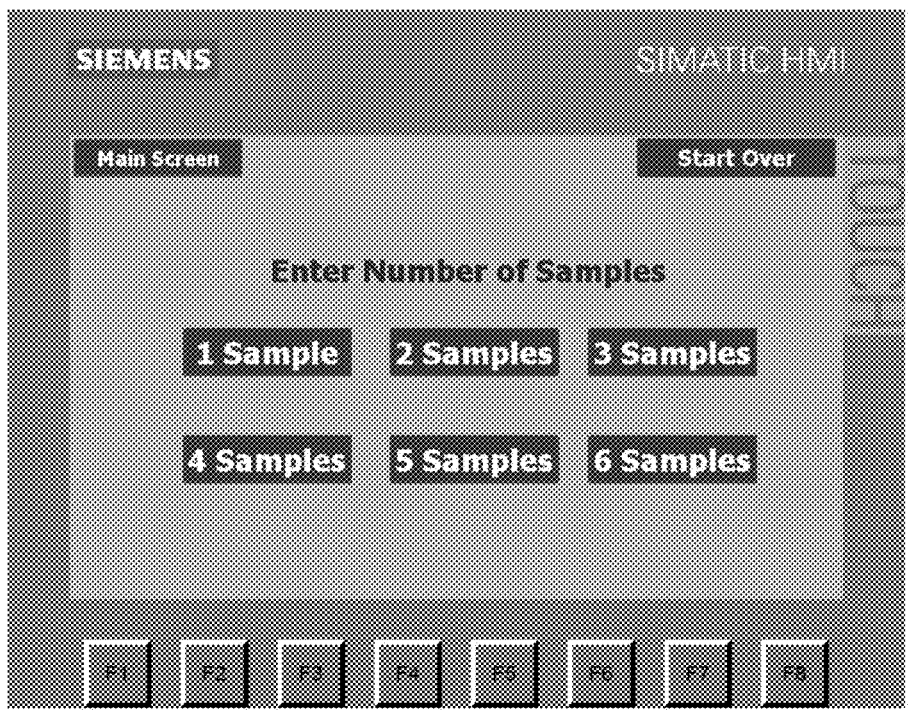

An HMI 1200 in FIG. 12 is shown, for example, if the user selects "Double Throw" in the HMI 1100. At the HMI 1200, the user can select whether 1, 2, or 3 samples are being tested. Similarly, an HMI 1300 in FIG. 13 is shown, for example, if the user selects "Single Throw" in the HMI 1100. At the HMI 1300, the user can select whether 1, 2, 3, 4, 5, or 6 samples are being tested.

Figure 14:
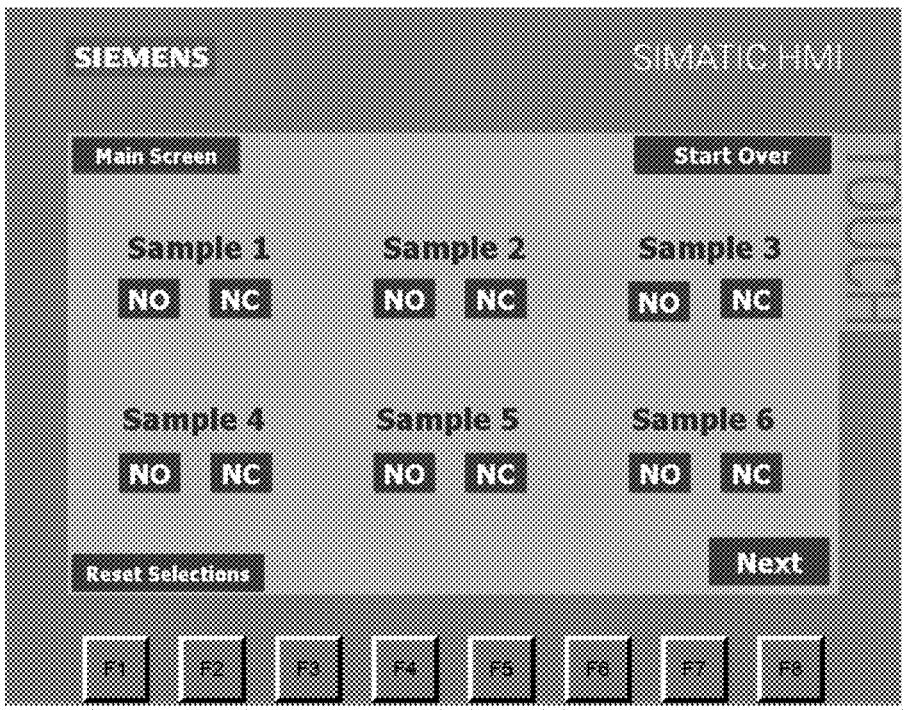

An HMI 1400 in FIG. 14 allows the user to input, where single throw relays/switches are being tested, whether each sample is a normally open (NO) or normally closed (NC) switch. Different types of switches may be tested at the same time (e.g., the user may select NO or NC for different switches at the HMI 1400).

Figure 15:
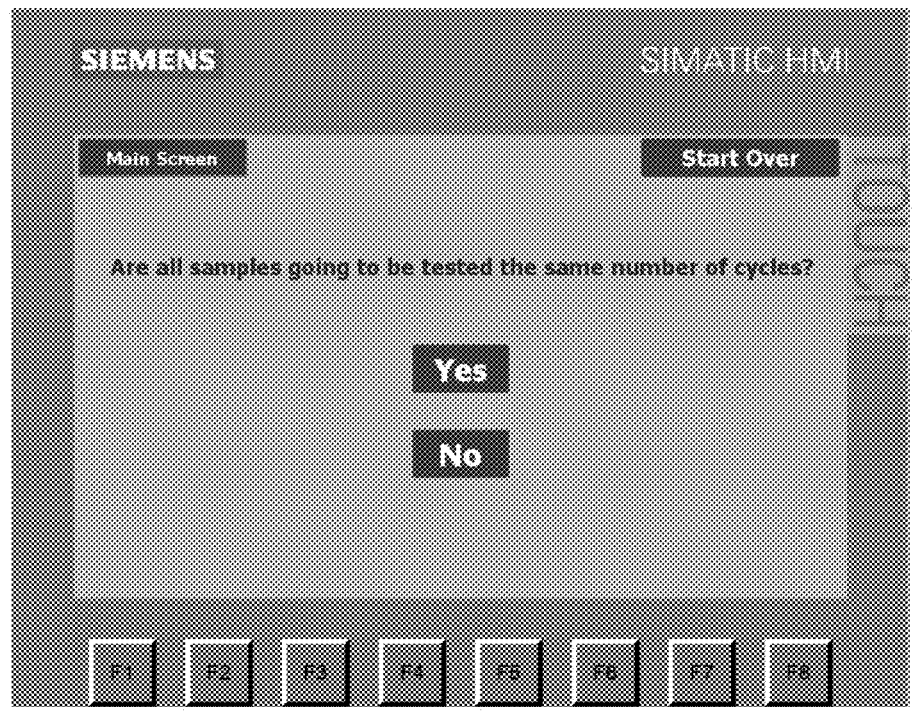
Figure 16:
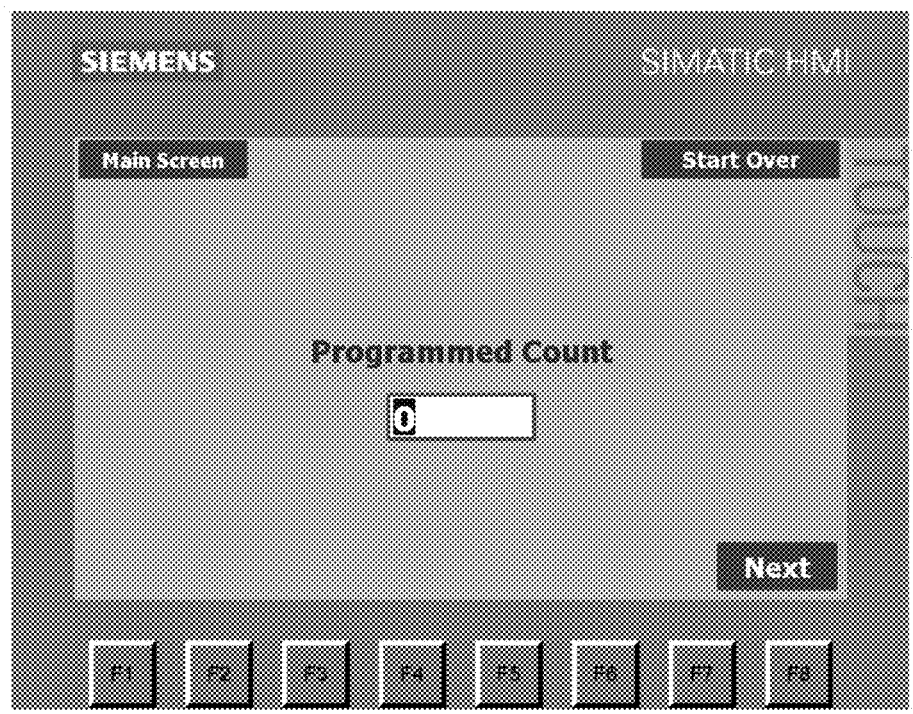
Figure 17:
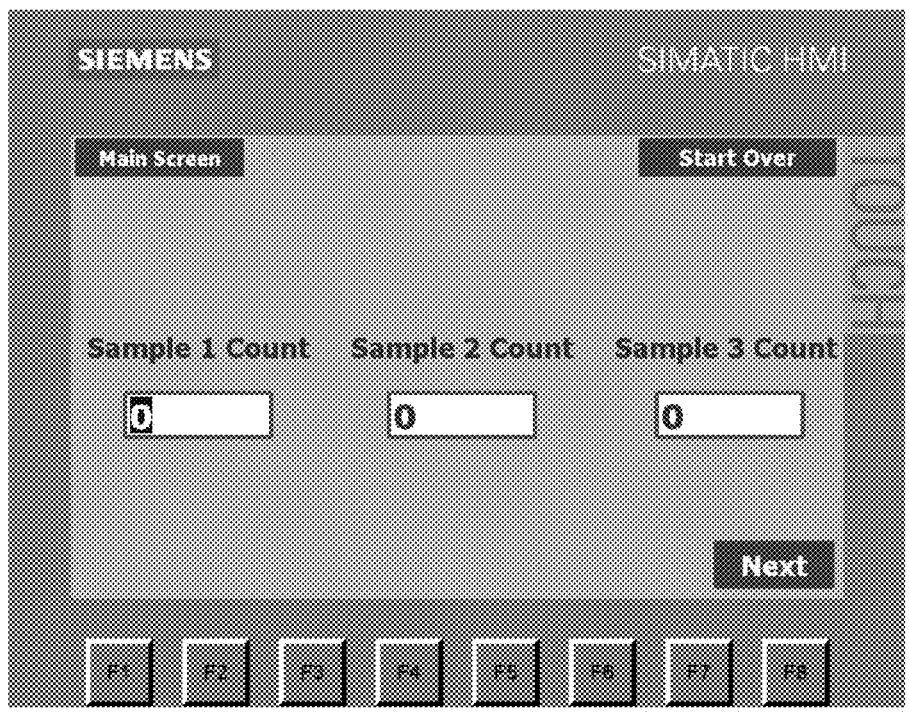
Figure 18:
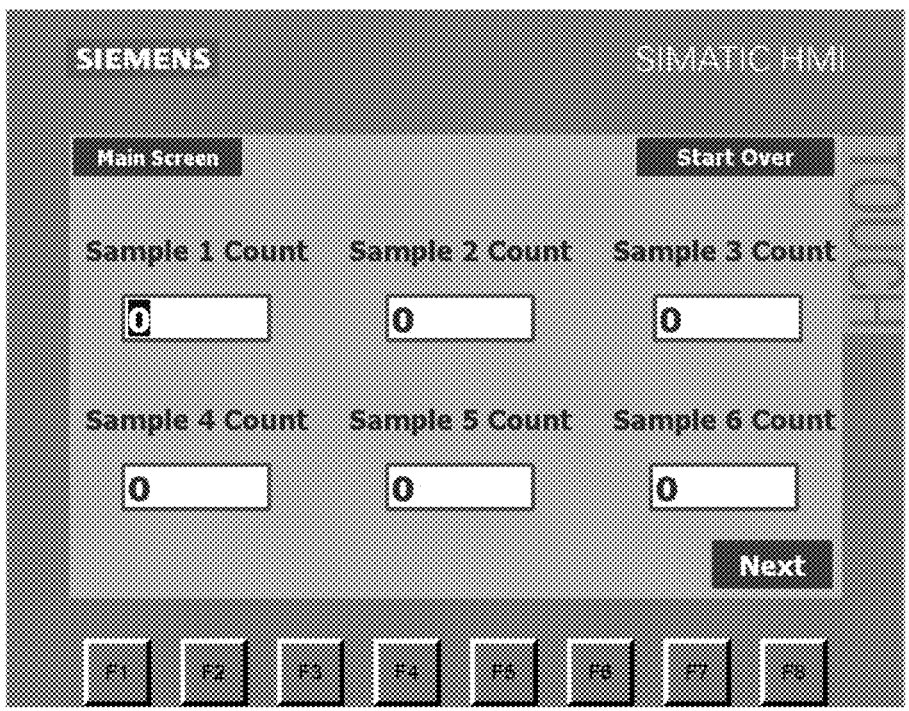

An HMI 1500 in FIG. 15 allows the user to select whether all the samples being tested will be tested for the same number of cycles or not. An HMI 1600 of FIG. 16 allows the user to enter how many counts or cycles the test may complete for all samples if "Yes" is selected in the HMI 1500. HMIs 1700 in FIGS. 17 and 1800 in FIG. 18 allow the user to enter different numbers of counts/cycles to test switches for if "No" is selected in the HMI 1500, where the HMI 1700 is displayed if the user has selected to test double throw switches and the HMI 1800 is displayed if the user has selected to test single throw switches.

Figure 19:
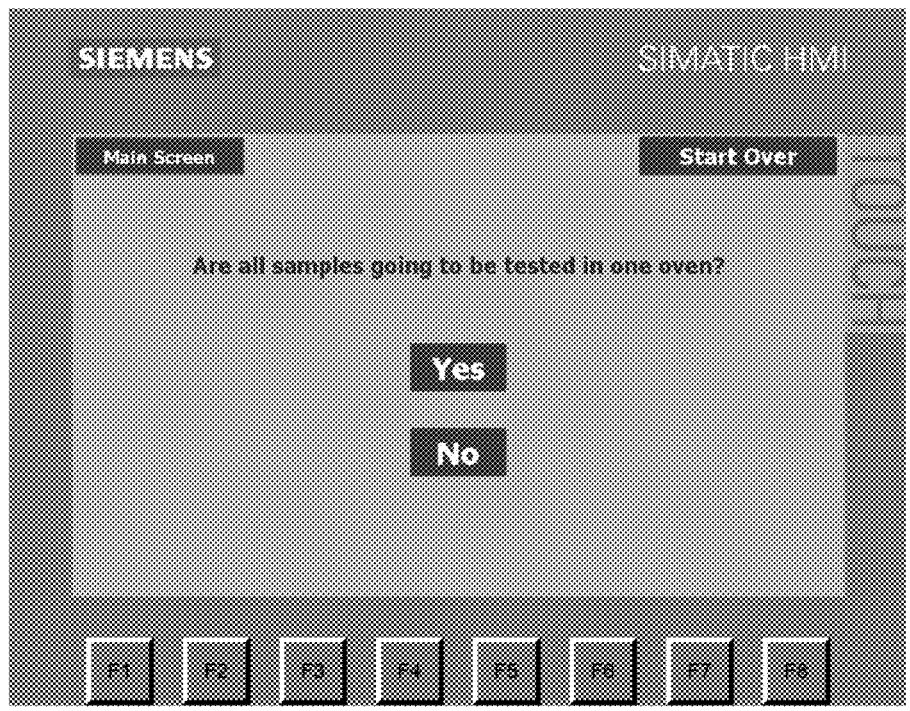
Figure 20:
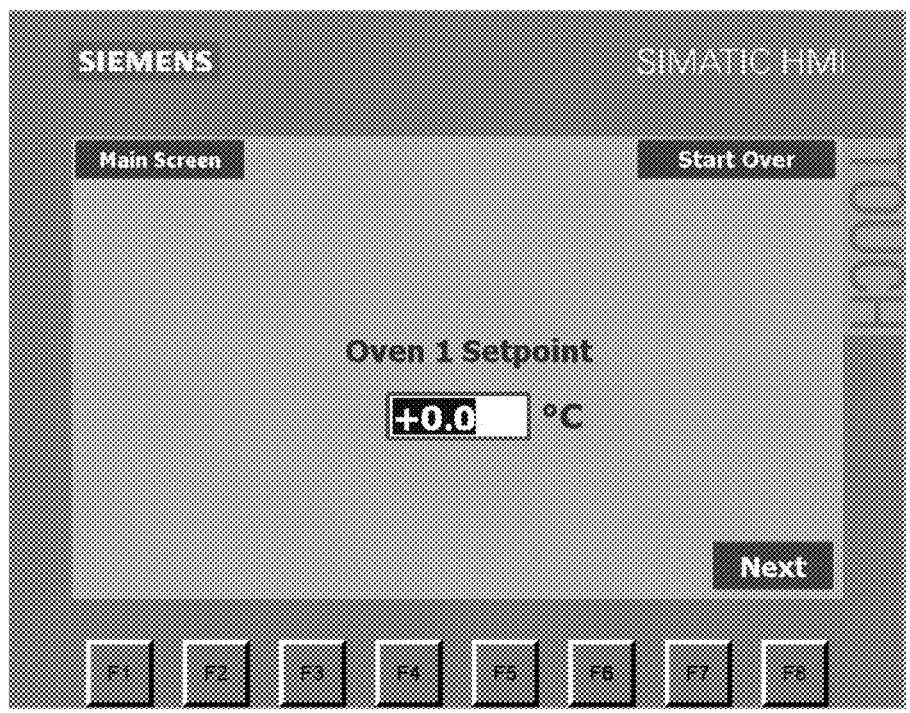
Figure 21:
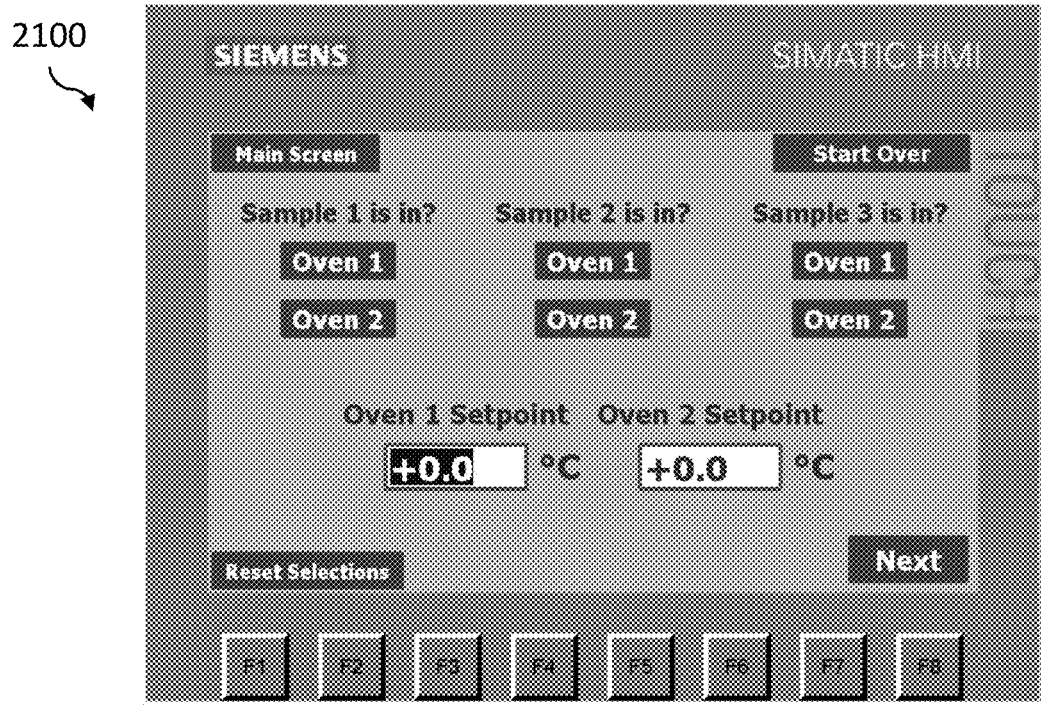
Figure 22:
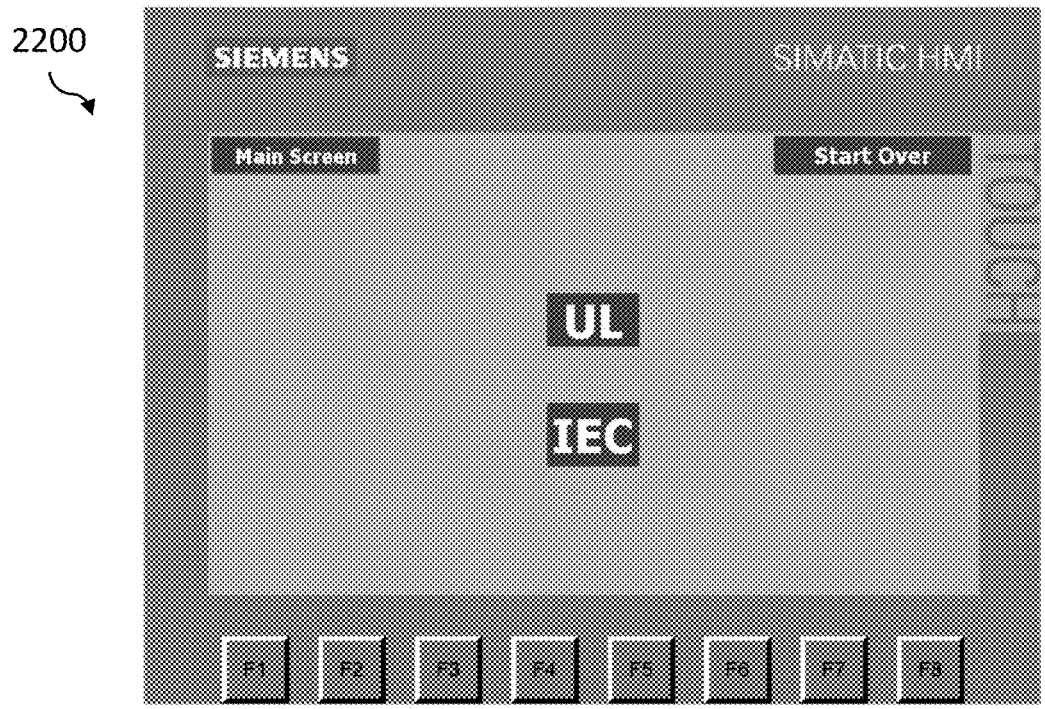

An HMI 1900 in FIG. 19 allows the user to select whether all the samples for a given test will be tested in one oven. That is, the user can indicate whether each of the samples should be tested at the same (by selecting "Yes") or different (by selecting "No") temperatures. An HMI 2000 in FIG. 20 is displayed if the user selects "Yes" in the HMI 1900, and allows the user to set the single oven temperature. An HMI 2100 in FIG. 21 allows the user to select different oven temperatures and indicate which sample is in which oven (e.g., what temperature each given switch should be tested at). An HMI 2200 in FIG. 22 allows the user to select what type of standard (e.g., "UL" or "IEC") is being used to test the switches. This selection may control, for example, how many cycles of a given test are performed at a particular oven temperature and how many cycles of a given test are performed at room temperature. For example, an IEC test may perform 50% of cycles at an ambient or room temperature while 50% of cycles are performed at a set oven temperature. In contrast, a UL test may be performed with 100% of cycles at either of an ambient/room temperature or a set oven temperature.

Figure 23:
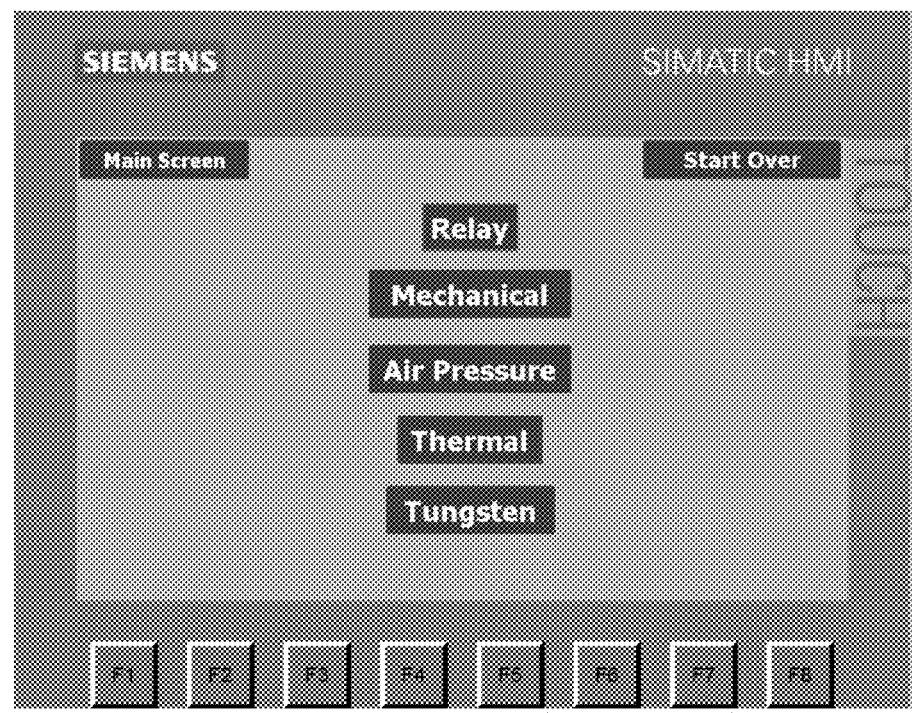
Figure 24:
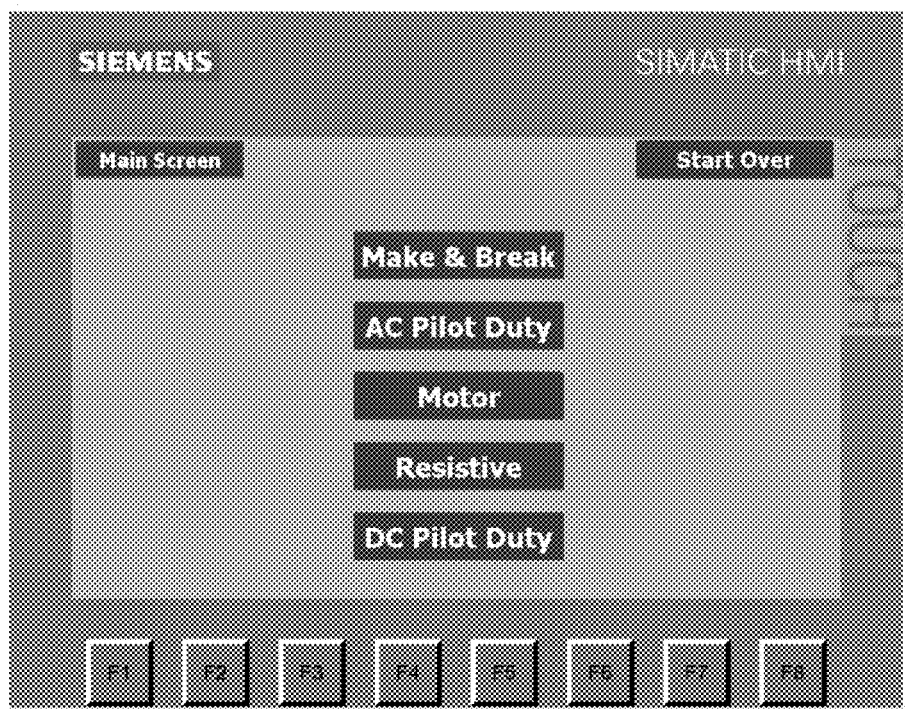
Figure 25:
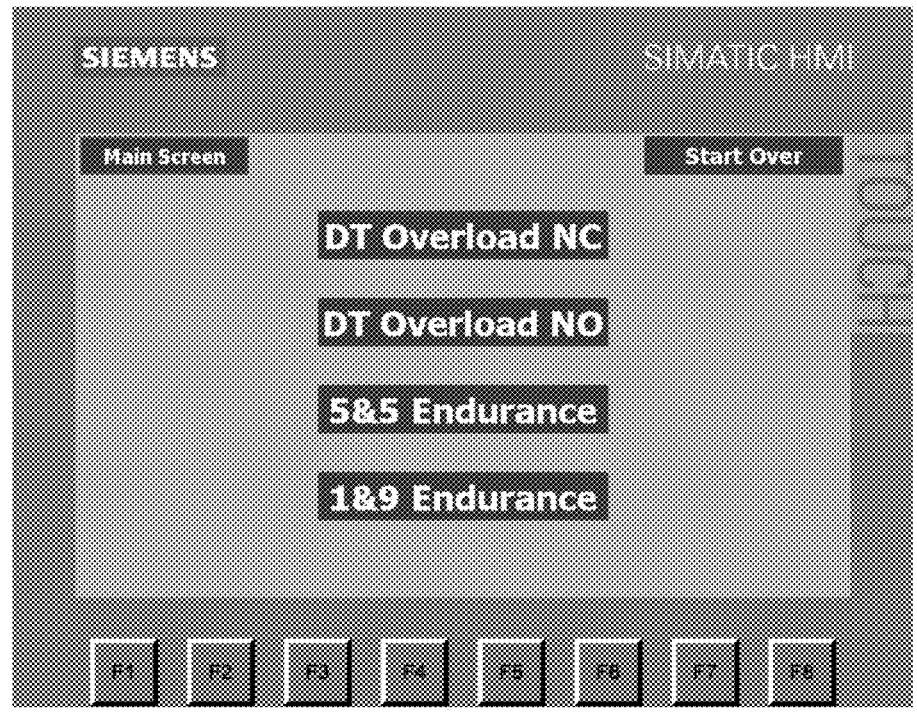

An HMI 2300 in FIG. 23 may further allow a user to select what type of switches are being tested (e.g., "Relay," "Mechanical," "Air Pressure," "Thermal," "Tungsten"). An HMI 2400 in FIG. 24 allows the user to select what type of test is to be run (e.g., "Make & Break," "AC Pilot Duty," "Motor," "Resistive," "DC Pilot Duty"). An HMI 2500 in FIG. 25 allows the user to select different types of overload or endurance tests. The example in the HMI 2500 particularly allows a user to select double throw overload normally closed, double throw overload normally open, five second on five second off endurance, or one second on nine second off endurance tests.

Figure 26:
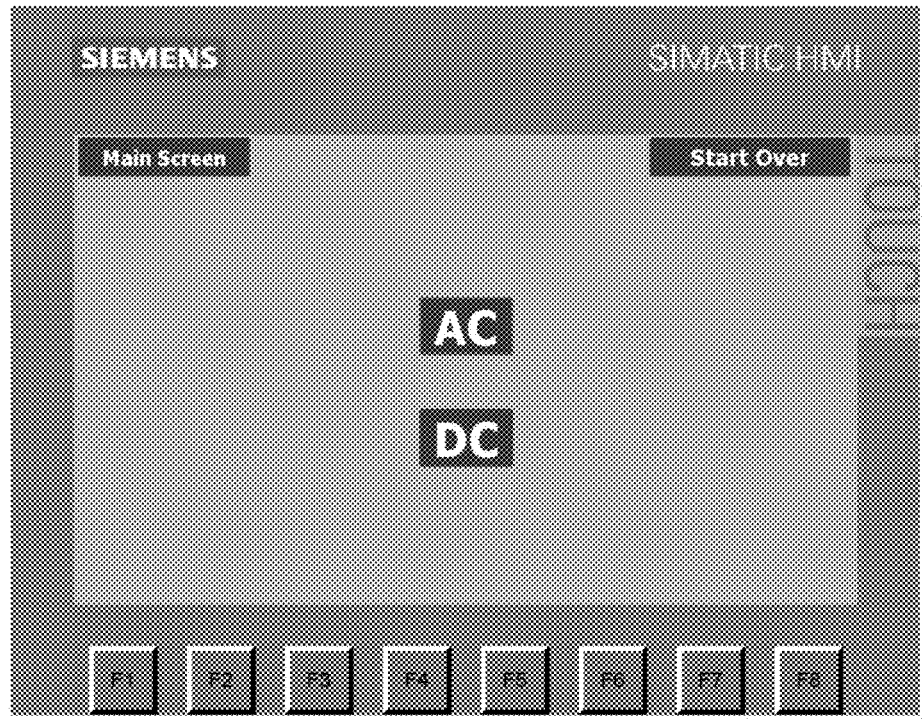
Figure 27:
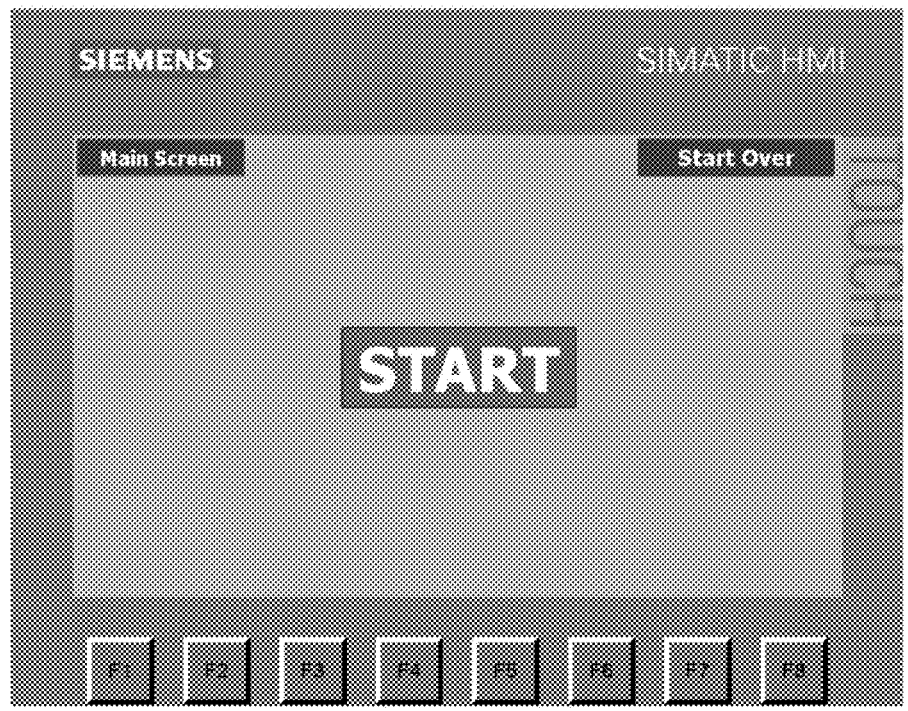

An HMI 2600 in FIG. 26 allows the user to select between alternating current or direct current for a test. An HMI 2700 in FIG. 27 allows the user to officially start a test for which information has been entered on the other HMIs.

Figure 28:
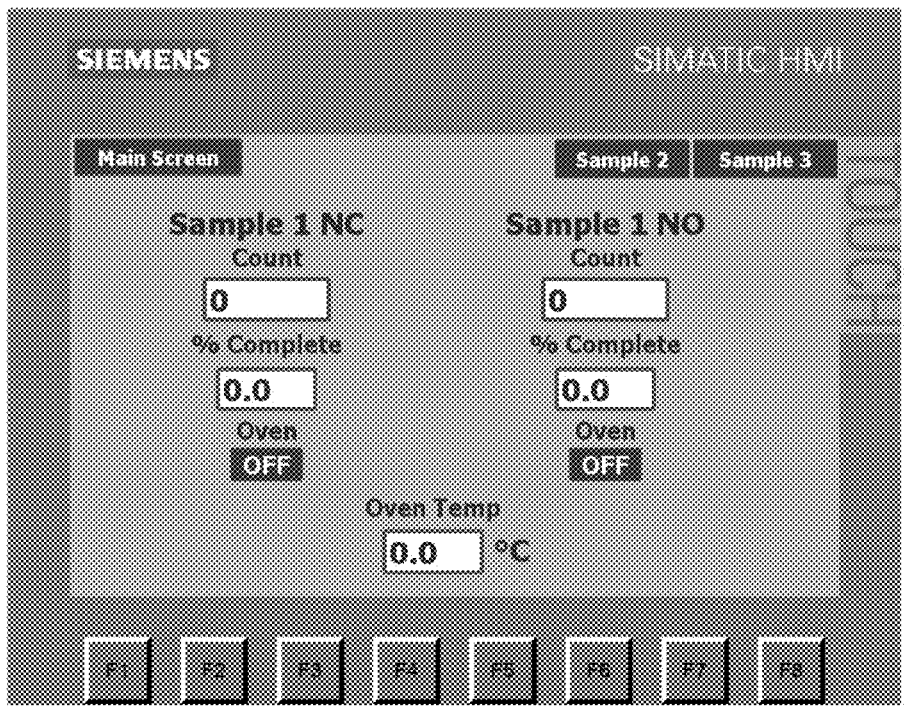
Figure 29:
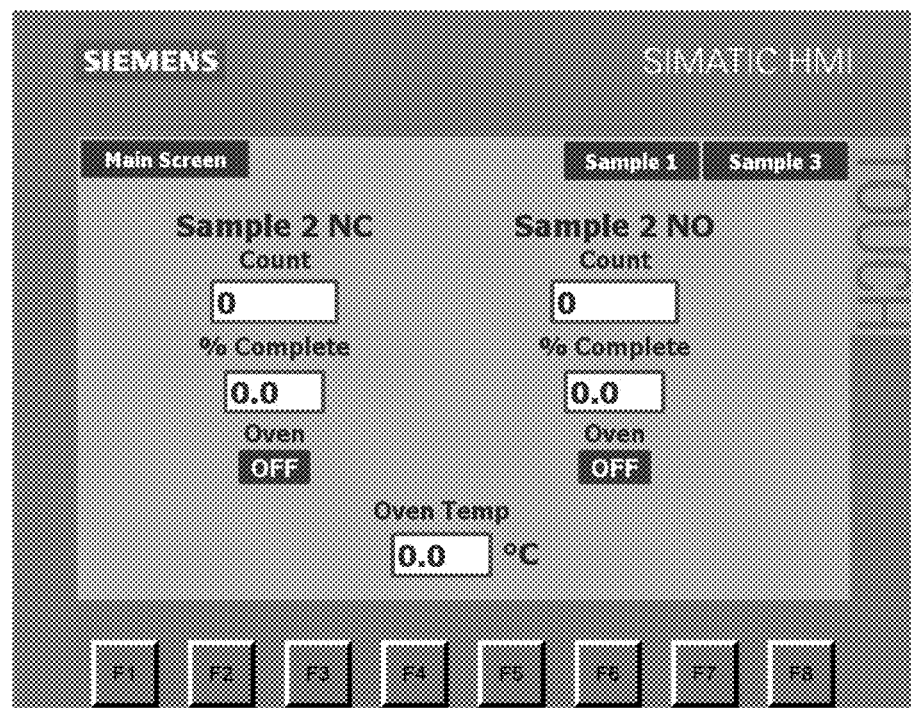
Figure 30:
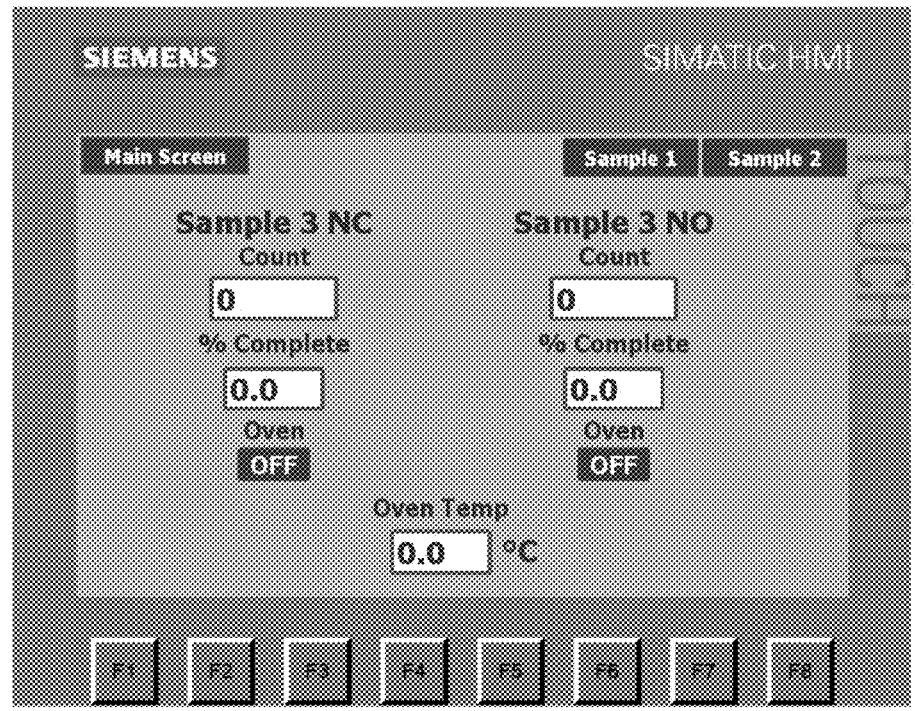

An HMI 2800 in FIG. 28 shows an example HMI that may be displayed during a test of double throw relays. In particular, the HMI 2800 shows information for a first sample during a test, including what count the test is at for both of the normally closed and normally open components of Sample 1 is at, what percentage of a given test is complete for both of the normally closed and normally open components of Sample 1 (e.g., how many counts of a total number of desired counts have been completed), whether an oven is on for Sample 1 and at what temperature the oven is currently at for Sample 1. The HMI 2800 also includes buttons that a user may select to show similar information for Samples 2 and 3 that are under test, if applicable. If the user selects one of those buttons, one of HMI 2900 of FIG. 29 or HMI 3000 of FIG. 30 may be displayed, and HMIs 2900 and 3000 may similarly include buttons to select that information related to other samples be displayed. Each of the HMIs 2800, 2900, and 3000 may also include a "Main Screen" button to go back to a home or default HMI.

Figure 31:
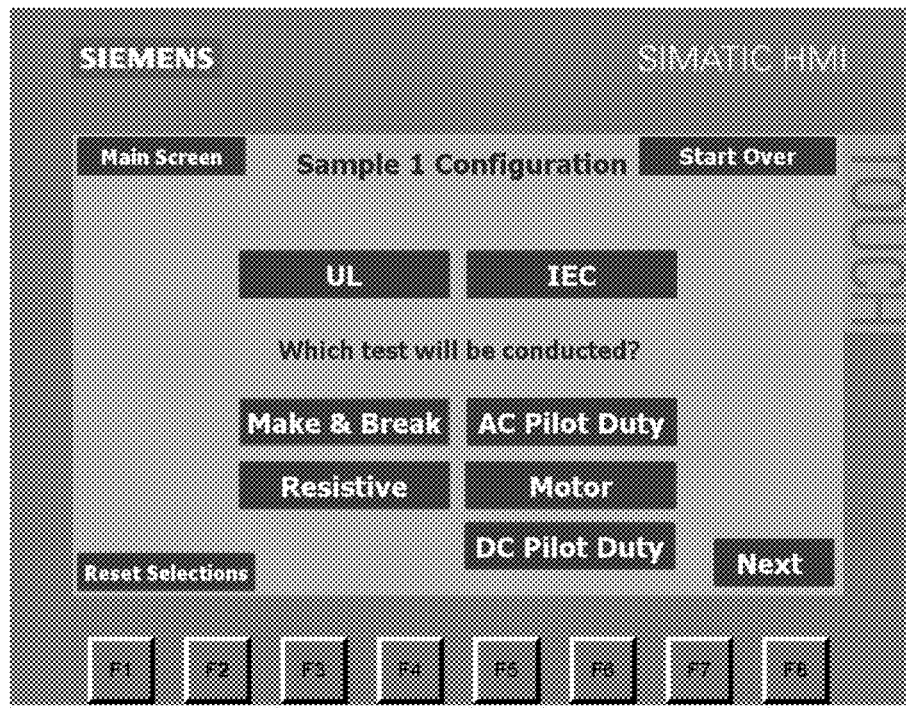
Figure 32:
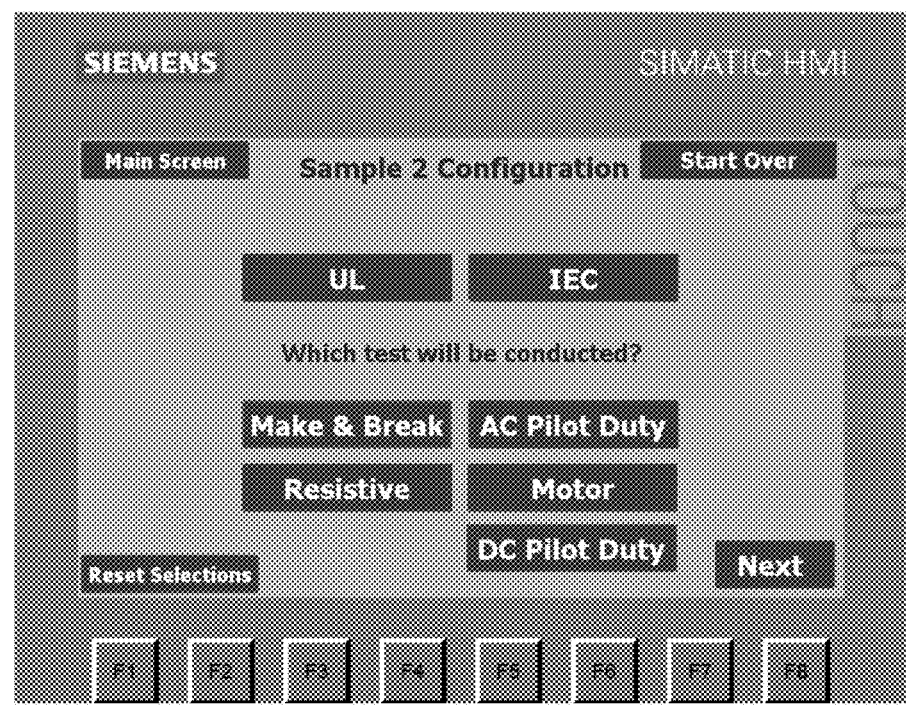
Figure 33:
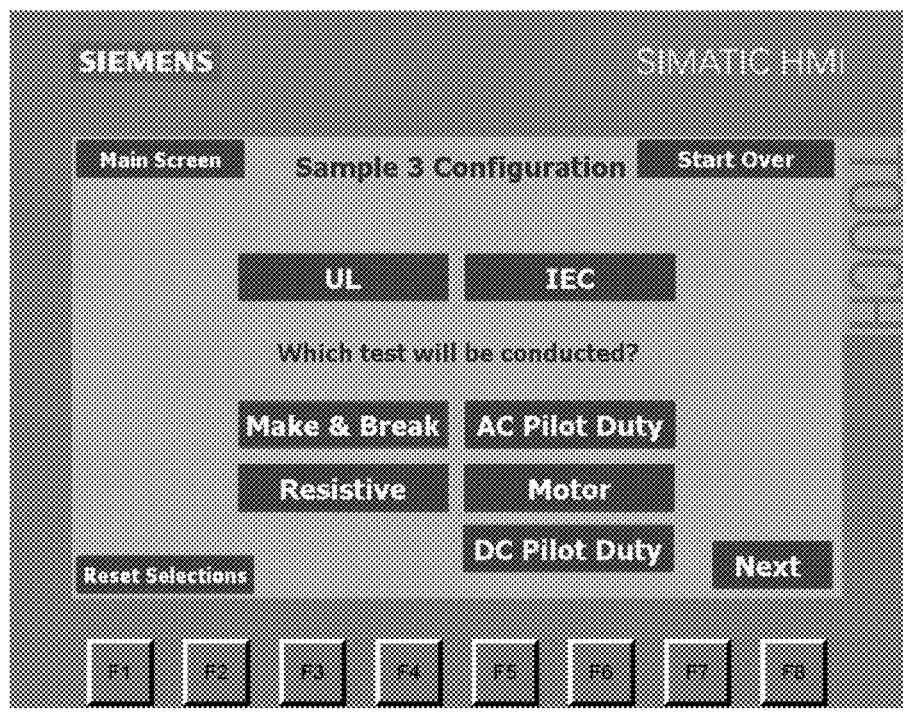
Figure 34:
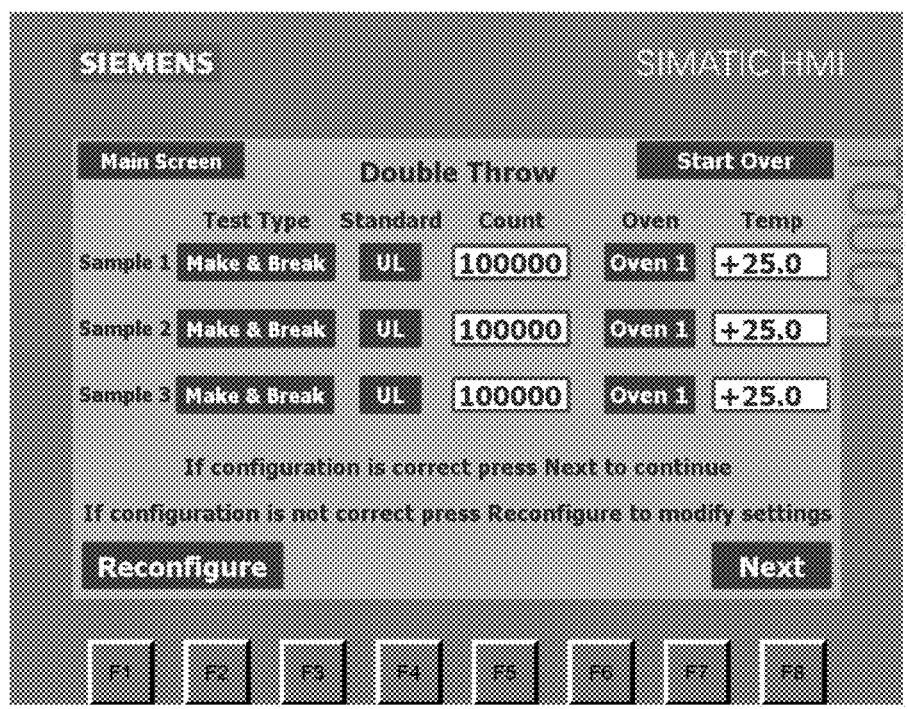

An HMI 3100 of FIG. 31, an HMI 3200 of FIG. 32, and/or an HMI 3300 of FIG. 33 may be sequentially displayed if the "Different Tests" option is selected at the HMI 1000, so that the user can enter information for how each sample for up to three double throw samples will be tested. An HMI 3400 of FIG. 34 may display information selected on HMIs 3100, 3200, and 3300 so that the user can confirm the details of each test for the different samples.

Figure 35:
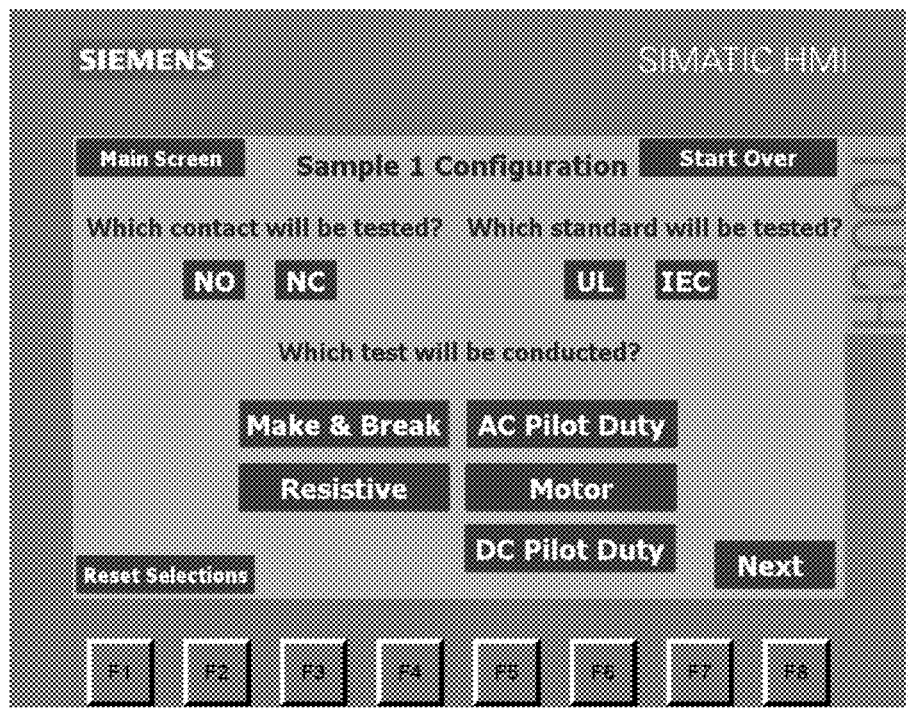
Figure 36:
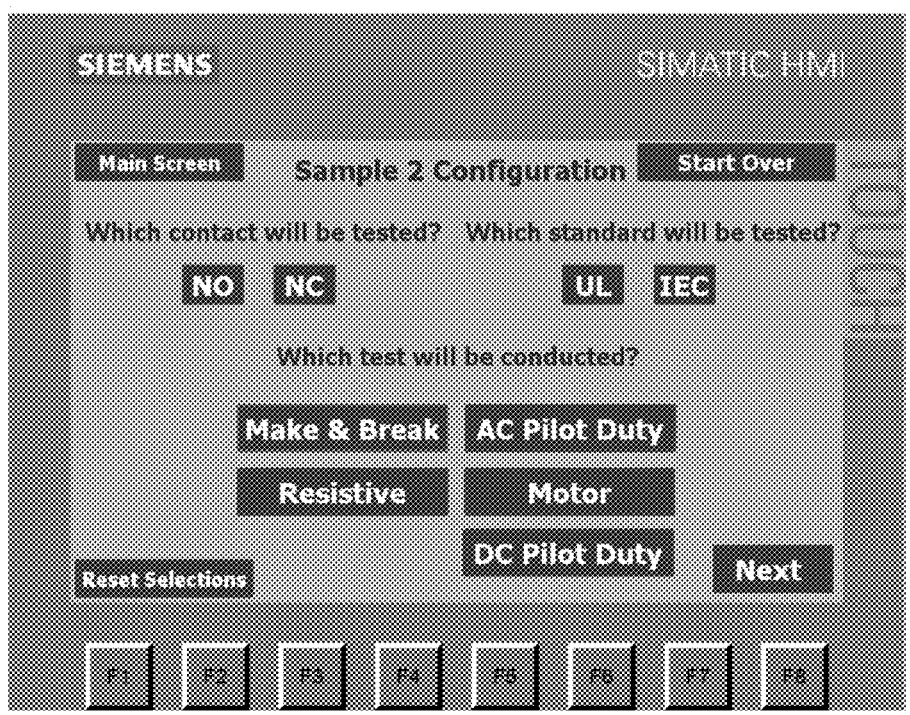
Figure 37:
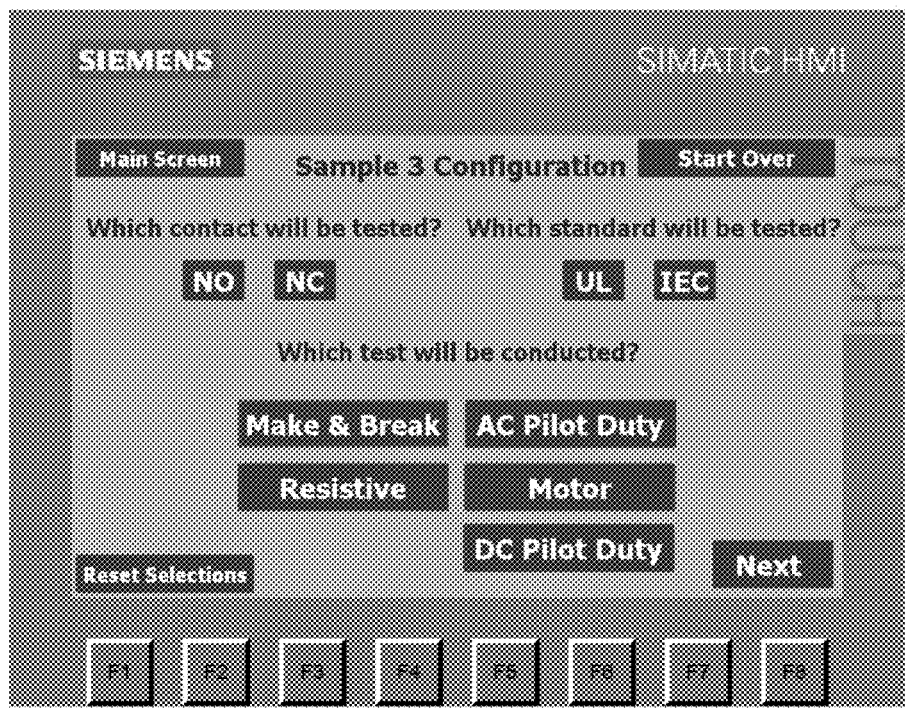
Figure 38:
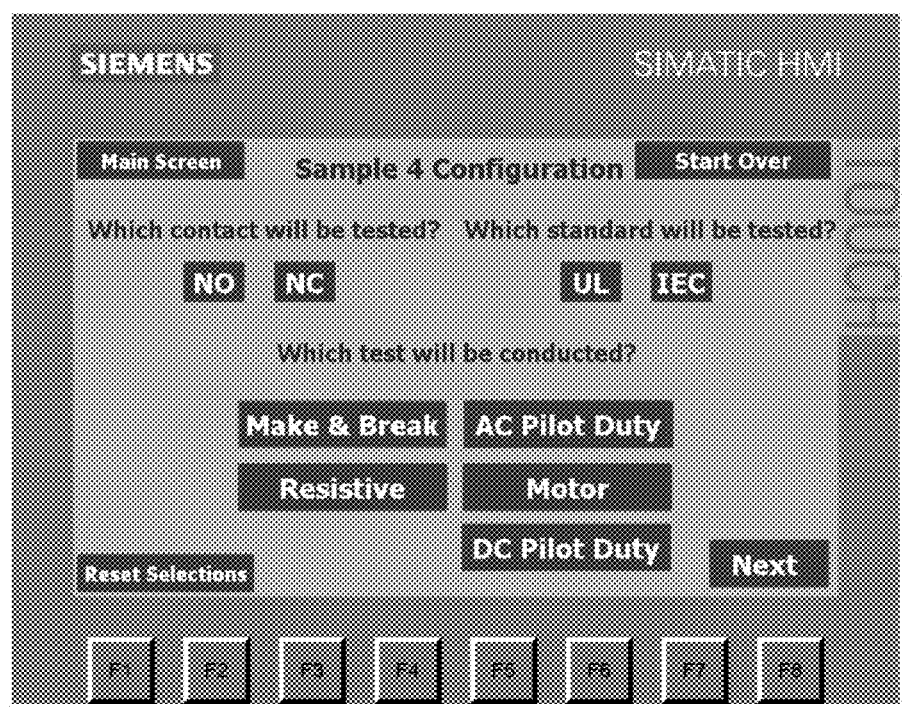
Figure 39:
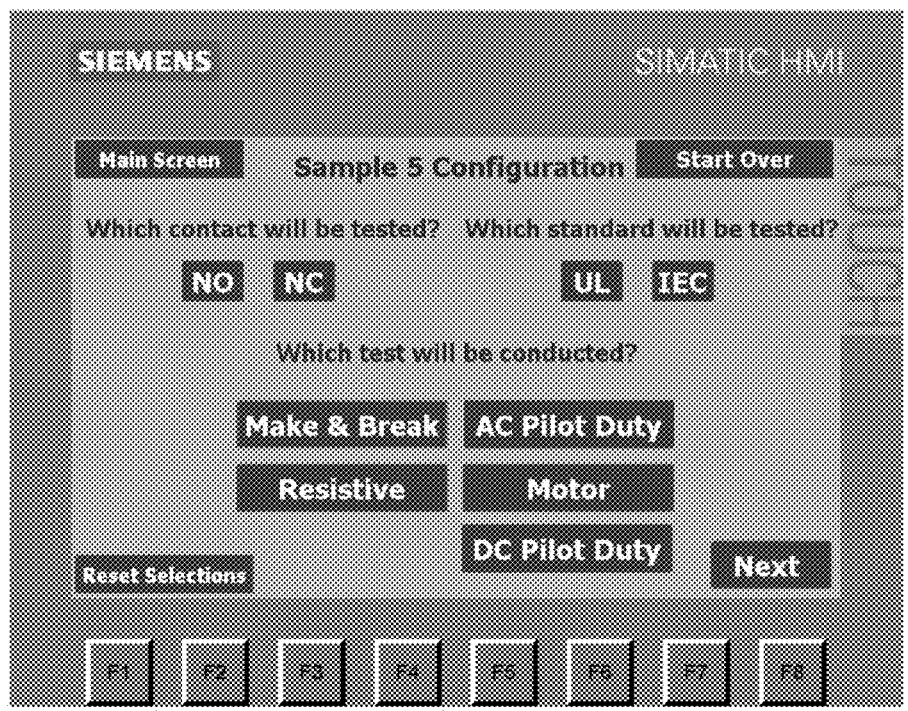
Figure 40:
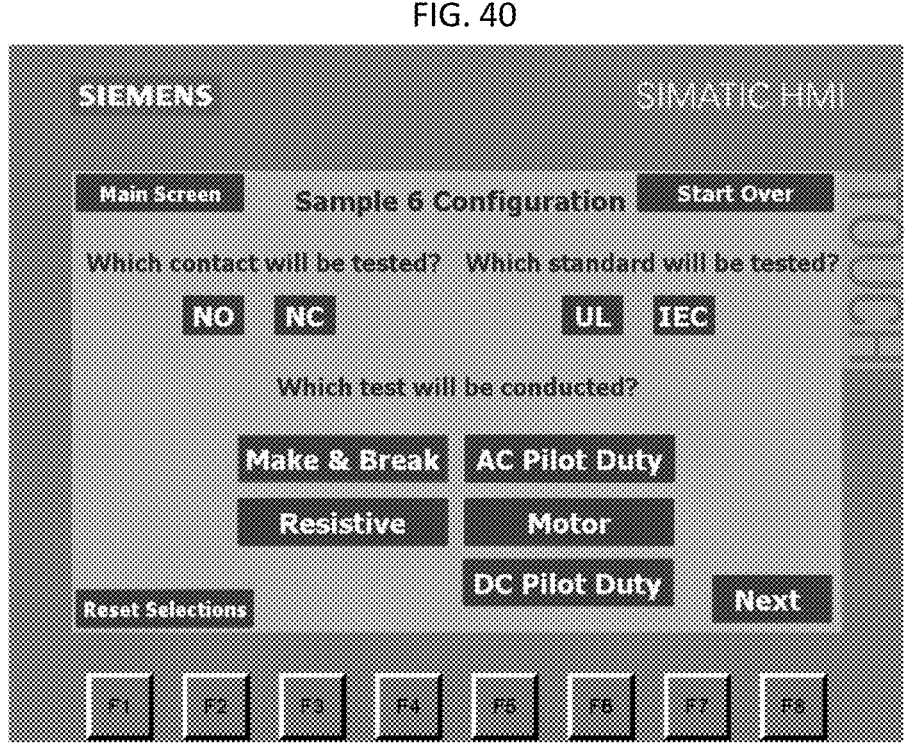
Figures 41, 42:
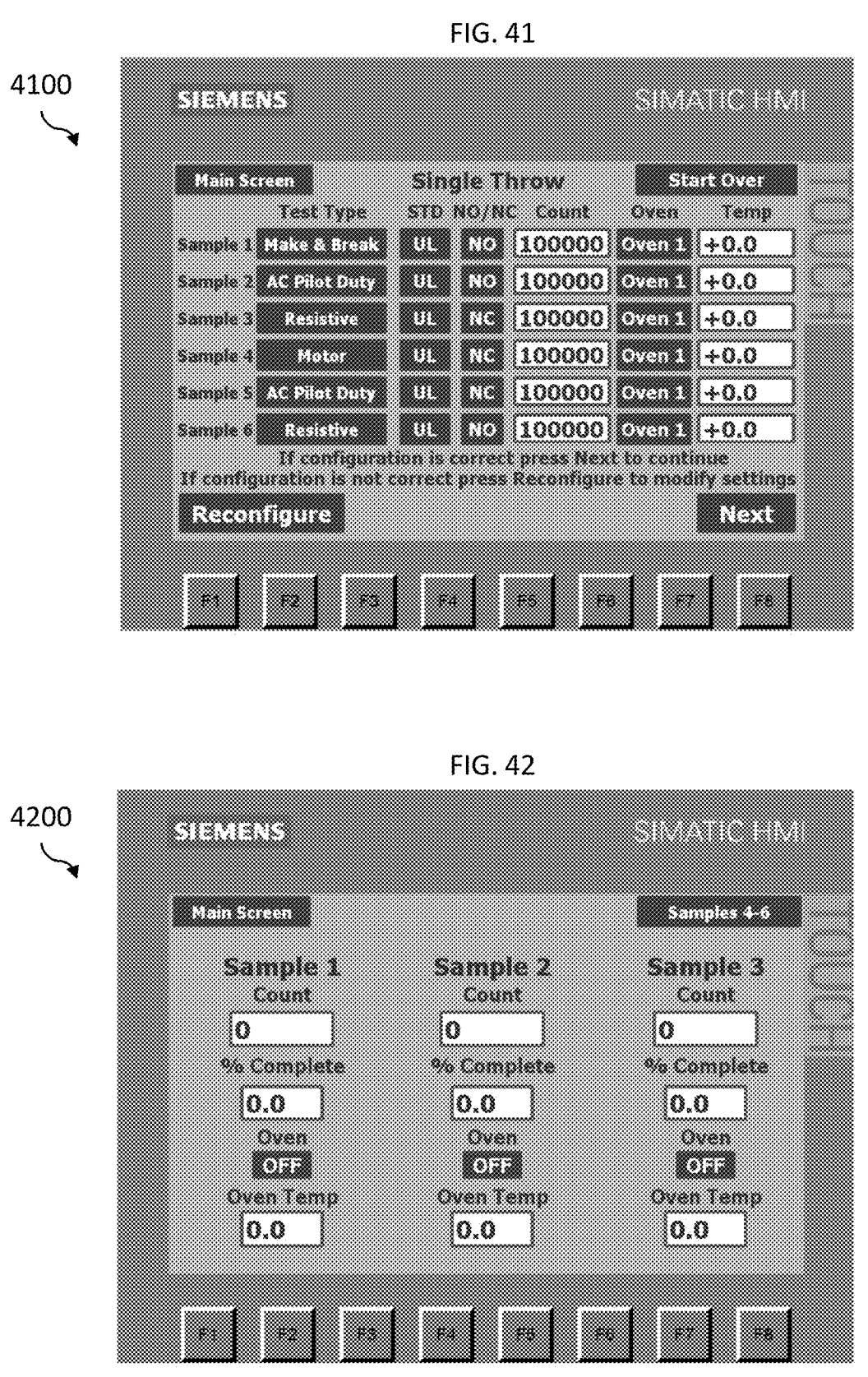
Figure 43:
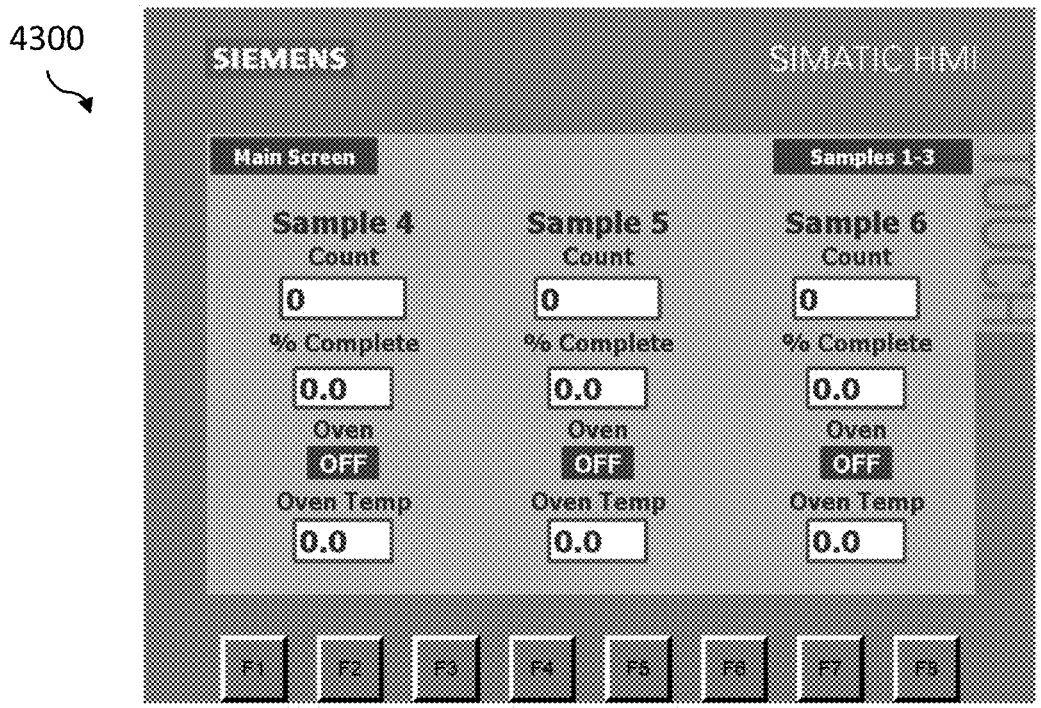

HMIs 3500 of FIG. 35, 3600 of FIG. 36, 3700 of FIG. 37, 3800 of FIG. 38, 3900 of FIG. 39, and 4000 of FIG. 40 may be similar to HMIs 3100, 3200, and 3300 except the HMIs of FIGS. 35-40 are for when up to 6 single throw switches are being tested and some of the switches may have different tests. HMI 4100 of FIG. 41 further shows an HMI similar to HMI 3400 for the user to confirm the details for each sample when single throw samples are being tested. HMIs 4200 of FIG. 42 and HMI 4300 of FIG. 43 further show status screens that may be displayed while single throw tests are being completed so that a status for each switch may be displayed and monitored.

SiC Switch for Use in Example Test Apparatuses

When using traditional electromechanical relays for switching electrical power there may be a reduction in contact life due to degradation from arcing. For example, a normally closed (NC) contact of a switch such as in the relay 4 of FIG. 4 may degrade over time from breaking the current during testing. For example, the contacts may eventually weld together. Even before the contacts weld together and become unusable, the duration of time to break the contact may go up as the contacts begin to degrade.

As an alternative to electromechanical relays for use with electrical power switching, a solid-state solution is often used for longevity. In the case of product safety compliance electrical endurance testing a standard SCR (or similar) solid-state relay may not suffice because of the forward voltage drop. As such, a metal-oxide-semiconductor field-effect transistor (MOSFET) as described herein may be advantageously used as it does not require a forward voltage to conduct. This may allow maximum power transfer to a device under test upon switching. As such, as described further herein, the relay 4 of FIG. 4, for example, and other similar relays of FIGS. 4 and 6-8 may be a make SiC switch and a break SiC switch as described herein. The make SiC switch may further advantageously use current sensing and a zero-cross cutoff logic and/or circuit to turn off the load connected to the switch (e.g., load 29 of FIG. 4). In various embodiments, the break SiC switch may not utilize zero-cross cutoff logic/circuitry.

Figure 44:
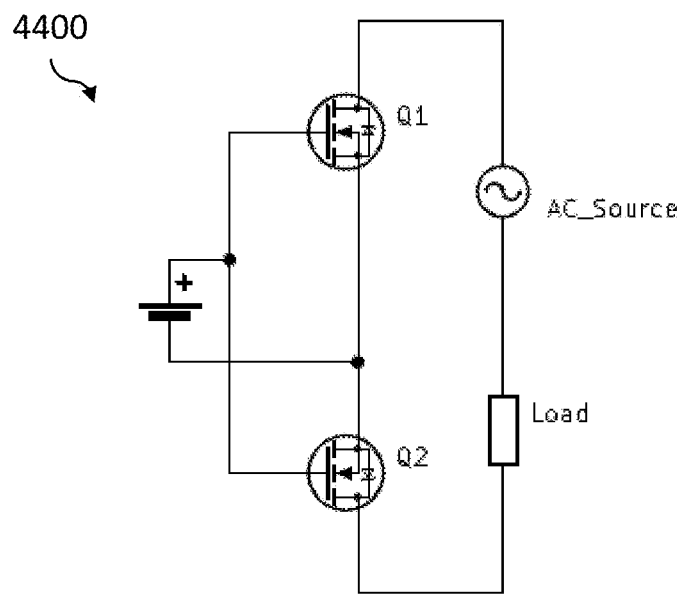
FIG. 44 is a schematic view of a SiC switch having two MOSFETs with a common source connection, in embodiments.

In particular a SiC switch as used herein may encompass two N-Channel Enhancement Mode MOSFETs connected in a common source configuration. FIG. 44 is a schematic diagram of the MOSFETs common source connection. This configuration allows the switch to not only allow current flow in two directions in the on state, but to block current both in the positive and negative directions in the off state. The MOSFET internal diode is only used as a blocking diode when the MOSFETs are in an off state. When the MOSFETs are in an on state the voltage drop across each MOSFET is below the forward voltage drop of the diode and it does not conduct. The switch can switch AC or DC loads in the same physical configuration.

In this application the MOSFETs are not pulsed on and off at a given frequency like in power conversion topologies. In this configuration the MOSFETs are pulsed on and held on 100% until the desired switch off time.

In this application both MOSFETs use a common gate driver IC. This IC is capable of driving the current necessary to charge both gates simultaneously while maintaining isolation between the gate input drive and source connections.

For material selection, silicon carbide (SiC) may be advantageously used. In this application, the SiC material allows higher power at a lower drain-source on-resistance (RDS (on)) than traditional Si materials. This allows the transition away from electromechanical relays in a wider range of load applications. This also allows this switch to be scalable. Utilizing a MOSFET with an increased drain current may increase the available or possible use cases.

Figure 45:
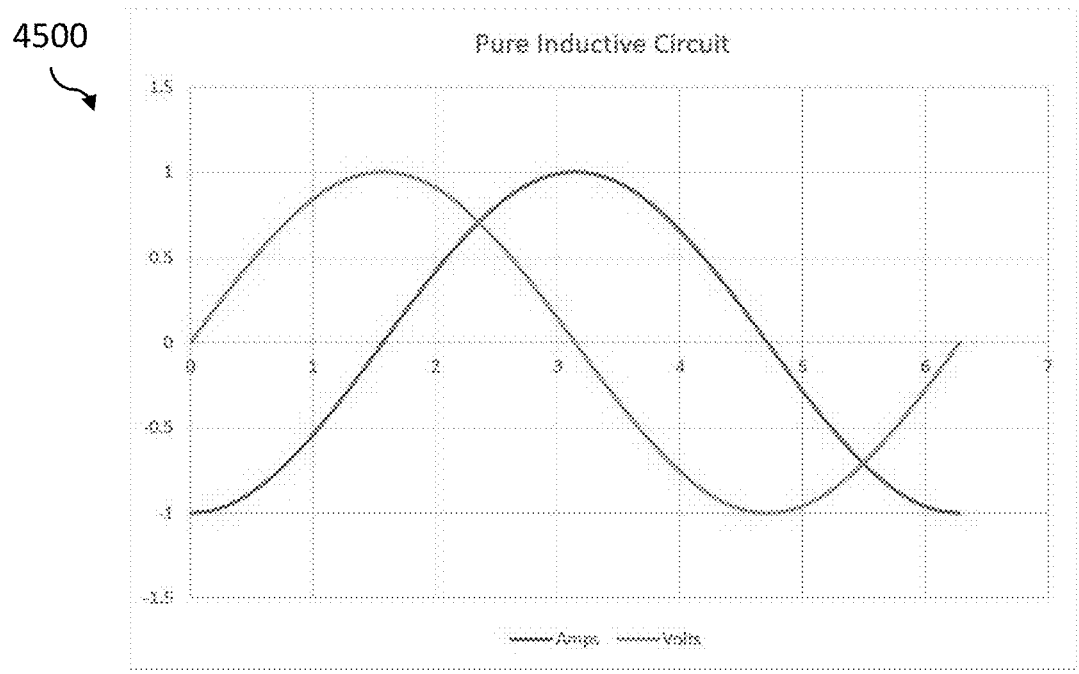
FIG. 45 is a diagrammatic view of a voltage and current waveform for an example SiC switch, in embodiments.

To prevent the MOSFET from going into an avalanche breakdown while switching an inductive AC load, a zero-crossing current detector circuit may also be used. This circuit will delay the switching off of the MOSFETs gates until a zero-crossing event of the current waveform. The current may be used as the zero-crossing cutoff threshold so as to not limit the ability of the switch to handle a wide range of load power factors. This zero-crossing cutoff eliminates the voltage transient of an inductive circuit. This switch may see, for example, an inductive power factor anywhere between 1.0 and 0.35 or less in application, and because of this the zero-crossing of the voltage may not be useful or advantageous to use. See FIG. 45, which is a diagrammatic view of a voltage and current waveform for an example SiC switch. In various embodiments, zero-crossing logic and circuitry may also be used with other types of switches or relays than the SiC switches described herein.

For the current zero-crossing to control the shutdown behavior of the switch the following digital logic is employed. The input to the digital logic stage comes from an amplifier and comparator stage. This amplifies a current sensor signal and then creates a square wave output with a comparator. Each edge of the square wave denotes a zero-crossing event. This digital logic stage is placed in between the input trigger stage and the gate driver stage. See FIG. 46, which is a schematic view of digital logic for implementing a zero-crossing current circuit.

Figure 46:
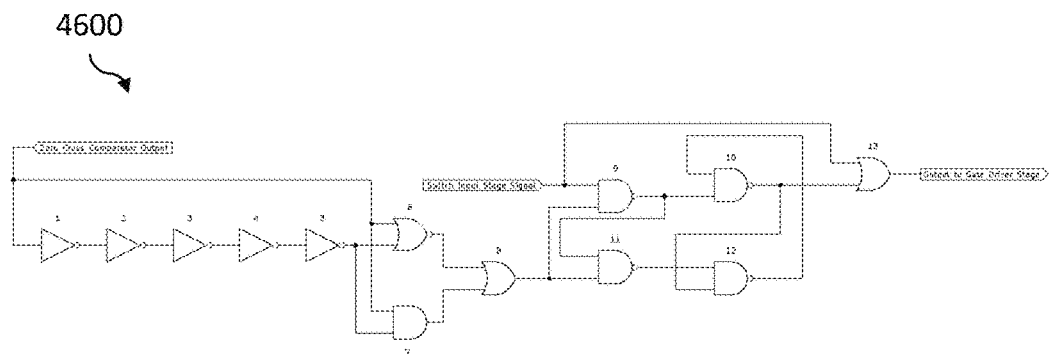
FIG. 46 is a schematic view of digital logic for implementing a zero-crossing current circuit, in embodiments.

Logic gates 1-5 of FIG. 46 are inverter gates connected in series. This connection not only inverts the logic level but takes advantage of the inherent propagation delay of the integrated circuit (IC) to delay the input briefly to logic gates 6 and 7 of FIG. 46. Logic gate 6 is a NOR gate that is used for triggering an output clock pulse when the AC current zero-cross is negative (falling edge of comparator output).

For a brief moment both inputs to gate 6 are low triggering a high clock pulse output. Logic gate 7 is an AND gate that is used for triggering an output clock pulse when the AC current zero-cross is positive (rising edge of comparator output). For a brief moment both inputs to gate 7 are high triggering a high clock pulse output. Logic gate 8 is an OR gate that allows either the positive or the negative edge clock pulse to trigger the NAND gate stage. Logic gates 9-12 of FIG. 46 are NAND gates and form an edge triggered D Latch. When the switch input stage signal is high, that logical 1 is not passed to the output of the D latch until the next clock signal (zero-crossing). While the switch input stage is high the zero-crossing clock pulse has no affect on the gate drive due to the OR logic gate 13 of FIG. 46. When the switch input stage signal goes low the gate drive circuit is still high and holding the switch on. Only when the next zero-crossing event clock signal triggers the D latch it will move the logic low to gate 13 and the gate driver input will go low turning off the switch. This logic allows a random turn on, and zero-crossing turn off. This zero-crossing cutoff also allows control over non-sinusoidal AC signals.

SiC MOSFETs may be configured in discrete units or in modules, for example. The various embodiments herein may use a switch configuration that has either discrete units or separate modules. However, MOSFET modules may have a half-bridge topology with two MOSFETs but connected in a drain to source configuration. Two separate modules may therefore be utilized in the embodiments described herein to provide the bi-directional blocking. Thus, using two MOSFET modules in this manner may unnecessarily increase size, heating mitigations, and cost of the various embodiments herein. As such, discrete SiC MOSFETs modules may have their MOSFETs connected in the configuration described herein where the switch configuration has the MOSFETs' common source is used as AC/DC switches in one package. Such a switch may also be used in other commercial and industrial uses than the relay testing embodiments described herein, particularly because such switches may provide for reduced RDS (on) and larger current handling capabilities than other MOSFET modules available commercially.

Figure 47:
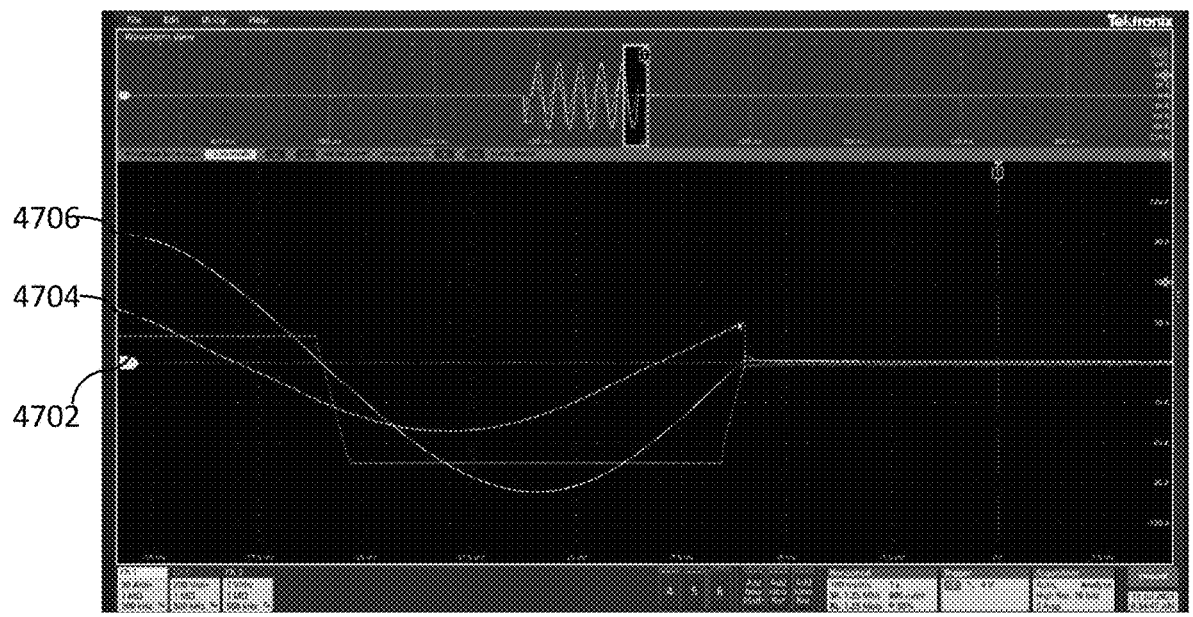
FIG. 47 is a diagrammatic view of waveforms demonstrating implementation of a zero-crossing current circuit, in embodiments.

FIG. 47 is a diagrammatic view 4700 of waveforms demonstrating implementation of a zero-crossing current circuit, in embodiments. Waveform 4702 is an amplifier output, waveform 4704 represents the voltage, and waveform 4706 represents the current. As shown, as soon as the waveform 4706 (current) gets to zero it goes to off to keep the waveform 4706 (current) from crossing zero. Then when the switch is turned off there is not a large or significant amount of buildup of current present in the switch, and the switch can be turned off without damaging or without causing significant damage to the switch.

As such, described herein are advantageous configurations of common source configurations of SiC MOSFETs that may be used in various product safety compliance testing apparatuses. A zero-crossing current sensing logic and circuitry may also be used with such switches or in other applications as a standalone solution to provide for switching where there is no buildup or presence of current. Furthermore, the common source configuration with SiC MOSFETS may be advantageously used outside of product safety compliance testing.

Universal Voltage Board

Various embodiments described herein may further benefit from a circuit capable of sensing a wide range of AC and DC voltages. Such a circuit as described herein may advantageously allow the sensing of when a sample DUT switch closes and sensing of anywhere from, for example, 5 volts (V) to 700 V or even 5 V up to 1600 V, and the sensing may sense either AC or DC voltages quickly and accurately so that voltage levels at the switches/samples being tested may be read quickly and accurately no matter what type of switch it is. This may be advantageous to have a circuit for sensing different AC and DC voltages, as a PLC for example may operate at a 24 VDC, for example, limiting the types, amounts, and/or quickness with which a PLC system may be able to, on its own, be configured to measure different AC or DC voltages.

Figure 48:
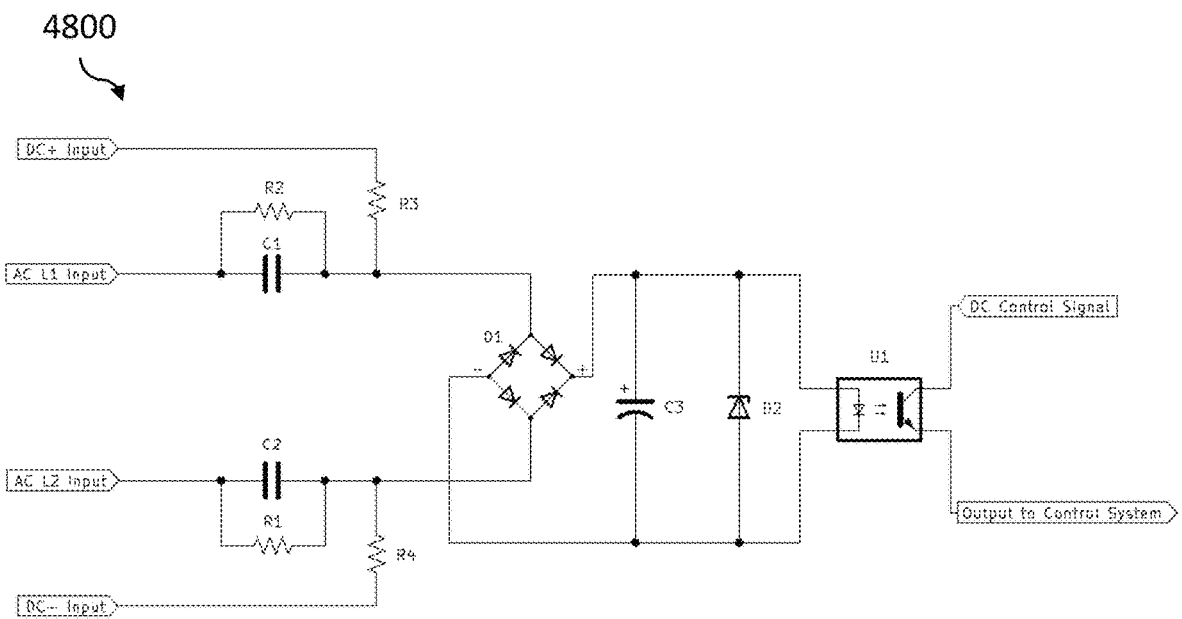
FIG. 48 is a schematic view of a universal voltage board for sensing both alternating current (AC) and direct current (DC) voltages, in embodiments.

The universal voltage board described herein solves the problem of trying to step down higher voltages either with transformers or voltage dividers for sensing in a control system. This circuit advantageously has provisions for AC or DC voltage sensing. FIG. 48 is a schematic view of a universal voltage board 4800 for sensing both alternating current (AC) and direct current (DC) voltages.

AC voltages are connected to the L1 & L2 inputs of FIG. 48, and can be line to line or line to neutral referenced voltages. The voltage level is reduced with capacitive reactance from a series capacitor C1 or C2 in FIG. 48. Capacitors C1 and C2 provide voltage reduction, and resistors R1 and R2 in FIG. 48 are bleeder resistors. DC voltages are connected to the DC+ and DC− connections. Voltage is reduced by series resistors R3 or R4 of FIG. 48 and are connected directly to the diode bridge D1 of FIG. 48.

The signal is then full wave rectified by D1, filtered by capacitor C3 of FIG. 48 and held to a low voltage level by Zener diode D2 of FIG. 48 (e.g., 5.6V). This allows a constant voltage to trigger the output solid-state relay U1 of FIG. 48. One side of the solid-state relay is connected to a control signal (e.g., 24 VDC of a PLC system). When voltage is present on the boards input terminals the control signal is switched on to pass to the rest of the control system. In this way, regardless of the voltage level of the AC or DC input the same control signal level is used on the output to indicate to the control system when a switch has switched on or off. This output signal to the control system can then be used to sense voltage presence for counting and accurate timing of load cycling, including in the various embodiments for switch/relay testing described herein, including for sensing voltage presence and cycle timing.

CONCLUSION

As such, described herein are various embodiments for a test fixture designed to conduct relay/switch electrical endurance tests, such as those covered in UL/IEC 60730-1 for example. The controller and apparatuses described herein allow for parallel testing of three double throw samples at one time, for example (or six single throw samples at one time), while reducing the required electrical loads used to test such samples if they were tested individually. Because the apparatuses and controller described herein may run multiple samples at once, time savings of approximately 66% from prior testing methods may be achieved, creating increased throughput for a testing lab.

As such, the time savings for testing samples may dramatically increase such as going from over 1 month in test completion time to approximately 12 days because multiple samples may be tested at once.

The methods and apparatuses described herein may also be used to test multiple samples to different ratings at one time, further increasing throughput of a given testing lab. The system may also test samples to different temperatures (e.g., where half of cycles are heated and half of cycles are at room/ambient temperature). Furthermore, this testing of different samples at different temperatures may advantageously be achieved in a single chamber/apparatus while a test runs and may be automated so that a user does not have to move switches around to different test equipment or manually restart or alter test conditions to achieve different testing temperatures.

The systems and method further provide for a system that can quickly and efficiently manage the timing of switching samples/DUTs on and off to achieve power usage savings while still completing tests efficiently. For example, in some devices such as PLCs there is a scan rate going from first rung of ladder down to the bottom and then repeat. If a different rung is used to control the timing for switching each switch/DUT, there can be some error or drift that comes into the system if there are minor errors every time the logic ladder for a given switch refreshes or scans. As such, the embodiments herein solve this potential issue by controlling all of the given DUTs in a test on a single timer or rung instead of operating switching logic for each switch/DUT on its own timer/rung.

Furthermore, drift from using ladder scanning rungs of a PLC may be further avoided, for example, by using an asynchronous timer that is not part of the ladder scanning of a PLC. Such an asynchronous timer may operate as a master clock signal that is used to control timing of the various switches described herein instead of timers built into the rungs of a PLC controller. For example, embodiments herein may use a timer that has a 10 Hz on/off cycle and any logic present in the rungs built using a PLC controller just refers back to that 10 Hz timer and count cycles to measure time instead of using logic that may use or operate separate timers.

In various embodiments, the systems and methods herein may also be implemented to test single and double throw switches at the same time. For example, the apparatus described above with respect to FIGS. 4 and 6-8 may be used to test one double throw and up to four single throw switches at the same time, up to two double throw switches and up to two single throw switches at the same time, etc. Various embodiments may also be capable of testing different numbers of switches, such as an embodiment that can test up to 6 double throw switches or up to 12 single throw switches, or an embodiment that can test up to 9 double throw switches or up to 18 single throw switches.

Example Computing Environment

Figure 49:
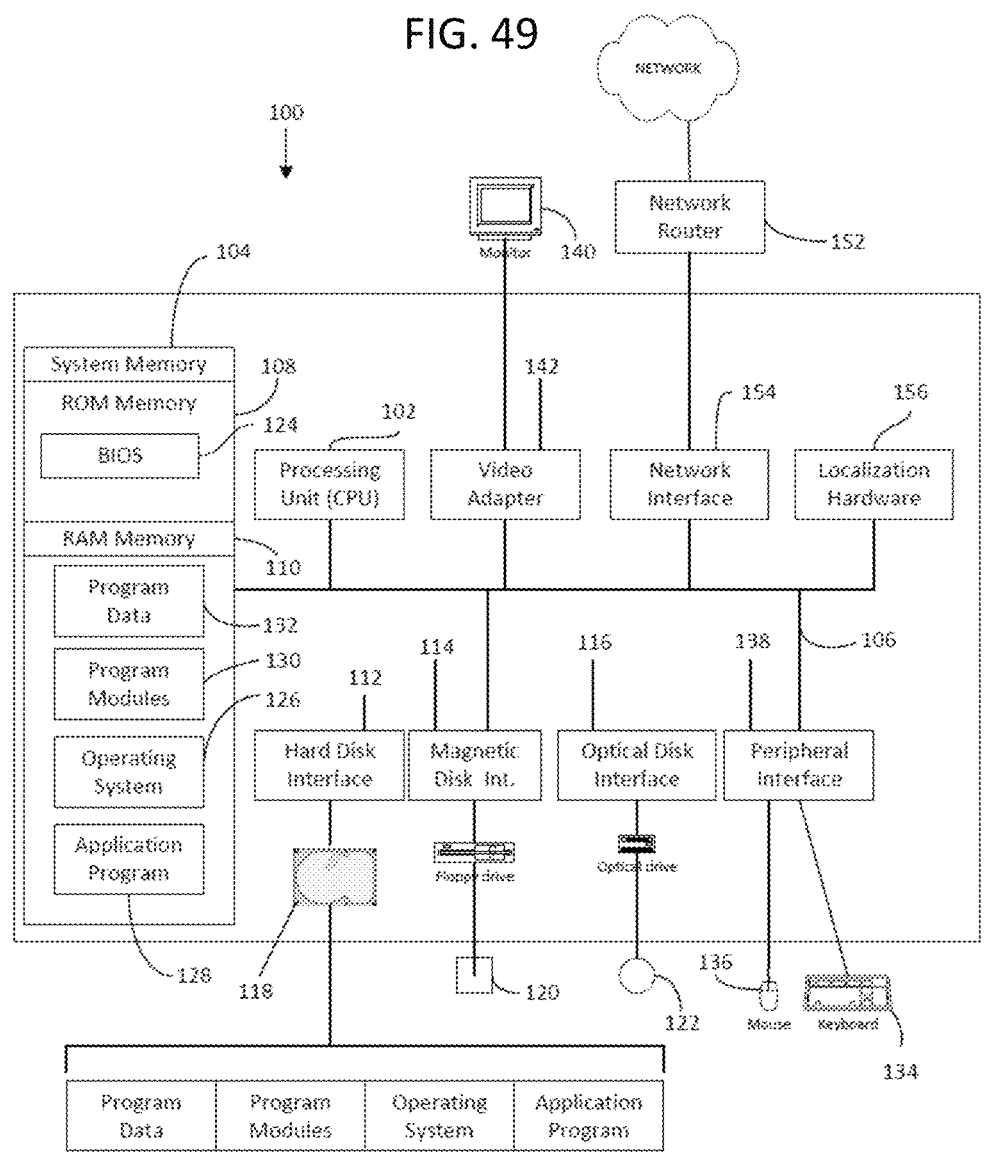
FIG. 49 is a diagrammatic view of an example of a computing environment, in embodiments.

FIG. 49 is a diagrammatic view of an example of a computing environment that includes a general-purpose computing system environment 100, such as a desktop computer, laptop, smartphone, tablet, or any other such device having the ability to execute instructions, such as those stored within a non-transient, computer-readable medium. Various computing devices as disclosed herein (e.g., a processor, controller, PLC, or any other computing device used to control or communicate with components of a test apparatus) may be similar to the computing system 100 or may include some components of the computing system 100. Furthermore, while described and illustrated in the context of a single computing system 100, those skilled in the art will also appreciate that the various tasks described hereinafter may be practiced in a distributed environment having multiple computing systems 100 linked via a local or wide-area network in which the executable instructions may be associated with and/or executed by one or more of multiple computing systems 100.

In its most basic configuration, computing system environment 100 typically includes at least one processing unit 102 and at least one memory 104, which may be linked via a bus 106. Depending on the exact configuration and type of computing system environment, memory 104 may be volatile (such as RAM 110), non-volatile (such as ROM 108, flash memory, etc.) or some combination of the two. Computing system environment 100 may have additional features and/or functionality. For example, computing system environment 100 may also include additional storage (removable and/or non-removable) including, but not limited to, magnetic or optical disks, tape drives and/or flash drives. Such additional memory devices may be made accessible to the computing system environment 100 by means of, for example, a hard disk drive interface 112, a magnetic disk drive interface 114, and/or an optical disk drive interface 116. As will be understood, these devices, which would be linked to the system bus 306, respectively, allow for reading from and writing to a hard disk 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system environment 100. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 100.

A number of program modules may be stored in one or more of the memory/media devices. For example, a basic input/output system (BIOS) 124, containing the basic routines that help to transfer information between elements within the computing system environment 100, such as during start-up, may be stored in ROM 108. Similarly, RAM 110, hard drive 118, and/or peripheral memory devices may be used to store computer executable instructions comprising an operating system 126, one or more applications programs 128 (which may include the functionality disclosed herein, for example), other program modules 130, and/or program data 122. Still further, computer-executable instructions may be downloaded to the computing environment 100 as needed, for example, via a network connection.

An end-user may enter commands and information into the computing system environment 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processor 102 via interfaces such as, for example, a parallel port, game port, firewire, or a universal serial bus (USB). To view information from the computing system environment 100, a monitor 140 or other type of display device may also be connected to bus 106 via an interface, such as via video adapter 132. In addition to the monitor 140, the computing system environment 100 may also include other peripheral output devices, not shown, such as speakers and printers.

The computing system environment 100 may also utilize logical connections to one or more computing system environments. Communications between the computing system environment 100 and the remote computing system environment may be exchanged via a further processing device, such a network router 152, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system environment 100, or portions thereof, may be stored in the memory storage device(s) of the computing system environment 100.

The computing system environment 100 may also include localization hardware 186 for determining a location of the computing system environment 100. In some instances, the localization hardware 156 may include, for example only, a GPS antenna, an RFID chip or reader, a WiFi antenna, or other computing hardware that may be used to capture or transmit signals that may be used to determine the location of the computing system environment 100.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. An apparatus for testing a plurality of electrical switches comprising:
    first contacts configured to connect to a first sample switch of the plurality of electrical switches, wherein the first contacts comprise at least a first input contact and a first output contact;
    second contacts configured to connect to a second sample switch of the plurality of electrical switches, wherein the second contacts comprise at least a second input contact and a second output contact;
    a power source connected to the first input contact and the second input contact;
    at least one first switch connected to the first output contact, the at least one first switch configured to selectively connect the first sample switch to a first make load;
    at least one second switch connected to the first output contact, the at least one second switch configured to selectively connect the first sample switch to a first break load;
    at least one third switch connected to the second output contact, the at least one third switch configured to selectively connect the second sample switch to a second make load; and
    at least one fourth switch connected to the second output contact, the at least one fourth switch configured to selectively connect the second sample switch to a second break load.

2. The apparatus of claim 1, wherein the first make load and the second make load are a same make load.

3. The apparatus of claim 1, wherein the first break load and the second break load are a same break load.

4. The apparatus of claim 1, wherein the first sample switch and the second sample switch are each a double throw switch.

5. The apparatus of claim 1, wherein the first sample switch and the second sample switch are each a single throw switch.

6. The apparatus of claim 5, wherein:
    the first sample switch and the second sample switch are each a single throw normally open switch;
    the first sample switch and the second sample switch are each a single throw normally closed switch;
    the first sample switch is a single throw normally open switch and the second sample switch is a single throw normally closed switch; or the first sample switch is a single throw normally closed switch and the second sample switch is a single throw normally open switch.

7. The apparatus of claim 1, further comprising third contacts configured to connect to a third sample switch of the plurality of electrical switches.

8. The apparatus of claim 1, further comprising a safety switch connected between the power source and the first input contact.

9. The apparatus of claim 1, wherein the at least one first switch comprises two MOSFETs configured to have a common source, wherein the at least one first switch allows current to flow in two directions in an on state and blocks current in both positive and negative directions in an off state.

10. The apparatus of claim 9, wherein the two MOSFETs are comprised of silicon carbide.

11. The apparatus of claim 9, wherein the at least one first switch further comprises a zero-crossing current sensor, wherein the at least one first switch is turned off only when the current output by the at least one first switch is at or near zero current.

12. The apparatus of claim 1, further comprising a universal voltage sensing circuit configured to sense alternating current (AC) voltage or direct current (DC) voltage, wherein the universal voltage sensing circuit is connected to the first output contact of the first sample switch.

13. The apparatus of claim 12, wherein an output of the universal voltage sensing circuit is connected to a controller of the apparatus, wherein the controller is configured to determine a cycle of a test of the first sample switch based on the output of the universal voltage sensing circuit.

14. A method for testing a plurality of electrical switches comprising:
connecting, by a controller of an electrical switch testing apparatus, a first sample switch of the plurality of electrical switches to a make load;
disconnecting, by the controller at a first predetermined time after the first sample switch is connected to the make load, the first sample switch from the make load;
connecting, by the controller at a second predetermined time after the first sample switch is connected to the make load, the first sample switch to a break load; and
connecting, by the controller at a third predetermined time after the first sample switch is connected to the make load, a second switch of the plurality of electrical switches to the make load.

15. The method of claim 14, further comprising disconnecting, by the controller at a fourth predetermined time after the first sample switch is connected to the make load, the second sample switch from the make load.

16. The method of claim 15, further comprising connecting, by the controller at a fifth predetermined time after the first sample switch is connected to the make load, the second sample switch to the break load.

17. The method of claim 16, further comprising connecting, by the controller at a sixth predetermined time after the first sample switch is connected to the make load, a third sample switch of the plurality of electrical switches to the make load.

18. The method of claim 17, further comprising:
disconnecting, by the controller at a seventh predetermined time after the first sample switch is connected to the make load, the third sample switch from the make load; and
connecting, by the controller at an eighth predetermined time after the first sample switch is connected to the make load, the third sample switch to the break load.

19. The method of claim 14, further comprising determining, by the controller, that the first predetermined time after the first sample switch is connected to the make load has elapsed based a timer count based on an internal asynchronous clock signal of the controller.

20. An apparatus for testing a plurality of electrical switches comprising:
first contacts configured to connect to a first sample switch of the plurality of electrical switches, wherein the first contacts comprise at least a first input contact and a first output contact, and wherein the first sample switch is one of a double throw switch, a single throw normally open switch, or a single throw normally closed switch;
second contacts configured to connect to a second sample switch of the plurality of electrical switches, wherein the second contacts comprise at least a second input contact and a second output contact, and wherein the second sample switch is one of a double throw switch, a single throw normally open switch, or a single throw normally closed switch;
at least one first switch connected to the first output contact, the at least one first switch configured to selectively connect the first sample switch to a first make load;
at least one second switch connected to the first output contact, the at least one second switch configured to selectively connect the first sample switch to a first break load;
at least one third switch connected to the second output contact, the at least one third switch configured to selectively connect the second sample switch to a second make load; and
at least one fourth switch connected to the second output contact, the at least one fourth switch configured to selectively connect the second sample switch to a second break load.

* * * * *